US012319060B2

(12) United States Patent
Tabata et al.

(10) Patent No.: US 12,319,060 B2
(45) Date of Patent: Jun. 3, 2025

(54) LIQUID EJECTION HEAD AND RECORDING APPARATUS

(71) Applicant: KYOCERA CORPORATION, Kyoto (JP)

(72) Inventors: Shuhei Tabata, Kirishima (JP); Makoto Higashibeppu, Kirishima (JP); Takeshi Hirayama, Kirishima (JP); Gen Shimura, Kirishima (JP); Yukihiro Hasegawa, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 91 days.

(21) Appl. No.: 17/915,479

(22) PCT Filed: Mar. 26, 2021

(86) PCT No.: PCT/JP2021/012806
§ 371 (c)(1),
(2) Date: Sep. 29, 2022

(87) PCT Pub. No.: WO2021/200633
PCT Pub. Date: Oct. 7, 2021

(65) Prior Publication Data

US 2023/0120552 A1 Apr. 20, 2023

(30) Foreign Application Priority Data

Mar. 30, 2020 (JP) ................................ 2020-059483
Mar. 30, 2020 (JP) ................................ 2020-059484
Mar. 30, 2020 (JP) ................................ 2020-059485

(51) Int. Cl.
*B41J 2/14* (2006.01)
*B41J 2/045* (2006.01)

(52) U.S. Cl.
CPC ....... *B41J 2/14209* (2013.01); *B41J 2/04581* (2013.01); *B41J 2002/14217* (2013.01); *B41J 2002/14491* (2013.01)

(58) Field of Classification Search
CPC .................................................... B41J 2/14209
See application file for complete search history.

(56) References Cited

U.S. PATENT DOCUMENTS 6,419,348 B1 * 7/2002 Kojima ................ B41J 2/14209 347/72
2009/0096844 A1 * 4/2009 Kojima ................ B41J 2/14233 347/72

(Continued)

FOREIGN PATENT DOCUMENTS

EP 2042321 A1 4/2009
JP 2006158127 A 6/2006

(Continued)

*Primary Examiner* — Shelby L Fidler
(74) *Attorney, Agent, or Firm* — HAUPTMAN HAM, LLP

(57) ABSTRACT

A first active region is made of a piezoelectric overlaps a midsection of a pressure chamber when viewed in plan through a pressure applying surface. A second active region is made of a piezoelectric member closer than the first active region to the pressure applying surface. The second active region extends over both a peripheral section of the pressure chamber and an outer region located outside the pressure chamber when viewed in plan through the pressure applying surface. A driver controls intensity of a first electric field applied to the first active region and intensity of a second electric field applied to the second active region such that the time period over which the first active region contracts and the time period over which the second active region contracts overlap or coincide with each other. The first electric field is more intense than the second electric field.

21 Claims, 17 Drawing Sheets

(56) References Cited

U.S. PATENT DOCUMENTS

| | | | | |
|---|---|---|---|---|
| 2009/0115821 | A1 | 5/2009 | Tsukamoto | |
| 2009/0167823 | A1* | 7/2009 | Kojima | B41J 2/14233 310/317 |
| 2009/0244205 | A1 | 10/2009 | Kura | |
| 2010/0165057 | A1* | 7/2010 | Morita | B41J 2/14209 347/68 |
| 2010/0223768 | A1* | 9/2010 | Sekiguchi | B41J 2/14233 29/25.35 |
| 2015/0035906 | A1 | 2/2015 | Mizuno et al. | |
| 2019/0103544 | A1* | 4/2019 | Naito | B41J 2/14209 |
| 2021/0305486 | A1* | 9/2021 | Kura | B41J 2/14209 |

FOREIGN PATENT DOCUMENTS

| | | | |
|---|---|---|---|
| JP | 2009113316 | A | 5/2009 |
| JP | 2009241325 | A | 10/2009 |
| JP | 2009241393 | A | 10/2009 |
| JP | 2010155386 | A | 7/2010 |
| JP | 2010228144 | A | 10/2010 |
| JP | 2014172323 | A | 9/2014 |
| JP | 201524531 | A | 2/2015 |
| JP | 2015030134 | A | 2/2015 |
| JP | 2015182448 | A | 10/2015 |

* cited by examiner

2

LIQUID EJECTION HEAD AND RECORDING APPARATUS

TECHNICAL FIELD

Related Applications

The present application is a National Phase of International Application Number PCT/JP2021/012806, filed Mar. 26, 2021, and claims priority based on Japanese Patent Application Nos. 2020-059483, 2020-059484 and 2020-059485, filed Mar. 30, 2020.

The disclosure relates to a liquid ejection head and a recording apparatus including the liquid ejection head.

Background of Invention

Known piezoelectric actuators are, for example, included in ink jet heads (see, for example, Patent Literature 1 and Patent Literature 2). For example, a unimorph piezoelectric actuator includes a diaphragm and piezoelectric layers. The diaphragm covers an upper opening of a pressure chamber filled with liquid (ink). The piezoelectric layers are laid on the diaphragm. The piezoelectric layers expand and contract along a surface. Thus, the piezoelectric actuator, like a bimetal, undergoes bending and deformation. The pressure chamber receives pressure accordingly, and as a result, the liquid is ejected from the pressure chamber. When a voltage is applied to a region being part of the piezoelectric layers and extending over the midsection of the pressure chamber viewed in plan, the piezoelectric layers expand and contract along a surface. Patent Literature 1 and Patent Literature 2 indicate that a voltage is applied also to the diaphragm, which is made of a piezoelectric member. More specifically, a voltage is applied to a region being part of the diaphragm and located on a peripheral portion of the piezoelectric chamber viewed in plan. Patent Literature 3 and Patent Literature 4 disclose techniques by which an electric field is applied to conduct poling process.

CITATION LIST

Patent Literature

Patent Literature 1: Japanese Unexamined Patent Application Publication No. 2015-182448

Patent Literature 2: Japanese Unexamined Patent Application Publication No. 2010-155386

Patent Literature 3: Japanese Unexamined Patent Application Publication No. 2006-158127

Patent Literature 4: Japanese Unexamined Patent Application Publication No. 2010-228144

SUMMARY

According to an aspect of the present disclosure, a liquid ejection head includes a channel member, a piezoelectric actuator, and a driver. The channel member has a pressure applying surface and includes a pressure chamber that has an opening defined in the pressure applying surface. The piezoelectric actuator is disposed on the pressure applying surface. The driver is configured to drive the piezoelectric actuator. The piezoelectric actuator includes a first active region and a second active region. A thickness direction is defined as a direction perpendicular to the pressure applying surface. The first active region is made of a piezoelectric member polarized in the thickness direction and extends over a midsection of the pressure chamber when viewed in plan through the pressure applying surface. The second active region is made of a piezoelectric member polarized in the thickness direction and closer than the first active region to the pressure applying surface. The second active region extends over both a peripheral section of the pressure chamber and an outer region located outside the pressure chamber when viewed in plan through the pressure applying surface. When performing liquid ejection control for ejecting liquid, the driver controls intensity of a first electric field applied to the first active region in the thickness direction and intensity of a second electric field applied to the second active region in the thickness direction. The intensity of each electric field is controlled in such a manner that a time period over which the first active region expands along the pressure applying surface and a time period over which the second active region expands along the pressure applying surface overlap or coincide with each other and a time period over which the first active region contracts along the pressure applying surface and a time period over which the second active region contracts along the pressure applying surface overlap or coincide with each other. When the liquid ejection control is performed, a maximum value of the intensity of the first electric field is greater than a maximum value of the intensity of the second electric field.

According to an aspect of the present disclosure, a liquid ejection head includes a channel member, a piezoelectric actuator, and a driver. The channel member has a pressure applying surface and includes a pressure chamber that has an opening defined in the pressure applying surface. The piezoelectric actuator is disposed on the pressure applying surface. The driver is configured to drive the piezoelectric actuator. The piezoelectric actuator includes a first active region and a second active region. A thickness direction is defined as a direction perpendicular to the pressure applying surface. The first active region is made of a piezoelectric member polarized in the thickness direction and extends over a midsection of the pressure chamber when viewed in plan through the pressure applying surface. The second active region is made of a piezoelectric member polarized in the thickness direction and closer than the first active region to the pressure applying surface. The second active region extends over both a peripheral section of the pressure chamber and an outer region located outside the pressure chamber when viewed in plan through the pressure applying surface. When performing control for ejecting liquid droplets, the driver controls intensity of an electric field applied to the first active region in the thickness direction and intensity of an electric field applied to the second active region in the thickness direction. The intensity of each electric field is controlled in such a manner that a time period over which the first active region expands along the pressure applying surface and a time period over which the second active region expands along the pressure applying surface overlap or coincide with each other and a time period over which the first active region contracts along the pressure applying surface and a time period over which the second active region contracts along the pressure applying surface overlap or coincide with each other. A second portion being part of the second active region and located outside the pressure chamber is greater in area than a first portion being part of the second active region and extending over the pressure chamber when the second active region is viewed in plan through the pressure applying surface.

According to an aspect of the present disclosure, a liquid ejection head includes a channel member, a piezoelectric actuator, and a driver. The channel member has a pressure applying surface and includes a pressure chamber that has an opening defined in the pressure applying surface. The piezoelectric actuator is disposed on the pressure applying surface. The driver is configured to drive the piezoelectric actuator. The piezoelectric actuator includes a first active region, a second active region, and an inactive region. A thickness direction is defined as a direction perpendicular to the pressure applying surface. The first active region is made of a piezoelectric member polarized in the thickness direction and extends over a midsection of the pressure chamber when viewed in plan through the pressure applying surface. The second active region is made of a piezoelectric member polarized in the thickness direction and closer than the first active region to the pressure applying surface. The second active region extends over both a peripheral section of the pressure chamber and an outer region located outside the pressure chamber when viewed in plan through the pressure applying surface. The inactive region is made of a piezoelectric member and extends to a perimeter of the first active region. The driver performs liquid ejection control and reorientation control. When performing the liquid ejection control, the driver controls intensity of an electric field applied to the first active region in the thickness direction and intensity of an electric field applied to the second active region in the thickness direction. The intensity of each electric field is controlled in such a manner that a time period over which the first active region expands along the pressure applying surface and a time period over which the second active region expands along the pressure applying surface overlap or coincide with each other and a time period over which the first active region contracts along the pressure applying surface and a time period over which the second active region contracts along the pressure applying surface overlap or coincide with each other. When not performing the liquid ejection control, the driver performs the reorientation control by which an electric field is applied to the inactive region in the thickness direction.

According to an aspect of the present disclosure, a recording apparatus includes a liquid ejection head and a controller configured to control the liquid ejection head. The liquid ejection head includes a channel member and a piezoelectric actuator. The channel member has a pressure applying surface and includes a pressure chamber that has an opening defined in the pressure applying surface. The piezoelectric actuator is disposed on the pressure applying surface. The piezoelectric actuator includes a first active region and a second active region. A thickness direction is defined as a direction perpendicular to the pressure applying surface. The first active region is made of a piezoelectric member polarized in the thickness direction and extends over a midsection of the pressure chamber when viewed in plan through the pressure applying surface. The second active region is made of a piezoelectric member polarized in the thickness direction and closer than the first active region to the pressure applying surface. The second active region extends over both a peripheral section of the pressure chamber and an outer region located outside the pressure chamber when viewed in plan through the pressure applying surface. When performing liquid ejection control for ejecting liquid, the controller controls intensity of a first electric field applied to the first active region in the thickness direction and intensity of a second electric field applied to the second active region in the thickness direction. The intensity of each electric field is controlled in such a manner that a time period over which the first active region expands along the pressure applying surface and a time period over which the second active region expands along the pressure applying surface overlap or coincide with each other and a time period over which the first active region contracts along the pressure applying surface and a time period over which the second active region contracts along the pressure applying surface overlap or coincide with each other. When the liquid ejection control is performed, a maximum value of the intensity of the first electric field is greater than a maximum value of the intensity of the second electric field.

According to an aspect of the present disclosure, a recording apparatus includes a liquid ejection head and a controller configured to control the liquid ejection head. The liquid ejection head includes a channel member and a piezoelectric actuator. The channel member has a pressure applying surface and includes a pressure chamber that has an opening defined in the pressure applying surface. The piezoelectric actuator is disposed on the pressure applying surface. The piezoelectric actuator includes a first active region and a second active region. A thickness direction is defined as a direction perpendicular to the pressure applying surface. The first active region is made of a piezoelectric member polarized in the thickness direction and extends over a midsection of the pressure chamber when viewed in plan through the pressure applying surface. The second active region is made of a piezoelectric member polarized in the thickness direction and closer than the first active region to the pressure applying surface. The second active region extends over both a peripheral section of the pressure chamber and an outer region located outside the pressure chamber when viewed in plan through the pressure applying surface. When performing control for ejecting liquid droplets, the controller controls intensity of an electric field applied to the first active region in the thickness direction and intensity of an electric field applied to the second active region in the thickness direction. The intensity of each electric field is controlled in such a manner that a time period over which the first active region expands along the pressure applying surface and a time period over which the second active region expands along the pressure applying surface overlap or coincide with each other and a time period over which the first active region contracts along the pressure applying surface and a time period over which the second active region contracts along the pressure applying surface overlap or coincide with each other. A portion being part of the second active region and extending over the outer region is greater in area than a portion being part of the second active region and extending over the pressure chamber when the second active region is viewed in plan through the pressure applying surface.

According to an aspect of the present disclosure, a recording apparatus includes a liquid ejection head and a controller configured to control the liquid ejection head. The liquid ejection head includes a channel member and a piezoelectric actuator. The channel member has a pressure applying surface and includes a pressure chamber that has an opening defined in the pressure applying surface. The piezoelectric actuator is disposed on the pressure applying surface. The piezoelectric actuator includes a first active region, a second active region, and an inactive region. A thickness direction is defined as a direction perpendicular to the pressure applying surface. The first active region is made of a piezoelectric member polarized in the thickness direction and extends over a midsection of the pressure chamber when viewed in plan through the pressure applying surface. The second active region is made of a piezoelectric member polarized in the thickness direction and closer than the first active region to the pressure applying surface. The second active region extends over both a peripheral section of the pressure chamber and an outer region located outside the pressure chamber when viewed in plan through the pressure applying surface. The inactive region is made of a piezoelectric member and extends to a perimeter of the first active region. The controller performs liquid ejection control and reorientation control. The controller performs the liquid ejection control in such a way as to control intensity of an electric field applied to the first active region in the thickness direction and intensity of an electric field applied to the second active region in the thickness direction. The intensity of each electric field is controlled in such a manner that a time period over which the first active region expands along the pressure applying surface and a time period over which the second active region expands along the pressure applying surface overlap or coincide with each other and a time period over which the first active region contracts along the pressure applying surface and a time period over which the second active region contracts along the pressure applying surface overlap or coincide with each other. When not performing the liquid ejection control, the controller performs the reorientation control by which an electric field is applied to the inactive region in the thickness direction.

DESCRIPTION OF EMBODIMENTS

Figure 1A:
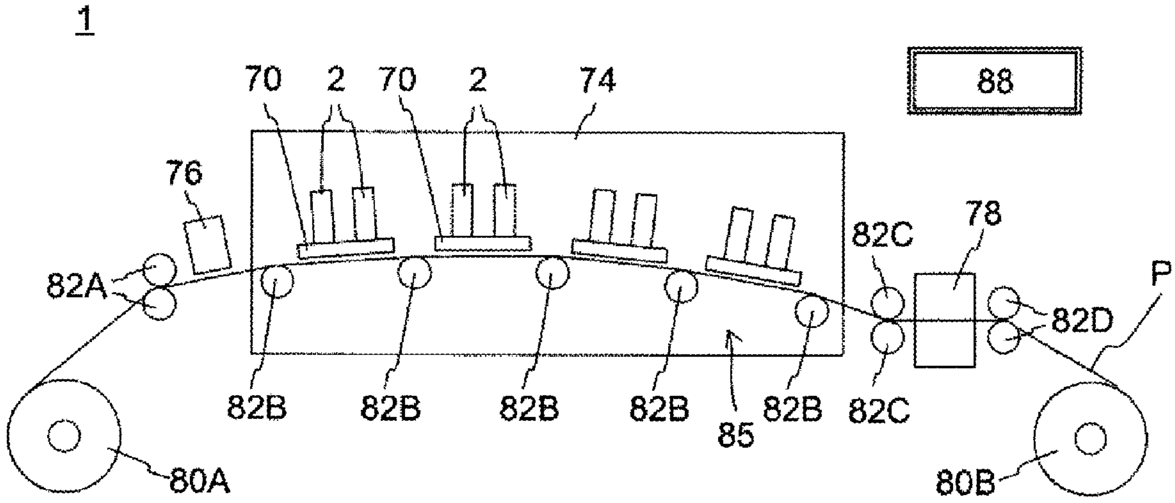
FIG. 1A is a side view of a recording apparatus according to a first embodiment.

Hereinafter, embodiments of the present disclosure will be described with reference to the accompanying drawings. The accompanying drawings are schematic representations. That is, not every detail may be illustrated in the drawings. Constituent elements are not drawn to scale, and the dimension ratios thereof do not fully correspond to the actual dimension ratios. The relative dimensions and the scale ratio may vary from drawing to drawing. For the purpose of emphasizing a particular shape, the outline of the shape may be illustrated in such a manner that a specific dimension looks greater than it really is.

Embodiments that follow a first embodiment will be principally described with a focus on their distinctive features only. Unless otherwise noted, these embodiments may be equated with the previously described embodiment or may be understood by analogy to the previously described embodiment. Each element in an embodiment and the corresponding element in another embodiment may be denoted by the same reference sign, irrespective of possible specific differences therebetween.

The term “similar” may be taken to mean “similar figures” in mathematics but is not limited thereto. In mathematics, two figures are similar figures if one figure whose size is changed by enlargement or reduction (or whose scale remains unchanged) is congruent with the other. In the present disclosure, two figures may also be considered similar figures if their relationship is closely analogous to mathematical similarity when viewed rationally in light of common general technical knowledge. For example, two ellipses are not mathematically similar to each other if one ellipse is located within or outside the other with a constant distance between the peripheries of the ellipses. The reason for this is that the ratio of the major axis to the minor axis of one ellipse is different from that of the other ellipse. The geometrical relationship between these ellipses may be herein considered as similarity.

The terms used herein to describe various shapes (e.g., circular, elliptic, and rectangular) may be taken to mean the shapes in mathematics but are not limited thereto. For example, the term “elliptic” may be used herein to describe a shape defined by only a curve protruding outward with the longitudinal direction being substantially orthogonal to the short-side direction. The term “rectangular” may be used herein to describe a shape whose corners are chamfered.

First Embodiment (Overall Configuration of Printer)

Figure 1B:
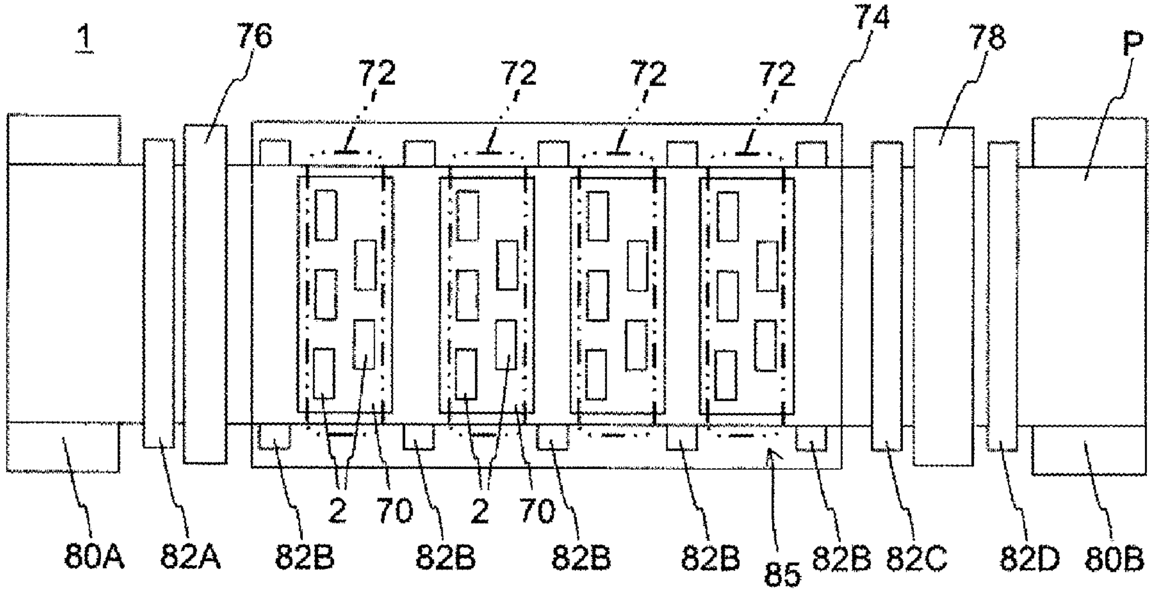
FIG. 1B is a plan view of the recording apparatus according to the first embodiment.

FIG. 1A is a schematic side view of a color ink jet printer 1, which is an example of a recording apparatus and includes liquid ejection heads 2 according to an embodiment of the present disclosure. The color ink jet printer 1 and each liquid ejection head 2 may be hereinafter simply referred to as a printer and a head, respectively. FIG. 1B is a schematic plan view of the printer 1.

With regard to the heads 2 or the printer 1, any direction may be defined as the vertical direction. For convenience, the up-and-down direction on the drawing plane of FIG. 1A may be defined as the vertical direction in relation to, for example, the terms “upper surface” and “lower surface”.

Unless otherwise specified, the terms “plan view” and “seen-through plan view” herein mean that an object of interest is viewed in the up-and-down direction on the drawing plane of FIG. 1A.

The printer 1 causes printing paper P to move relative to the heads 2. More specifically, the printing paper P, which an example of a recording medium, is transferred from a paper feed roller 80A to a take-up roller 80B. Various kinds of rollers, such as the paper feed roller 80A and the take-up roller 80B, constitute a transfer module 85, which enables the printing paper P to move relative to the heads 2. The individual rollers will be described later. The heads 2 are controlled by a controller 88 on the basis of print data that may be image or textual data. The controller 88 causes the heads 2 to eject liquid toward the printing paper P in such a manner that liquid droplets are ejected onto the printing paper P. A printed record of the data is produced on the printing paper P accordingly.

The printer 1 in the present embodiment is a line printer, where the heads 2 are fixed to the printer 1. In some embodiments, the recording apparatus is a serial printer, which ejects liquid droplets and conveys a sheet of paper in an alternating manner. The liquid droplets are ejected from the heads 2 moving in a direction forming an angle with the direction of conveyance of the printing paper P (e.g., a direction perpendicular to the direction of conveyance of the printing paper P).

The printer 1 includes four head mounting frames, each of which is denoted by 70 and may be hereinafter simply referred to as a frame. The head mounting frames are each in the form of a flat plate and is fixed to the printer 1 in a manner so as to be substantially parallel to the printing paper P. The frames 70 each have five holes (not illustrated), to which five heads 2 are fitted; that is, each of the heads 2 is fitted to the corresponding one of the holes. The five heads 2 mounted on one frame 70 belongs to a head group 72. The printer 1 includes four head groups 72; that is, twenty heads 2 in total are provided.

The heads 2 each have an ejection region from which liquid is ejected. The heads 2 are mounted on the frames 70 in such a manner that their respective ejection regions face the printing paper P. The heads 2 may be at a distance of about 0.5 to 20 mm from the printing paper P.

The twenty heads 2 may be connected directly to the controller 88 or may be connected to the controller 88 via one or more distribution modules located therebetween. The one or more distribution modules distribute print data. For example, the controller 88 transmits print data to a distribution module, which then distributes the print data to the twenty heads 2. Alternatively, the controller 88 distributes print data to four distribution modules, each of which then distributes the print data to the five heads 2 in the corresponding one of the head groups 72.

The heads 2 are narrow and strip-shaped. Each head 2 extends from the front to the back on the drawing plane of FIG. 1A. In other words, the longitudinal direction of each head 2 coincides with the up-and-down direction in FIG. 1B. Each head group 72 includes: three heads 2 aligned in a direction forming an angle with the direction of conveyance of the printing paper P (e.g., a direction perpendicular to the direction of conveyance of the printing paper P); and two heads 2 each being located between adjacent ones of the three heads 2 in a manner so as not to be in alignment with the three heads 2 in the direction of conveyance. In other words, the heads 2 in each head group 72 are arranged in a staggered pattern. The heads 2 are arranged in such a manner that their respective printable ranges lie with no gap therebetween in the width direction of the printing paper P, that is, in the direction forming an angle with the direction of conveyance of the printing paper P or in such a manner that peripheral portions of the printable ranges overlap each other. This arrangement enables printing with no blank spaces in the width direction of the printing paper P.

The four head groups 72 are arranged in the direction of conveyance of the printing paper P. The heads 2 receive a supply of liquid (ink) from liquid supply tank (not illustrated). The heads 2 belonging to the same head group 72 receive a supply of ink of the same color. The four head groups 72 enable printing with inks of four different colors. For example, the head groups 72 eject magenta (M) ink, yellow (Y) ink, cyan (C) ink, and black (K) ink, respectively. These color inks are ejected onto the printing paper P, on which a color image is printed accordingly.

The printer 1 may include one head 2, in which case an image within the printable range of the head 2 is to be printed in monochrome. The number of heads 2 in each head group 72 and the number of head groups 72 may be changed as appropriate, depending on what is to be printed and/or printing conditions. For example, a greater number of head groups 72 enable printing with more colors. Two or more head groups 72 arranged in alternating manner in the direction of conveyance to eject ink of the same color yield an increase in conveyance speed, with no performance variation between the heads 2. The print area per unit time is increased accordingly. Two or more head groups 72 arranged in a manner so as not to be in positional agreement in a direction forming an angle with the direction of conveyance to eject ink of the same color yield an increase in resolution in the width direction of the printing paper P.

Instead of color inks, a coating agent in liquid form may be ejected uniformly or in specific patterns by the heads 2 to surface treat the printing paper P. For example, such a coating agent is to form a liquid receiving layer such that a liquid can set on a low-permeability recording medium. Alternatively, such a coating agent is to form a liquid permeation barrier layer such that a liquid is prevented from spreading too much on a high-permeability recording medium or from mixing too much with another liquid ejected onto an adjacent spot on the medium. It is not required that the coating agent be ejected from the heads 2. The coating agent may be applied uniformly by a coater 76, which is controlled by the controller 88.

The printer 1 is designed for printing on the printing paper P, which is a recording medium. The printing paper P is winded up by the paper feed roller 80A. The printing paper P on the paper feed roller 80A is then fed into a path below the heads 2 mounted on the frames 70 and passes between two conveyer rollers 82C. Finally, the printing paper P is taken up by the take-up roller 80B. The conveyer rollers 82C rotate in such a manner that the printing paper P is conveyed at a constant speed while the printing paper P is subjected the printing process carried out by the heads 2.

The following describes the details of printer 1. The printing paper P conveyed through the printer 1 undergoes the following processes, which will be described below in chronological order. Once the printing paper P is fed by the paper feed roller 80A, the printing paper P passes between two guide rollers 82A and then under the coater 76. The coater 76 applies the coating agent to the printing paper P.

The printing paper P then enters a head chamber 74, in which the frames 70 fitted with the heads 2 are accommodated. The printing paper P is taken in and discharged through openings, each of which is an interface between the internal space of the head chamber 74 and the outside;

nevertheless, the head chamber 74 is substantially isolated from the outside. The temperature, humidity, and atmospheric pressure in the head chamber 74 are examples of control factors that are controlled by, for example, the controller 88 when necessary. The head chamber 74 is less susceptible to external perturbations than the outside where the printer 1 is installed. Accordingly, the range of variation of each control factor is narrower in the head chamber 74 than on the outside.

The head chamber 74 accommodates five guide rollers 82B. The printing paper P is conveyed over the guide rollers 82B. When viewed laterally, the five guide rollers 82B are disposed in such a manner that the midsection of each guide roller 82B protrude toward an array of the frames 70. Thus, the printing paper P conveyed over the five guide rollers 82B are arc-shaped when viewed laterally. With the printing paper P being held under tension, portions of the printing paper P that are located between the guide rollers 82B are flat. Two adjacent ones of the guide rollers 82B are arranged side by side with one of the frames 70 being located therebetween. The frames 70 are oriented at slightly different angles in a manner so as to be parallel with the printing paper P conveyed under the frames 70.

The printing paper P exits the head chamber 74, passes between the two conveyer rollers 82C, passes through a dryer 78, passes between two guide rollers 82D, and is then taken up by the take-up roller 80B. The printing paper P may be conveyed at a speed of 100 m/min. Each roller may be controlled by the controller 88 or may be controlled manually.

Two or more sheets of printing paper P can be winded up together by the take-up roller 80B after being dried by the dryer 78, which reduces the possibility that the sheets of printing paper P will stick to each other or the possibility that wet liquid will become blurred by friction of the sheets of printing paper P. High-speed printing requires a high drying speed. The dryer 78 may achieve a high drying speed by employing different drying methods either sequentially or simultaneously. For example, drying by a jet of warm air, infrared radiation, or contact with a heated roller may be conducted. Infrared radiation in a specific frequency range enables quick drying of liquid without causing severe damage to the printing paper P. Conveying the printing paper P along the cylindrical surface of a heated roller can prolong the period over which heat is transferred to the printing paper P in contact with the roller. The dimension of the area of contact between the roller and the printing paper P in the direction of conveyance is preferably equal to or greater than ¼ of the circumference defined by the circumferential surface and is more preferably equal to or greater than ½ of the circumference. One or more UV radiation sources for printing with UV-curable ink UV may be used in place of the dryer 78 or in addition to the dryer 78. Each of the UV radiation sources may be disposed between adjacent ones of the frames 70.

The printer 1 may include a cleaning module for cleaning the heads 2. The cleaning module is capable of performing wiping and/or capping to clean the heads 2. Wiping is a process of rubbing a flexible wiper against, for example, an ejection surface 11*a* to remove a deposition of liquid from the surface. The ejection surface 11*a*, which will be described later, is a surface of a portion from which liquid is ejected. The cleaning process involving capping is as follows. For example, the ejection surface 11*a*, from which liquid is ejected, is covered with a cap. This step is called capping. The ejection surface 11*a* and the cap define a substantially hermetically sealed space. Ejection holes 3, which will be described later, can be clogged with foreign matter and/or liquid that is more viscous than it is under standard conditions. In such a case, liquid may be repeatedly ejected into the space to unclog the ejection holes 3. Capping eliminates or reduces the possibility that liquid ejected in the cleaning process will splatter on the printer 1 and will deposit on the printing paper P and/or on a conveyance mechanism including the rollers. Upon completion of the cleaning process, the ejection surface 11*a* may undergo wiping. The wiper and/or the cap fitted to the printer 1 may be handled manually to conduct wiping and/or capping for the cleaning process. Alternatively, the cleaning process may be carried out automatically under the control exercised by the controller 88.

It is not required that the recording medium be the printing paper P. The recording medium may be cloth in roll form. It is not required that the printing paper P itself be conveyed. In some embodiments, the printer 1 includes a conveyer belt that carries a recording medium placed thereon. In this case, the recording medium may be cut-sheet paper, cut pieces of cloth, lumber, or tiles. Liquid containing electrically conductive particles may be ejected from the heads 2 to print wiring pattern for electric devices. A predetermined amount of chemical agent in liquid form or liquid containing a chemical agent may be ejected from the heads 2 into a reactor to cause a reaction that yields a chemical product.

The printer 1 may be equipped with a position sensor, a speed sensor, and/or a temperature sensor that provides information about conditions of modules of the printer 1 to the controller 88, which can thus control the modules on the basis of the conditions. For example, liquid is ejected in accordance with a driving signal, which may be varied on the basis of information about factors affecting the liquid ejection performance (e.g., the ejection amount and/or the ejection rate). Examples of the factors include the temperature of each head 2, the temperature of the liquid stored in the liquid supply tank for later ejection through the heads 2, and the pressure exerted on the heads 2 by the liquid in the liquid supply tank.

(Ejection Surface)

Figure 2:
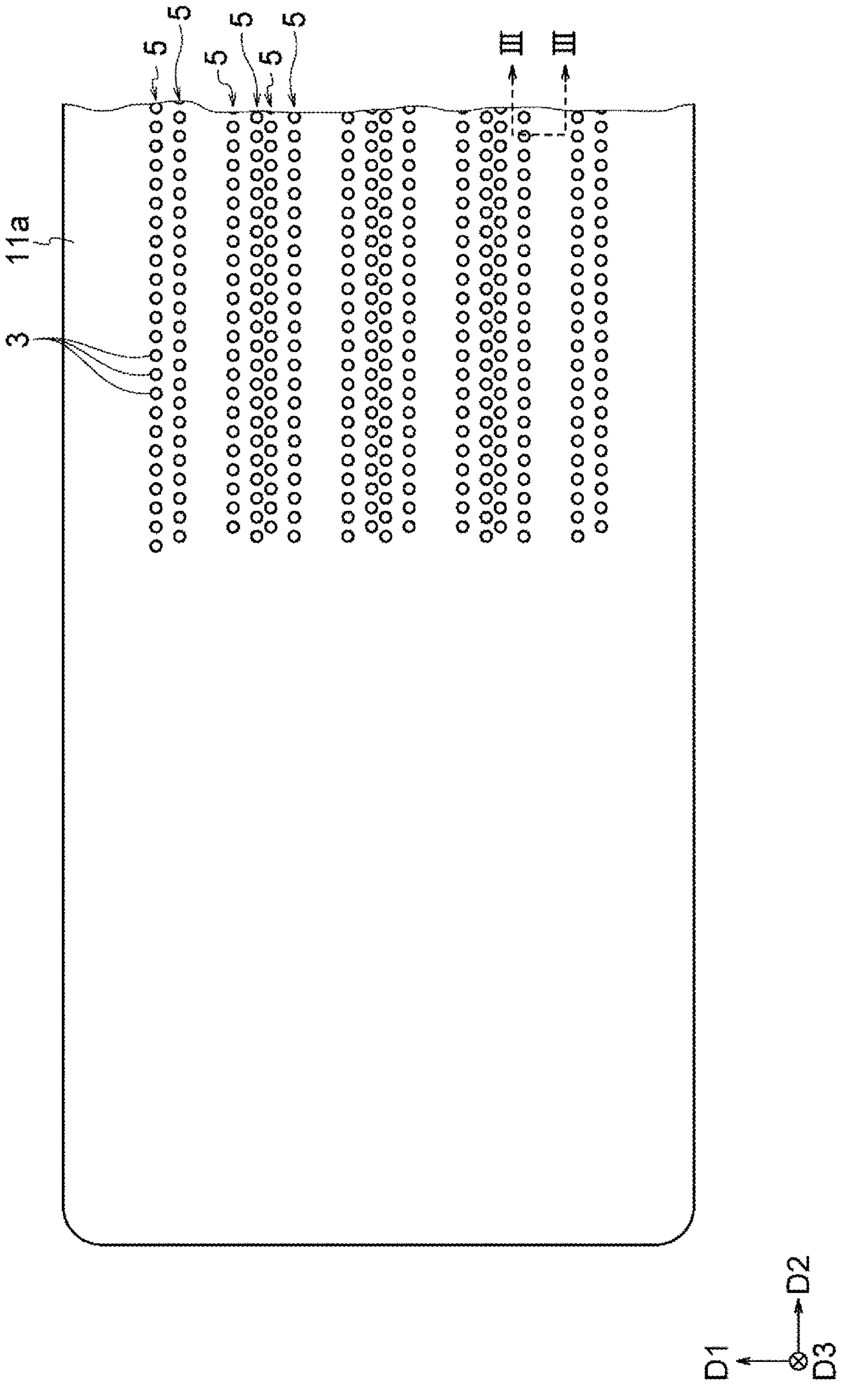
FIG. 2 is a plan view of part of a liquid ejection head according to the first embodiment.

FIG. 2 is a plan view of a representative of the heads 2, illustrating part of its surface (the ejection surface 11*a*) facing the printing paper P. For convenience, the surface is illustrated with a Cartesian coordinate system defined by three axes, which are herein referred to as a D1 axis, a D2 axis, and a D3 axis, respectively. The D1 axis is parallel to the direction of transfer of the printing paper P relative to the head 2. In the present embodiment, the D1 axis will be mentioned without distinction of positive and negative in relation to the direction of conveyance of the printing paper P relative to the head 2. The D2 axis is parallel to the ejection surface 11*a* and the printing paper P and is orthogonal to the D1 axis. As with the D1 axis, the D2 axis will be mentioned without distinction of positive and negative. The D3 axis is orthogonal to the ejection surface 11*a* and the printing paper P. The printing paper Pis located on the −D3 side (the front side of the drawing plane of FIG. 2) with respect to the heads 2. The D3 direction may be herein used to refer to either one of the +D3 direction (the direction toward the +D3 side) and the −D3 direction (the direction toward the −D3 side). FIG. 2 illustrates one end portion of the head 2 in the longitudinal direction, which is the D2 direction as mentioned above.

The ejection surface 11*a* of the head 2 may be flat and may be a major part of the surface facing the printing paper P. For example, the ejection surface 11*a* has a substantially rectangular shape whose longitudinal direction is the D2 direction. The ejection surface 11a has the ejection holes 3, through which ink droplets are ejected. The ejection holes 3 are staggered in the direction (the D2 direction) orthogonal to the direction (the D1 direction) of transfer of the printing paper P relative to the head 2. Ink droplets are ejected through the ejection holes 3 arranged as above while the printing paper P is moved relative to the head 2 by the transfer module 85. Any desired two-dimensional image may be produced accordingly.

More specifically, the ejection holes 3 are arranged in an array with multiple rows. Referring to FIG. 2, sixteen rows of ejection holes are provided. The rows of ejection holes 3 are herein referred to as ejection hole rows 5. The ejection holes 3 in one ejection hole row 5 and the ejection holes 3 in another ejection hole row 5 are not in positional agreement with each other in the D2 direction. With the ejection holes 3 arranged as above, multiple dots may be formed on the printing paper P, where the dot-to-dot pitch in the D2 direction is smaller than the hole-to-hole pitch in each ejection hole row 5. In some embodiments, the head 2 includes only one ejection hole row 5.

The ejection hole rows 5 are substantially in parallel and are equal in length. Referring to FIG. 2, the ejection hole rows 5 are in parallel in the direction (the D2 direction) orthogonal to the direction of transfer of the printing paper P relative to the head 2. Alternatively, the ejection hole rows 5 may form an angle with the D2 direction. The ejection hole rows 5 in FIG. 2 are not equally spaced (in the D1 direction). This is for convenience of arrangement of flow paths in the head 2. In some embodiments, the ejection hole rows 5 in FIG. 2 are equally spaced.

(Head Main Body)

Figure 3:
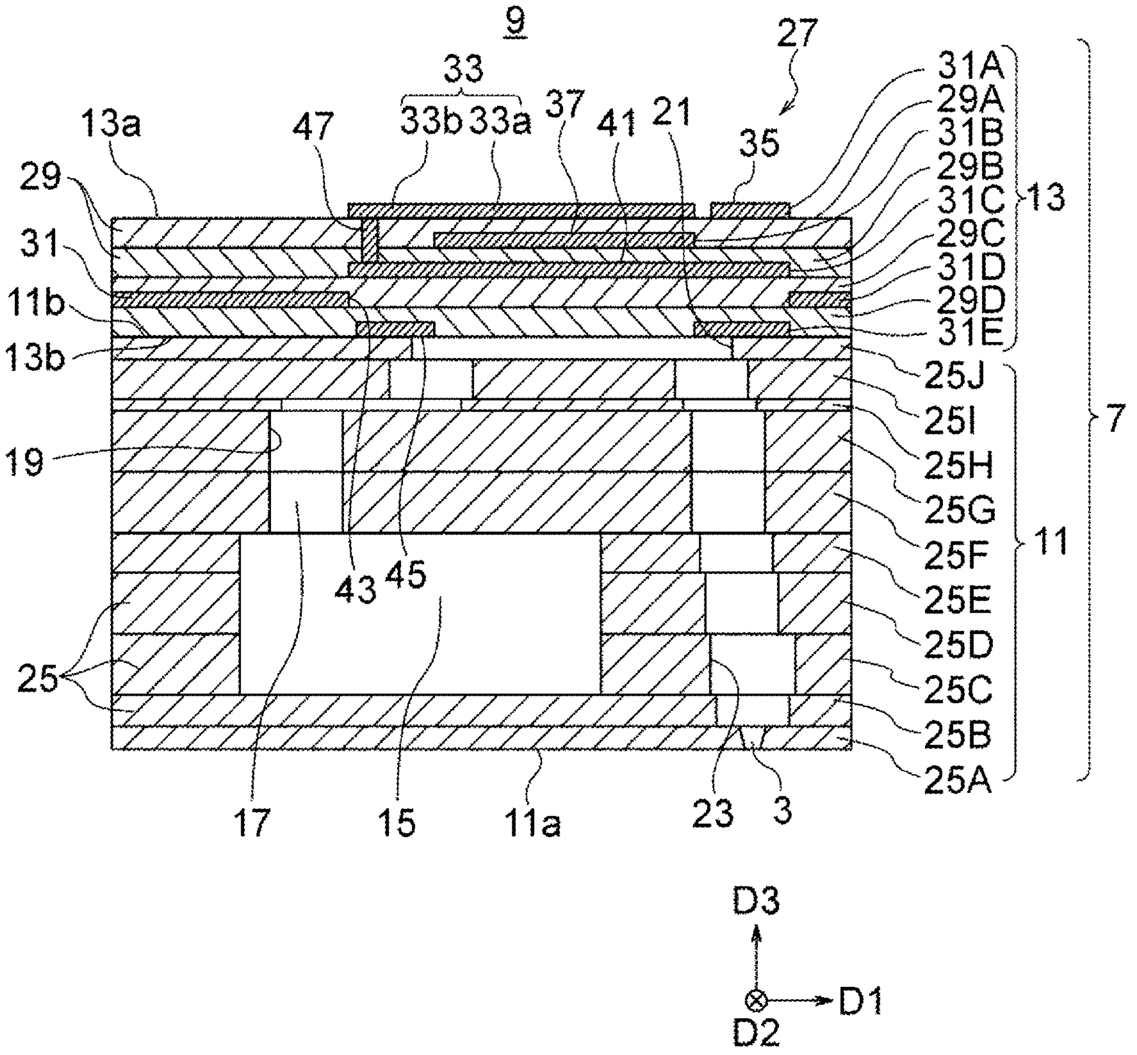
FIG. 3 is a sectional view of part of the liquid ejection head taken along line III-III in FIG. 2.

FIG. 3 is a sectional view of the head 2 taken along line III-III in FIG. 2. The printing paper P is to be located on the lower side of the drawing plane of FIG. 3. FIG. 3 mainly illustrates one ejection hole 3 and elements located therearound. A portion being part of the head 2 and including the ejection surface 11a or, more specifically, a head main body 7 (one portion closer than the other portion to the ejection surface 11a) is illustrated in FIG. 3. The head main body 7 itself may be regarded as a liquid ejection head.

The head main body 7 is a member that is substantially in the form of a plate, whose front or back surface is the ejection surface 11a. The thickness of the head main body 7 is, for example, not less than 0.5 mm and not more than 2 mm. The head main body 7 is a piezo head from which liquid is ejected in the form of droplets through application of pressure produced by the mechanical distortion of piezoelectric elements. The head main body 7 includes ejection elements 9, which have the respective ejection holes 3. The ejection elements 9 have basically the same structure. The same goes for elements relevant to the ejection elements 9 (e.g., wiring connected to the ejection elements 9). The ejection elements 9 are arranged two-dimensionally along the ejection surface 11a.

When viewed from another perspective, the head main body 7 includes a channel member 11 and a piezoelectric actuator 13. The channel member 11 is substantially in the form of a plate. The inside of the channel member 11 includes a channel through which liquid (ink) flows. The piezoelectric actuator 13 applies pressure to the liquid flowing through the channel member 11. Each ejection element 9 includes the corresponding channel member 11 and the corresponding piezoelectric actuator 13. The channel member 11 has the ejection surface 11a. The other surface of the channel member 11, that is, the surface opposite the ejection surface 11a is hereinafter referred to as a pressure applying surface 11b.

The channel member 11 includes at least one common channel 15 and discrete channels 17 therein. The discrete channels 17, one of which is illustrated in FIG. 3, are connected to the common channel 15. The discrete channels 17 are provided with the respective ejection holes 3. The discrete channels 17 are also each provided with a connection channel 19, a pressure chamber 21, and a segmented channel 23, which are arranged in this order in the direction of flow from the common channel 15 to the ejection hole 3.

The discrete channels 17 and the common channel 15 are filled with liquid. The liquid under the pressure caused by changes in the volumetric capacity of the pressure chambers 21 flows out of the pressure chambers 21 into the segmented channels 23 and is then ejected in the form of droplets through the ejection holes 3. The pressure chambers 21 are refilled with liquid that flows through the common channel 15 and is then fed into the pressure chambers 21 through the connection channels 19. The liquid in the pressure chambers 21 is subjected to pressure applied by bending and distortion of the piezoelectric actuator 13 (piezoelectric elements 27). For example, the piezoelectric actuator 13 is bent and distorted toward the pressure chambers 21, and/or the piezoelectric actuator 13 becomes flat again after being bent away from the pressure chambers 21.

The channel member 11 includes plates stacked in layers. The plates are denoted by 25A to 25J (or by 25 without the alphabets A to J). The plates 25 have holes that constitute the discrete channels 17 and the common channel 15. Although the holes are through-holes in most cases, the holes may be recesses. The thickness of each plate 25 and the number of plates 25 may be set as appropriate in accordance with, for example, the shape of the discrete channels 17 and the shape of the common channel 15. The plate 25 may be made of any desired material. For example, the plates 25 are made of metal or resin. The thickness of each plate 25 is, for example, not less than 10 μm and not more than 300 μm. The plates 25 are fixed to each other with an adhesive (not illustrated) therebetween.

(Channel Shape)

The channels in the channel member 11 each may have any specific desired shape and desired dimensions. The shape and dimension of each channel in the illustrated example are as follows.

The common channel 15 extends in the longitudinal direction of the head 2 (i.e., the direction passing through the drawing plane of FIG. 3). One or more common channels 15 may be provided. For example, the common channels 15 extend in parallel. The common channels 15 are rectangular when viewed in cross section.

The discrete channels 17 (the ejection elements 9) are aligned in the longitudinal direction of the common channels 15. The ejection holes 3 included in the discrete channels 17 are aligned along the common channels 15 accordingly. With the ejection holes 3 being arranged as illustrated in FIG. 2, two opposite sides of each common channel 15 may each be adjacent to two rows of ejection holes 3. Four common channels 15 may be provided, in which case the ejection holes 3 may be arranged in sixteen rows in total.

The pressure chambers 21 each have an opening defined in the pressure applying surface 11b and are closed with the piezoelectric actuator 13. Alternatively, the pressure chambers 21 may be closed with one of the plates 25. When viewed from another perspective, the plate 25 with which the pressure chambers 21 are closed may be regarded as part of either the channel member 11 or the piezoelectric actuator 13. The layers (plates) located on or above the top of each pressure chamber 21 are regarded as part of the piezoelectric actuator 13.

The pressure chambers 21 are geometrically identical to each other. The pressure chambers 21 may have any desired shape. For example, each of the pressure chambers 21 has a thin shape with a constant thickness and extends along the pressure applying surface 11*b*. The pressure chamber 21 may include portions of different thicknesses. The thin shape herein refers to a shape whose thickness is smaller than any diameter of the shape viewed in plan.

The diameter can be defined as the distance of a segment that is located within a planar figure and that extends across the planer figure in a manner so as to pass through its center. Unless otherwise specified, the term "center" (or "middle") of a figure viewed in plan (i.e., the center of a planar figure of interest) herein refers to the centroid. The centroid is the center of gravity of the planar figure and is the point where the geometrical moment of area relative to an axis passing through the point becomes zero.

The shape of each pressure chamber 21 viewed in plan may be a rhombus or an ellipse, whose longitudinal direction and short-side direction are orthogonal to each other. Alternatively, each pressure chamber 21 viewed in plan may have a circular shape or any other shape, where there is no distinction between the longitudinal direction and the short-side direction. The pressure chambers 21 may be arranged in any desired manner in relation to the longitudinal direction and the short-side direction. The shape of each pressure chamber 21 in the present embodiment is a combination of a circle and an ellipse as will be described later. That is, there is a distinction between the longitudinal direction and the short-side direction with regard to the shape concerned. The longitudinal direction of the pressure chambers 21 in the illustrated example is the left-and-right direction in FIG. 3. The direction concerned forms an angle with (e.g., orthogonal to) the direction in which the common channels 15 extend. When viewed from another perspective, the direction is the short-side direction of the head main body 7.

If each pressure chamber 21 is sliced along the pressure applying surface 11*b*, sections of different shapes can appear one after another in the up-and-down direction, in which case the shape of the pressure chamber 21 in the pressure applying surface 11*b* (the opening of the pressure chamber 21) viewed in plan may be herein regarded as the shape of the pressure chamber 21 viewed in plan. The reason for this is that the pressure applied to the pressure chamber 21 by the piezoelectric actuator 13 is greatly affected by the shape of the pressure chamber 21 in the pressure applying surface 11*b*.

Each segmented channel 23 extends from the corresponding pressure chamber 21 toward the ejection surface 11*a*. Each of the segmented channels 23 is substantially in the form of a circular cylinder. The segmented channel 23 in the illustrated example extends from the pressure chamber 21 toward the ejection surface 11*a* in a manner so as to form an angle with the up-and-down direction. Alternatively, the segmented channel 23 may extend with no inclination from the up-and-down direction. The cross-sectional area of the segmented channel 23 may vary from place to place in the up-and-down direction. When viewed in plan, the segmented channel 23 is connected to an end portion in a predetermined direction of the pressure chamber 21 (e.g., in the longitudinal direction of the pressure chamber 21 viewed in plan).

Each ejection hole 3 defines an opening in a bottom surface of the corresponding segmented channel 23 or, more specifically, an opening in a surface opposite the pressure chamber 21. The ejection hole 3 is substantially located at the center of the bottom surface of the segmented channel 23. Alternatively, the ejection hole 3 may be off-center in the bottom surface of the segmented channel 23. When viewed in longitudinal section, the ejection hole 3 is tapered down toward the ejection surface 11*a*. Alternatively, the ejection hole 3, in part or in whole, may be reverse tapered.

The connection channel 19 includes: a portion that extends upward from an upper surface of the common channel 15; a portion that extends along the plates 25 from the upwardly extending portion; and a portion that extends upward from the portion extending along the plates 25 and is connected to a lower surface of the pressure chamber 21. The portion extending along the plates 25 acts as flow restriction, where the cross sectional area of the portion is made smaller in the direction orthogonal to the direction of flow. When viewed in plan, the connection channel 19 is connected to an end portion of the lower surface of the pressure chamber 21 in a manner so as to be located opposite the segmented channel 23 with respect to the center of the lower surface of the pressure chamber 21.

The arrangement of the pressure chambers 21 may be understood as substantially analogous to the arrangement of the ejection holes 3 described above with reference to FIG. 2. In some embodiments, the arrangement of the pressure chambers 21 is not analogous to the arrangement of the ejection holes 3. For example, the segmented channels 23 may have different shapes, which can cause a difference between the arrangement of the pressure chambers 21 and the arrangement of the ejection holes 3. Unlike the ejection holes 3 in FIG. 3, the pressure chambers 21 may be arranged uniformly in both the D1 direction and the D2 direction (with a constant pitch between rows of the pressure chambers 21). The rows of the pressure chambers 21 may be fewer than the ejection hole rows 5.

(Shape of Pressure Chamber Viewed in Plan)

Figure 4:
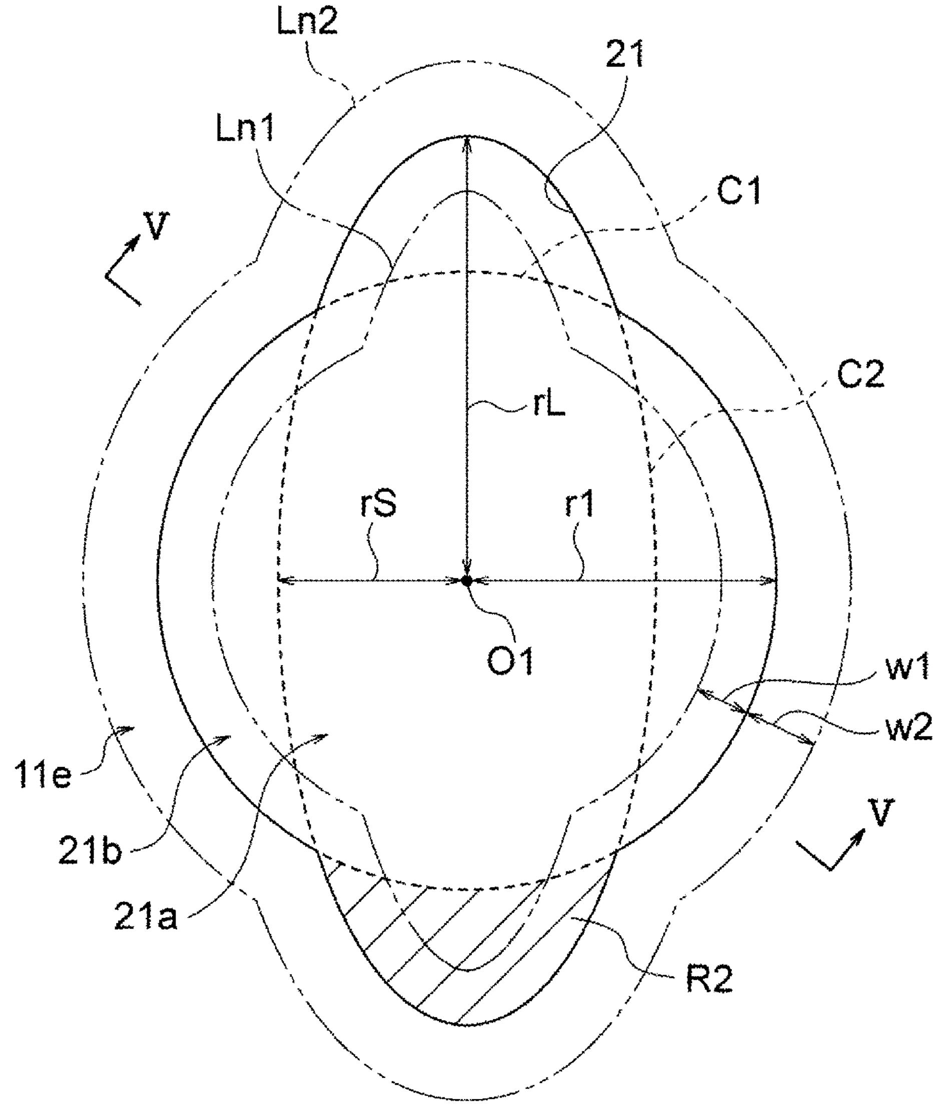
FIG. 4 is a plan view of a pressure chamber of the liquid ejection head according to the first embodiment.

FIG. 4 is a plan view of the pressure chamber 21. The pressure chamber 21 is denoted by a solid line.

The shape of the pressure chamber 21 viewed plan is a combination of a region defined by a circle C1 and regions R2. The regions R2, one of which is hatched, protrude from the circle C1 to the respective sides in a predetermined direction (the up-and-down direction of the drawing plane). The regions R2 are each defined by two peripheries, one of which is opposite the circle C1 and is curved outward. The periphery is denoted by a solid line. For example, the curvature of the curve (the mean value of the curvature for the case in which the curve is a line of inconstant curvature) is greater than the curvature of the circle C1.

The shape of the pressure chamber 21 viewed in plan can be regarded as a combination of an overlap between the circle C1 and an ellipse C2 (the region enclosed with a dotted line) and regions (each being enclosed with a solid line and a dotted line) that do not overlap each other. When the circle C1 and the ellipse C2 are regarded as closed curves in a Venn diagram, the shape of the pressure chamber 21 viewed in plan is the union (logical disjunction) of the circular region and the elliptic region.

More specifically, the center of the circle C1 coincides with the center of the ellipse C2 (see the center denoted by O1). The major axis of the ellipse C2 is longer than the radius of the circle C1; that is, rL is longer than r1. The minor axis of the ellipse C2 is shorter than the radius of the circle C1; that is, rS is shorter than r1. The regions R2 on the respective sides in the longitudinal direction of the ellipse C2 are located outside the circle C1.

The curvature of the periphery of each region R2 opposite the circle C1 (the periphery denoted by a solid line) may be constant. In other words, it is not required that the regions R2 be regarded as both ends of an ellipse, and each region R2 may be regarded as part of a circle whose radius is smaller than the radius of the circle C1.

The dimensions of these shapes (e.g., relative lengths of the radius r1, the major axis rL, and the minor axis rS) may be set to desired values. Specific examples are as follows. The major axis rL is not less than 1.2 times the radius r1 and not more than 1.8 times the radius r1. The curvature radius derived from the mean value of the curvature of the periphery of each region R2 opposite the circle C1 is not less than 0.3 times the radius r1 and not more than 0.6 times the radius r1.

The periphery of the pressure chamber 21 having the shape described above is mostly (or entirely) arc-shaped. For example, the periphery of the pressure chamber 21 includes a circular arc that subtends an angle of 180° or more at the center of the pressure chamber 21.

The terms "midsection" and "peripheral section" are hereinafter used in relation to the pressure chamber 21. The pressure chamber 21 has a midsection 21*a*. Referring to FIG. 4, the outer edge of the midsection 21*a* is denoted by the dash-dot-dot line Ln1. When viewed in plan, the center O1 of the pressure chamber 21 is located in the midsection 21*a*, and the periphery of the pressure chamber 21 is farther than the outer edge of the midsection 21*a* from the center O1. The pressure chamber 21 has a peripheral section 21*b*. Referring to FIG. 4, the inner edge of the peripheral section 21*b* is denoted by the dash-dot-dot line Ln1, and the outer edge of the peripheral section 21*b* coincides with the solid line denoting the periphery of the pressure chamber 21. When viewed in plan, the peripheral section 21*b* touches (essentially the entirety of) the periphery of the pressure chamber 21 and is located away from the center of the pressure chamber 21.

The midsection 21*a* and the peripheral section 21*b* may be defined as follows: the outer edge of the midsection 21*a* and the inner edge of the peripheral section 21*b* are discretely located away from each other. Alternatively, the outer edge of the midsection 21*a* and the inner edge of the peripheral section 21*b* may coincide with each other. Still alternatively, the peripheral portion of the midsection 21*a* and the inner edge portion of the peripheral section 21*b* may overlap each other. For convenience, embodiments will be described in which the midsection 21*a* and the peripheral section 21*b* are defined in such that the outer edge of the midsection 21*a* and the inner edge of the peripheral section 21*b* coincide with each other.

The midsection 21*a* and the peripheral section 21*b* each may have any desired shape and desired dimensions when viewed in plan. For convenience, the position and dimensions of the midsection 21*a* and the position and dimensions of the peripheral section 21*b* may be herein used as a reference against which to compare the positions and dimensions of modules or members that will be described later (e.g., various kinds of electrodes that will be described later). The converse of the above is possible for actual product design, where the positions and dimensions of the modules or members may be used as a reference for specifying the position and dimensions of the midsection 21*a* and the position and dimensions of the peripheral section 21*b*. Thus, the shape and dimensions of the midsection 21*a* and the shape and dimensions of the peripheral section 21*b* may be understood by analogy to the shapes and dimensions of the modules or members that will be described later.

The region whose inner edge is the periphery of the pressure chamber 21 and whose outer edge is denoted by a dash-dot-dot line Ln2 in FIG. 4 may be hereinafter referred to as an outer region 11*e* located outside the pressure chamber 21. Although a region in which the pressure chamber 21 is not located may be regarded as an outer region (located outside the pressure chamber 21) in a broader sense, adjacent areas of the pressure chamber 21 may be hereinafter specifically referred to as the outer region 11*e*. Thus, the shape and dimensions of the outer region 11*e* may be understood by analogy to the shapes and dimensions of the modules or members that will be described later.

(Piezoelectric Actuator)

Referring back to FIG. 3, the piezoelectric actuator 13 is substantially in the form of a flat plate and is large enough to extend across all of the pressure chambers 21. The piezoelectric actuator 13 has a first surface 13*a* and a second surface 13*b*, which are a front surface and a back surface respectively of the plate-like shape. In the present embodiment, the first surface 13*a* is located opposite the channel member 11, and the second surface 13*b* is closer than the first surface 13*a* to the channel member 11. The piezoelectric actuator 13 includes piezoelectric elements 27, each of which applies pressure to the corresponding one of the ejection elements 9 (the corresponding one of the pressure chambers 21). The piezoelectric elements 27 of the piezoelectric actuator 13 are arranged along the first surface 13*a*.

The piezoelectric actuator 13 includes two or more members extending along the second surface 13*b* and stacked in layers. Specifically, the piezoelectric actuator 13 includes first to fourth piezoelectric layers, which are denoted by 29A to 29D and are hereinafter also simply referred to as piezoelectric layers 29. The first to fourth piezoelectric layers (the piezoelectric layers 29A to 29D) are arranged in this order from closest to the first surface 13*a* (i.e., in order farthest from the second surface 13*b*). The piezoelectric actuator 13 also includes first to fifth conductor layers, which are denoted by 31A to 31E and are hereinafter also simply referred to as conductor layers 31. The first to fifth conductor layers (the conductor layers 31A to 31E) are located on or between the piezoelectric layers 29 and are arranged in this order from the closest to the first surface 13*a* (i.e., in this order from the farthest from the second surface 13*b*). The piezoelectric actuator 13 may include an insulating layer (not illustrated) that covers the first conductor layer 31A. For example, the insulating layer is a solder resist.

The piezoelectric layers 29 extend over the pressure chambers 21 (the piezoelectric elements 27) substantially with no gap between one part and another part of each piezoelectric layer 29. The term "substantially" implies that through-conductors may extend through the piezoelectric layer 29 (insulating layer) to form a connection between the conductor layers. The same applies hereinafter. The through-conductors will be described later. The conductor layers 31 have any desired planar shape. For example, the conductor layers 31 include electrodes, each of which is provided for the corresponding one of the pressure chambers 21, as will be described later.

(Overview of Working Principle of Piezoelectric Actuator)

Figure 5:
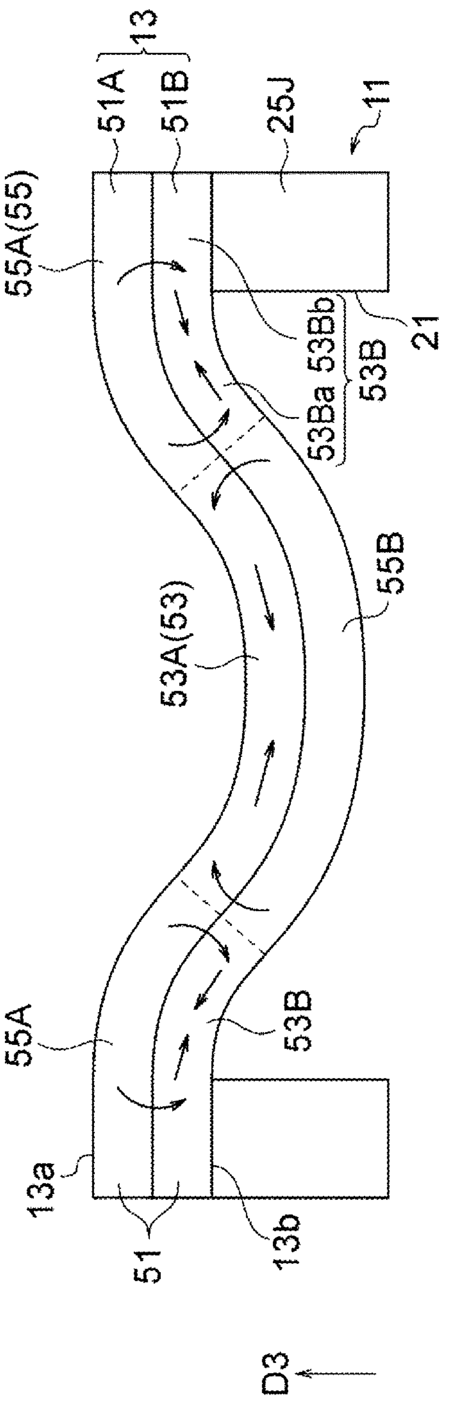
FIG. 5 is a schematic sectional view of part of the liquid ejection head according to the first embodiment, illustrating a piezoelectric actuator and an upper part of a channel member.

FIG. 5 is a schematic sectional view of the piezoelectric actuator 13 and an upper part of the channel member 11 (the plate 25J). The section illustrated in FIG. 5 and the section illustrated in FIG. 3 (i.e., the section taken along line III-III in FIG. 2) are oriented in different directions. For example, FIG. 5 illustrates a section taken along line V-V in FIG. 4. Hatching lines for indicating a cut surface are not drawn in FIG. 5. In the state illustrated in FIG. 5, the piezoelectric actuator 13 is bent due to an electric field applied to a first active region 53A and a second active region 53B, as will be described later. Without an application of an electric field, the piezoelectric actuator 13 is substantially flat.

The first piezoelectric layer 29A and the second piezoelectric layer 29B in FIG. 3 are regarded (illustrated) as a primary piezoelectric layer 51A (see FIG. 5). The third piezoelectric layer 29C and the fourth piezoelectric layer 29D in FIG. 3 are regarded (illustrated) as a secondary piezoelectric layer 51B (see FIG. 5). The primary piezoelectric layer 51A and the secondary piezoelectric layer 51B are simply referred to as piezoelectric layers 51 when there is no need to distinguish one from another.

Figure 6:
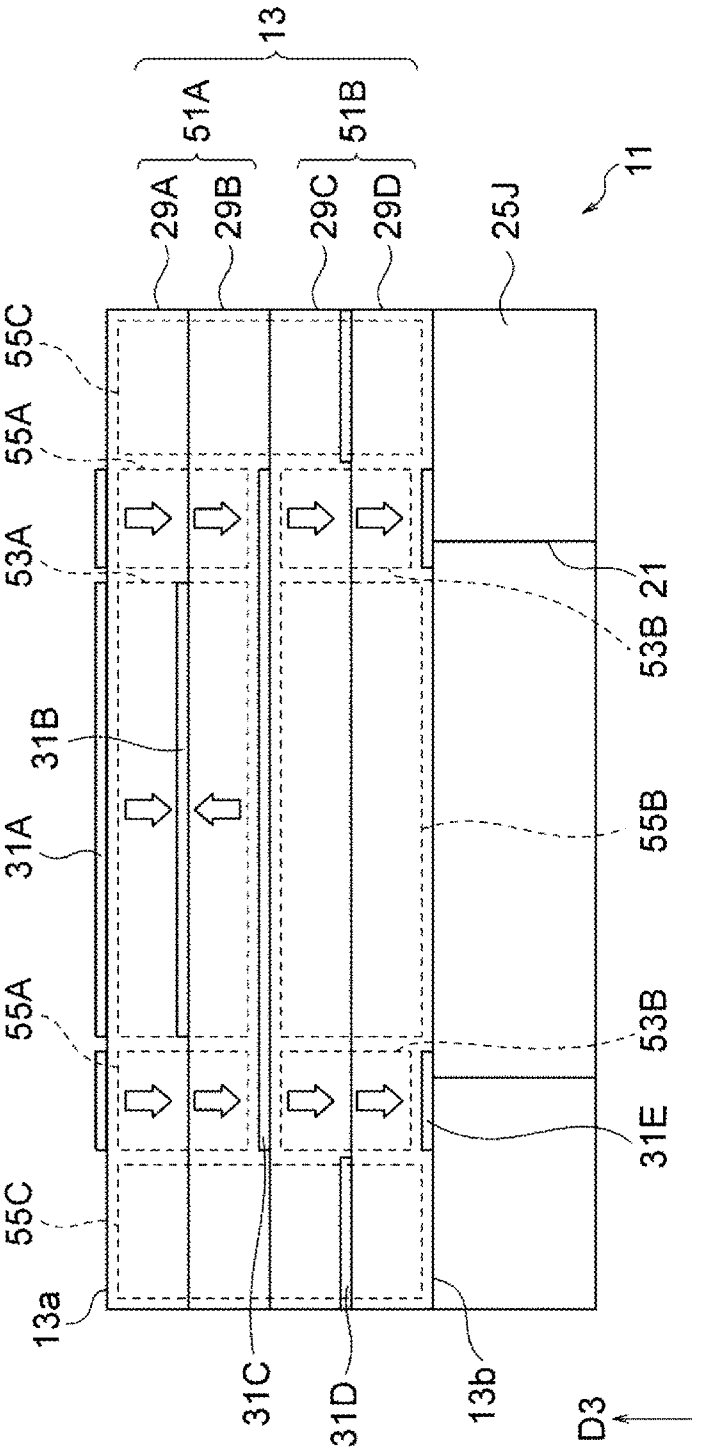
FIG. 6 is a schematic sectional view of the piezoelectric actuator in the first embodiment, illustrating polarization directions of piezoelectric layers.

The piezoelectric layers 51 each include active regions 53 (53A and 53B) and inactive regions 55 (55A to 55C) (see FIG. 6 for the location of the inactive region 55C). When liquid droplets are ejected, the active regions 53 are activated, whereas the inactive regions 55 are not activated. The active regions 53 are polarized regions, and an electric field is applied to the active regions 53 in the polarization direction or in the direction opposite the polarization direction when liquid droplets are ejected. The inactive regions 55 are unpolarized regions, and/or an electric field is applied neither in the polarization direction nor in the direction opposite the polarization direction when liquid droplets are ejected. The polarized regions are areas in which the direction of spontaneous polarization is made somewhat uniform by poling process.

More specifically, the primary piezoelectric layer 51A includes the first active region 53A and a first inactive region 55A, which are adjacent to each other. The first active region 53A extends over the midsection 21*a* of the pressure chamber 21 in a see-through plan view. The first inactive region 55A is on the outer side with respect to the first active region 53A. The secondary piezoelectric layer 51B includes a second inactive region 55B and the second active region 53B, which are adjacent to each other. The second inactive region 55B extends over the midsection 21*a* of the pressure chamber 21 in a see-through plan view. The second active region 53B is on the outer side with respect to the second inactive region 55B. When viewed from another perspective, the first inactive region 55A and the second active region 53B extend over the peripheral section 21*b* of the pressure chamber 21 and the outer region 11*e* located outside the pressure chamber 21 in a see-through plan view.

The polarization direction of the first active region 53A is the thickness direction (i.e., the D3 direction). When an electric field is applied to the first active region 53A in the direction that coincides with the polarization direction, the first active region 53A contracts along the surface. The direction of contract is denoted by arrows in FIG. 5. The term "electric field" may be read as voltage. The same applies hereinafter. Meanwhile, the second inactive region 55B does not contract. As a result, the first active region 53A and the second inactive region 55B as a whole, like a bimetal, undergo bending and deformation. As denoted by arrows on both ends of the portion concerned, these regions are bent toward the pressure chamber 21.

The polarization direction of the second active region 53B is the thickness direction (i.e., the D3 direction). When an electric field is applied to the second active region 53B in the direction that coincides with the polarization direction, the second active region 53B contracts along the surface. The direction of contract is denoted by arrows in FIG. 5. Meanwhile, the first inactive region 55A does not contract. As a result, the second active region 53B and the first inactive region 55A as a whole, like a bimetal, undergo bending and deformation. As illustrated in FIG. 5, these regions are bent toward the pressure chamber 21 (see FIG. 5).

The second active region 53B and the first inactive region 55A include the respective portions that are located outside the pressure chamber 21 and joined to the plate 25J. The portions are thus restrained from undergoing bending and deformation. One of the portions that belongs to the second active region 53B may also be referred to as a second portion 53Bb. The other portion of the second active region 53B and the other portion of the first inactive region 55A overlap the pressure chamber 21. One of the portions that belongs to the second active region 53B may be referred to as a first portion 53Ba. When the second active region 53B and the first inactive region 55A undergo bending and deformation in a manner so as to be bowed toward the pressure chamber 21, the portions concerned act as cantilevers and are bent toward the pressure chamber 21 as illustrated in FIG. 5. Consequently, the first active region 53A and the second inactive region 55B undergo displacement toward the pressure chamber 21.

The application of an electric field to the first active region 53A in the polarization direction and the application of an electric field to the second active region 53B in the polarization direction cause the central position of the first active region 53A to shift further toward the pressure chamber 21 than would be possible by the application of an electric field to only the first active region 53A in the polarization direction. Consequently, the volumetric capacity of the pressure chamber 21 is further decreased. Conversely, the volumetric capacity of the pressure chamber 21 may be increased in the following manner: an electric field is applied to the first active region 53A in the direction opposite the polarization direction, and an electric field is applied to the second active region 53B in the direction opposite the polarization direction, in which case the first active region 53A and the second active region 53B expand along the surface. Consequently, the central position of the first active region 53A undergoes a larger displacement, and the volumetric capacity of the pressure chamber is further increased accordingly.

A neutral plane that may be defined in relation to the flexural rigidity of the piezoelectric actuator 13 may be located at any desired position in the thickness direction. For example, the neutral plane is substantially in the interface between the primary piezoelectric layer 51A and the secondary piezoelectric layer 51B. The allowable distance between the interface and the neutral plane may be less than ¼ of the thickness of the primary piezoelectric layer 51A or the secondary piezoelectric layer 51B, whichever is thinner.

(Shapes of Active Regions and Inactive Regions Viewed in Plan)

The shape of each active region 53 is not necessarily uniform throughout in the thickness direction (i.e., the D3 direction) when the piezoelectric actuator has a specific structure. As will be mentioned below, the first piezoelectric layer 29A and the second piezoelectric layer 29B that are included in the first active region 53A in the present embodiment may have different shapes when viewed in plan. In the following example, the shape of each active region 53 (or each inactive regions 55) viewed in plan is substantially uniform throughout in the thickness direction. In another example (not illustrated), the shape of each active region 53 (or each inactive region 55) viewed in plan is not uniform throughout in the thickness direction. In such a case, the following description about the planar shape is applicable to the planar shape at any position in the thickness direction, such as the planar shape with the smallest area in a see-through plan view.

In a see-through plan view, the first inactive region 55A and/or the second active region 53B surrounds the first active region 53A and/or the second inactive region 55B. More specifically, the first inactive region 55A and/or the second active region 53B extends all along the periphery of the first active region 53A and/or the periphery of the second inactive region 55B. In some embodiments, the first inactive region 55A and/or the second active region 53B extends along only part of the periphery of the first active region 53A and/or part of the periphery of the second inactive region 55B. For example, the angle subtended by the first inactive region 55A and/or the second active region 53B at the center of the first active region 53A and/or the second inactive region 55B is not less than 270° and not more than 360°.

In a see-through plan view, (the outer edge portion of) the first active region 53A and (the inner edge portion of) the second active region 53B may be discretely located away from each other, may be adjacent to each other (as in the illustrated example), or may overlap each other. When viewed from another perspective, the first active region 53A and the second inactive region 55B on the inner side with respect to the second active region 53B have the same shape and are equal in dimension (as in the illustrated example), or the first active region 53A and the second inactive region 55B have different shapes and are not equal in dimension. Likewise, the first inactive region 55A on the outer side with respect to the first active region 53A and the second active region 53B have the same shape and are equal in dimension (as in the illustrated example), or the first inactive region 55A and the second active region 53B have different shapes and are not equal in dimension.

For convenience, the midsection 21*a* of the pressure chamber 21 in the present embodiment is defined such that the outer edge of the first active region 53A and the outer edge of the midsection 21*a* of the pressure chamber 21 coincide with each other. For convenience, the midsection 21*a* and the peripheral section 21*b* in the present embodiment are defined in such that they are adjacent to each other, as mentioned above. Thus, the first active region 53A does not overlap the peripheral section 21*b* of the pressure chamber 21. The second active region 53B extends over at least the outer edge portion or the entirety of the peripheral section 21*b* and does not extend over the center or the entirety of the midsection 21*a*. As mentioned above, the outer edge portion of the first active region 53A and the inner edge portion of the second active region 53B may be located with or without an overlap therebetween. Thus, the second active region 53B may extend over the peripheral section 21*b* except for the inner edge portion thereof, may extend over the entirety of the peripheral section 21*b* (as in the illustrated example), or may extend over the peripheral section 21*b* and the peripheral portion of the midsection 21*a*.

The first active region 53A may have any desired planar shape and desired dimensions (see the shape and the dimensions of the midsection 21*a* in FIG. 4). The planar shape of the first active region 53A may be geometrically similar to the planar shape of the pressure chamber 21 (as in the illustrated example) or may be geometrically different from the planar shape of the pressure chamber 21. In either case, the planar shape of the first active region 53A may be understood as analogous to the planar shape of the pressure chamber 21. In a see-through plan view, the center of the first active region 53A may be substantially in positional agreement with the center of the pressure chamber 21 (as in the illustrated example), or the center of the first active region 53A may be off the center of the pressure chamber 21.

The first active region 53A viewed in plan may have any desired size. In a see-through plan view, the proportion of the area of the first active region 53A in the area of the pressure chamber 21 is not less than 40% or not less than 50% and is not more than 70% or not more than 80%. Any desired combination of these lower and upper limits may be applied. For example, the proportion is not less than 50% and not more than 70%. The diameter of the first active region 53A is not less than 0.6 times or not less than 0.7 times the diameter of the pressure chamber 21 and is not more than 0.9 times the diameter of the pressure chamber 21, where the diameters are measured in the same direction. Any desired combination of these lower and upper limits may be applied. In a case where the first active region 53A and the pressure chamber 21 are not circular in cross section, the word "diameter" may be read as "equivalent circle diameter".

The second active region 53B may have any desired planar shape and desired dimensions (see the shape and the dimensions of an annular region defined by the dash-dot-dot line Ln1 and the dash-dot-dot line Ln2 in FIG. 4). When viewed in plan, the second active region 53B is an annular region with which the first active region 53A is surrounded. The term "annular" does not necessarily mean that the region is circular or elliptic. For example, the inner edge and/or the outer edge of the annular region may be uneven and/or may be polygonal (e.g., rectangular).

The inner edge and/or the outer edge of the second active region 53B may be geometrically similar to the planar shape of the pressure chamber 21 and/or the planar shape of the first active region 53A (as in the illustrated example) or may be geometrically different from the planar shape of the pressure chamber 21 and/or the planar shape of the first active region 53A. In either case, the inner edge and the outer edge of the second active region 53B may be understood as analogous to the planar shape of the pressure chamber 21. In a see-through plan view, the center of the shape defined by the outer edge of the second active region 53B may be substantially in the positional agreement with the center of the pressure chamber 21 and/or the center of the first active region 53A (as in the illustrated example), or the center of the shape defined by the outer edge of the second active region 53B may be off the center of the pressure chamber 21 and/or the center of the first active region 53A.

In a see-through plan view, the outer edge of the first active region 53A and the inner edge of the second active region 53B may be located with any desired distance therebetween. For example, the distance is not less than 10% or not less than 5% of the diameter (e.g., the minimum diameter, the maximum diameter, or the equivalent circle diameter) of the first active region 53A. The upper limit value is applicable to both of the following cases: (i) the outer edge of the first active region 53A is located on the inner side with respect to the inner edge of the second active region 53B; and (ii) the outer edge of the first active region 53A is located on the outer side with respect to the inner edge of the second active region 53B.

The outer edge of the second active region 53B may be located at any desired distance from the periphery of the pressure chamber 21. For example, the distance is not less than 1/20, 1/10, or 1/5 of the diameter (e.g., the minimum diameter, the maximum diameter, or the equivalent circle diameter) of the pressure chamber 21. The distance is not more than the diameter of the pressure chamber 21 or is not more than 1/2, 1/3, or 1/5 of the diameter of the pressure chamber 21. Any desired combination of these lower and upper limits may be applied unless there is a contradiction between them. The diameter of the pressure chamber 21 may be equal to or greater than 200 μm and equal to or less than 400 μm, in which case the distance between the periphery of the pressure chamber 21 and the outer edge of the second active region 53B may be equal to or greater than 50 μm and equal to or less than 200 μm.

Referring to FIG. 4, w1 may be greater or less than w2, where w1 denotes the distance between the periphery of the pressure chamber 21 and the inner edge of the second active region 53B, and w2 denotes the distance between the periphery of the pressure chamber 21 and the outer edge of the second active region 53B. The distance w1 may also be regarded as the width of the first portion 53Ba, which is part of the second active region 53B and extends over part of the pressure chamber 21. The distance w2 may also be regarded as the width of the second portion 53Bb, which is part of the second active region 53B and is located outside the pressure chamber 21. Although the distances w1 and w2 are defined as above in relation to the plan view, a comparison of the distance w1 and the distance w2 may be made on a (cross-) section (see FIG. 3) passing through the center of the pressure chamber 21 and orthogonal to the pressure applying surface 11*b*.

In the present embodiment, the distance w1 is shorter than the distance w2. The region in which the distance w1 is shorter than the distance w2 may extend all along the second active region 53B in the circumferential direction or mostly along the second active region 53B in the circumferential direction. Both of these cases may be herein construed as examples of the state in which the distance w1 is shorter than the distance w2. What is suggested here is that the second active region 53B may include a portion having distinguishing characteristics arising from the shape of the pressure chamber 21 or the shape of wiring for proving potential to electrodes. When the region concerned extends mostly along the second active region 53B in the circumferential direction, the angle subtended at the center of the pressure chamber 21 by the region is not less than 270°, not less 300°, or not less than 330°. With the distance w1 being shorter than the distance w2, the ratio of the distance w1 to the distance w2 may be set to any desired value. For example, the distance w1 is not more than 0.9 times, not more than 0.8 times, or not more than 0.7 times the distance w2.

In a see-through plan view, the area of the first portion 53Ba may be greater or less than the area of the second portion 53Bb, where the first portion 53Ba is part of the second active region 53B and extends over part of the pressure chamber 21, and the second portion 53Bb is part of the second active region 53B and is located outside the pressure chamber 21. In the present embodiment, the area of the first portion 53Ba is less than the area of the second portion 53Bb. The ratio of the area of the first portion 53Ba to the area of the second portion 53Bb may be set to any desired value. For example, the area of the first portion 53Ba is not more than 0.9 times, not more than 0.8 times, or not more than 0.7 times the area of the second portion 53Bb.

In a case where the shape of the first portion 53Ba and the shape of the second portion 53Bb are similar figures, the second portion 53Bb is located on the outer side with respect to the first portion 53Ba. The second portion 53Bb is therefore longer in the circumferential direction than the first portion 53Ba. When the distance w1 is equal to the distance w2, the area of the first portion 53Ba is less than the area of the second portion 53Bb. This suggests that there is a possible case (not illustrated) in which the area of the first portion 53Ba is less than the area of the second portion 53Bb when the distance w1 is greater than the distance w2.

As for products introduced on the market, the difference between the area of the first portion 53Ba and the area of the second portion 53Bb and the difference between the distance w1 and the distance w2 each may be measured by any desired means. For example, X-ray computed tomography (CT) may be employed to measure the area of each electrode and the misalignment between the electrode and the pressure chamber 21 without the need to disassemble the head main body 7. The area of the first portion 53Ba, the area of the second portion 53Bb, the distance w1, and the distance w2 may be measured accordingly.

Alternatively, sections obtained by cutting the head main body 7 may be observed under an electron microscope to measure the area of each electrode and the misalignment between the electrode and the pressure chamber 21. The area of the first portion 53Ba, the area of the second portion 53Bb, the distance w1, and the distance w2 may be measured accordingly.

The first inactive region 55A may be defined as a region being part of the primary piezoelectric layer 51A and extending over the second active region 53B in a see-through plan view, where the first inactive region 55A does not overlap the first active region 53A in the primary piezoelectric layer 51A. Thus, the inner edge of the first inactive region 55A coincides with the outer edge of the first active region 53A, and the outer edge of the first inactive region 55A coincides with the outer edge of the second active region 53B. In the present embodiment, the outer edge of the first active region 53A and the inner edge of the second active region 53B substantially coincide with each other in a see-through plan view. Thus, the first inactive region 55A and the second active region 53B have substantially the same shape and are substantially equal in dimension when viewed in plan.

The second inactive region 55B may be defined as a region being part of the secondary piezoelectric layer 51B and extending over the pressure chamber 21, where the second inactive region 55B does not overlap the second active region 53B in the secondary piezoelectric layer 51B. In a case where the second active region 53B is annular, the second inactive region 55B is surrounded with the second active region 53B, and the outer edge of the second inactive region 55B coincides with the inner edge of the second active region 53B.

(Piezoelectric Layers)

Referring back to FIG. 3, the piezoelectric layers 29 may each be made of a ferroelectric ceramic material. Examples of the ceramic material include lead zirconate titanate (PZT) materials, NaNbO3 materials, BaTiO3 materials, (BiNa) TiO3 materials, and BiNaNb5015 materials. It is not required that the piezoelectric layers 29 be made of a ceramic material. The piezoelectric layers 29 may each be made of a single-crystal material, a polycrystalline material, an inorganic material, an organic material, a ferroelectric material, a nonferroelectric material, a pyroelectric material, or a nonpyroelectric material. The piezoelectric layers 29 may be made of the same material or different materials.

The piezoelectric layers 29 each have a substantially constant thickness and extend substantially in a planar fashion. In other words, each piezoelectric layer 29 is in the form of a flat plate. Each piezoelectric layer 29 is substantially equal in area to the piezoelectric actuator 13. The piezoelectric layers 29 may each have any desired thickness. The piezoelectric layers 29 may have the same thickness (as in the illustrated example) or may have different thicknesses.

For example, the thickness of each piezoelectric layer 29 is not less than 10 μm and not more than 40 μm.

In the illustrated example, the piezoelectric layers 29 have the same thickness. When viewed from another perspective, the sum of the thickness of the third piezoelectric layer 29C and the thickness of the fourth piezoelectric layer 29D is greater than the thickness of the first piezoelectric layer 29A and is also greater than the thickness of the second piezoelectric layer 29B. The piezoelectric layers 29 may have different thicknesses, as long as this relation holds. With regard to two or more of the piezoelectric layers 29 of the same thickness, there may exist a thickness difference that falls within allowable tolerances. The same holds for the thickness of the conductor layers 31.

FIG. 6 is a schematic sectional view and illustrates polarization directions of the piezoelectric layers 29. As with FIG. 5, FIG. 6 illustrates a section taken along line V-V in FIG. 4. The polarization directions are indicated by hollow arrows. Hatching lines for indicating a cut surface are not drawn in FIG. 6.

The piezoelectric actuator 13 includes the first active region 53A, the second active region 53B, the first inactive region 55A, and the second inactive region 55B, which have been described above and are denoted by dotted lines. A region extending across the first to fourth piezoelectric layers (denoted by 29A to 29D) and located outside the first inactive region 55A and the second active region 53B is hereinafter referred to as a third inactive region 55C.

In the first active region 53A, the first piezoelectric layer 29A and the second piezoelectric layer 29B are polarized in opposite directions. When electric fields are applied to the first piezoelectric layer 29A and the second piezoelectric layer 29B in the first active region 53A in opposite directions, the first piezoelectric layer 29A and the second piezoelectric layer 29B contract in conjunction with each other (see FIG. 5) or expand in conjunction with each other.

In the first active region 53A, one of the first piezoelectric layer 29A and the second piezoelectric layer 29B is polarized in the +D3 direction, and the other is polarized the −D3 direction. The first piezoelectric layer 29A and the second piezoelectric layer 29B in the present embodiment are polarized in the −D3 direction and the +D3 direction, respectively.

In the second active region 53B, the third piezoelectric layer 29C and the fourth piezoelectric layer 29D are polarized in the same direction. When subjected to application of the same electric field, the third piezoelectric layer 29C and the fourth piezoelectric layer 29D in the second active region 53B contract in conjunction with each other (see FIG. 5) or expand in conjunction with each other.

The second active region 53B is polarized in the +D3 direction or the −D3 direction. The polarization direction of the second active region 53B coincides with the polarization direction of the first piezoelectric layer 29A or the second piezoelectric layer 29B in the first active region 53A. In the present embodiment, the polarization direction of the second active region 53B coincides with the polarization direction of the first piezoelectric layer 29A in the first active region 53A.

The inactive regions 55 (55A to 55C) may be polarized or unpolarized. In the illustrated example, the first inactive region 55A is polarized, whereas the second inactive region 55B and the third inactive region 55C are unpolarized.

The first inactive region 55A is polarized in the thickness direction (i.e., the D3 direction). The first inactive region 55A is polarized in either the +D3 direction or the −D3 direction, whichever is desired in relation to the polarization direction of the first active region 53A and the polarization direction of the second active region 53B. For example, the first inactive region 55A and the second active region 53B may be polarized in the same direction or in opposite directions. In the present embodiment, the polarization direction of the first inactive region 55A coincides with the polarization direction of the second active region 53B.

(Conductor Layers)

Referring back to FIG. 3, the conductor layers are arranged as follows. The first conductor layer 31A is located on an upper surface of the first piezoelectric layer 29A. The second conductor layer 31B is located between the first piezoelectric layer 29A and the second piezoelectric layer 29B. The third conductor layer 31C is located between the second piezoelectric layer 29B and the third piezoelectric layer 29C. The fourth conductor layer 31D is located between the third piezoelectric layer 29C and the fourth piezoelectric layer 29D. The fifth conductor layer 31E is located between the fourth piezoelectric layer 29D and the channel member 11 (the plate 25J).

The conductor layers 31 may each be made of any desired metal. Examples of the metal include alloys of Ag and Pd and alloys of Au. The conductor layers 31 may be made of the same material or different materials. Each conductor layer 31 may be a monolithic layer of a single material or may include layers made of different materials and arranged in a stack. Each conductor layer 31 has no variation in material in the planar direction. Alternatively, each conductor layer 31 may include portions made of the respective materials.

The conductor layers 31 each have a substantially constant thickness and extend substantially in a planar fashion. The conductor layers 31 may each have any desired thickness. The conductor layers 31 may have the same thickness or may have different thicknesses. Each conductor layer 31 may be thinner than each piezoelectric layer 29. For example, the thickness of each conductor layer 31 is not less than 0.5 μm and not more than 3 μm.

(Shape of Conductor Layers)

Figure 7:
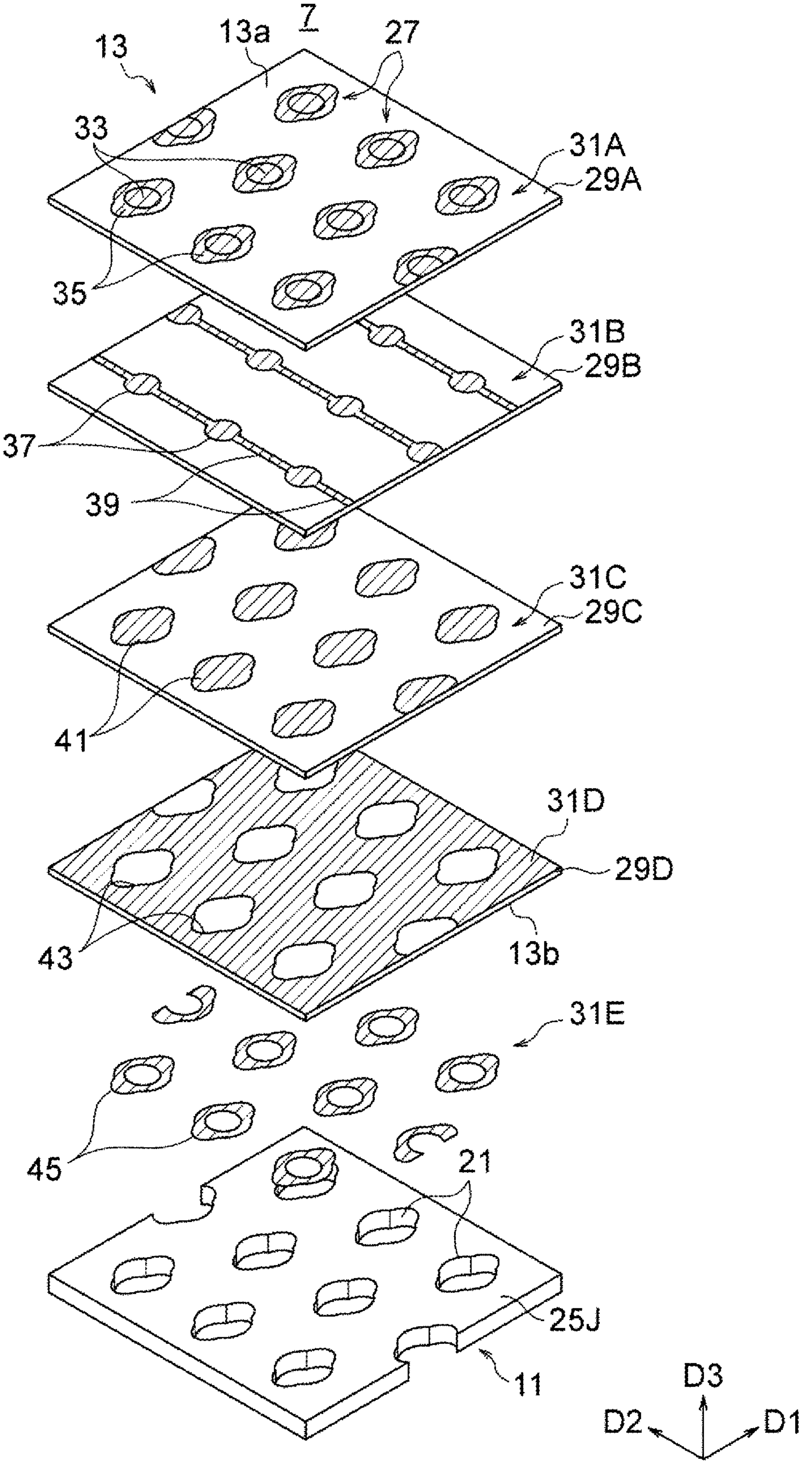
FIG. 7 is an exploded perspective view of part of the liquid ejection head according to the first embodiment.
Figure 8:
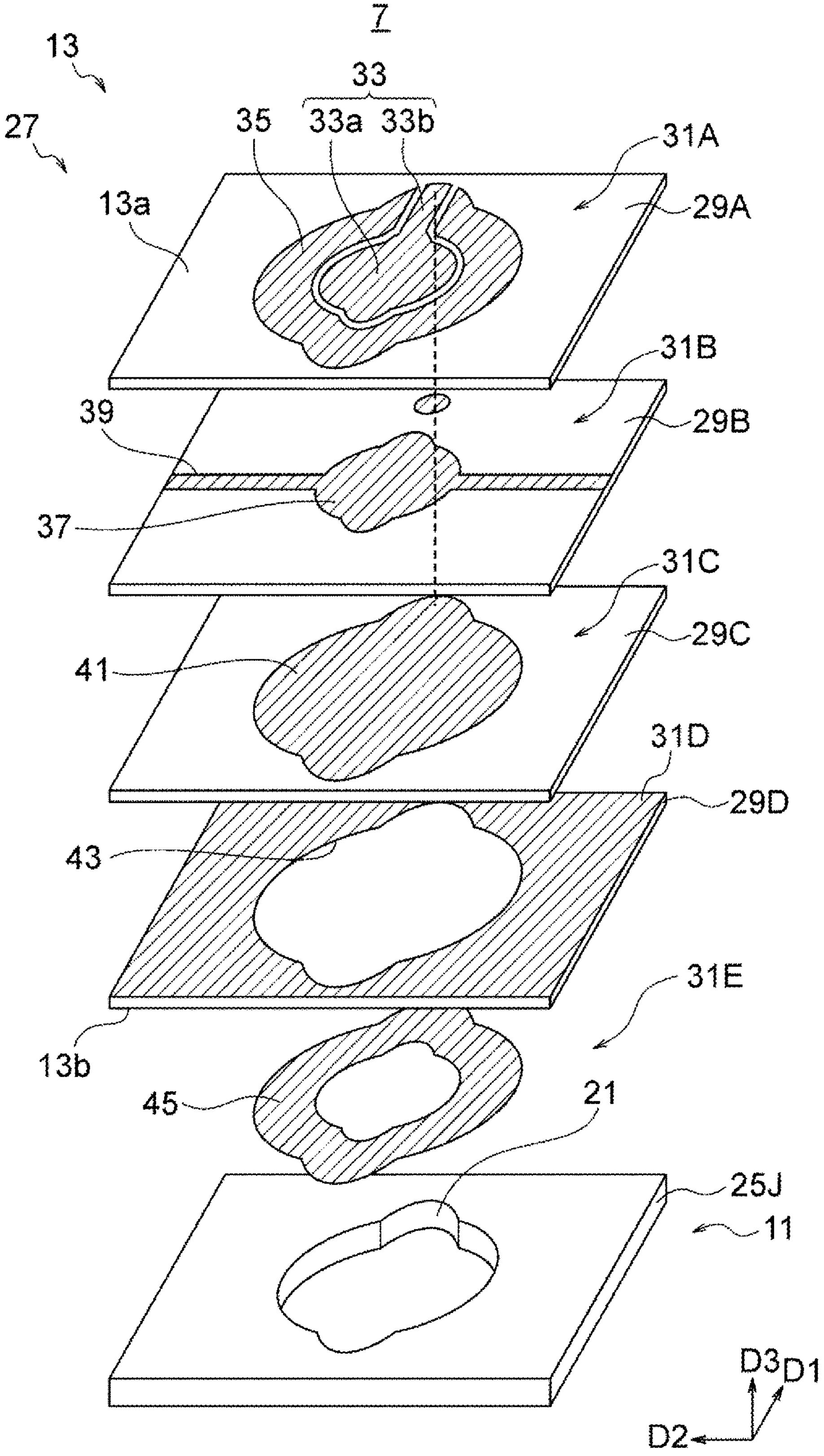
FIG. 8 is an enlarged view of part of the liquid ejection head illustrated in FIG. 7.

FIGS. 7 and 8 are exploded perspective views of the piezoelectric actuator 13 and the upper part (the plate 25J) of the channel member 11. FIG. 7 illustrates a region that is part of the head main body 7 viewed in plan, and some of the piezoelectric elements 27 are located in the region. FIG. 8 illustrates a region in which one of the piezoelectric elements 27 is located. For convenience, surfaces of the conductor layers 31 are hatched.

Referring to FIGS. 7 and 8, the piezoelectric actuator 13 includes individual plate members, each of which is a combination of two layers (the piezoelectric layer 29 and the conductor layer 31 on an upper surface (on the +D3 side) of the piezoelectric layer 29) with the exception that the fifth conductor layer 31E is illustrated as a discrete member. The four plate members are presented for convenience of illustration and are not necessarily prepared in the actual production process. For example, each conductor layer 31 may be disposed on a lower surface (on the −D3) of the corresponding piezoelectric layer 29 in the actual production process.

(First Conductor Layer)

The first conductor layer 31A includes first electrodes 33 and reorientation electrodes 35. For example, each of the first electrodes 33 and each of the reorientation electrodes 35 are provided for the corresponding one of the pressure chambers 21 (the piezoelectric elements 27). When liquid droplets are ejected, the first electrodes 33 are involved in application of voltage to the first active region 53A or, more specifically, a region being part of the first piezoelectric layer 29A. When no liquid droplet is ejected, the reorientation electrodes 35 are involved in poling process to which the second inactive region 55B is (partially or mostly) subjected. This reduces the possibility that the characteristics of the piezoelectric actuator 13 will degrade.

The first electrode 33 and the reorientation electrode 35 in each piezoelectric element 27 are separate from each other and are placed at the respective potentials independently of each other. The distance between the first electrode 33 and the reorientation electrode 35 may be set to any desired value. For example, the distance between the first electrode 33 and the reorientation electrode 35 may be as close as possible to each other without the occurrence of any short circuits.

(First Electrodes)

The first electrodes 33 are individual electrodes. The first electrodes 33 are geometrically and electrically separate from one another. The first electrodes 33 can thus be placed at different potentials.

The first electrodes 33 each include an electrode main part 33*a* and an extended part 33*b*. The electrode main part 33*a* is involved in application of voltage to the first active region 53A. The extended part 33*b* forms a connection between the electrode main part 33*a* and external signal lines located outside the piezoelectric actuator 13. The external signal lines (not illustrated) are in the form of a wiring pattern included in a flexible wiring board oriented toward the first surface 13*a* of the piezoelectric actuator 13. The flexible wiring board is hereinafter also referred to as a flexible printed circuit (FPC). The term "first electrode" may refer to the electrode main part 33*a* only, in which case the extended part 33*b* may be regarded as wiring.

The electrode main part 33*a* and the first active region 53A have substantially the same shape and are substantially equal in dimension when viewed in plan. Thus, the shape and dimensions of the electrode main part 33*a* viewed in plan may be understood as analogous to the shape and dimensions of the first active region 53A viewed in plan. As mentioned above, the active regions 53 are polarized regions, and an electric field is applied to the active regions 53 when liquid droplets are ejected. The outer edge of the region included in the first active region 53A and being part of the first piezoelectric layer 29A coincides with the periphery of the electrode main part 33*a* or is located on the inner side with respect to the periphery of the electrode main part 33*a*.

In a see-through plan view, the extended part 33*b* extends from the electrode main part 33*a* to the outside of the pressure chamber 21. For example, an end of the extended part 33*b* and the external signal lines are joined to each other at a site outside the pressure chamber 21. The end is farther than the other end of the extended part 33*b* from the electrode main part 33*a*. The joining has little influence on the pressure applied to the pressure chamber 21 by the piezoelectric element 27.

The extended part 33*b* each may have any specific desired shape and desired dimensions and may be placed at any desired position. For example, the extended part 33*b* extends in a straight line toward one side in a predetermine direction (e.g., in the D1 direction in the illustrated example) from one end of the electrode main part 33*a* that is closer than the other end of the electrode main part 33*a* to the one side. The predetermined direction may be any desired direction. The predetermined direction in the illustrated example is the longitudinal direction of the electrode main part 33*a*. The width of the extended part 33*b* may be substantially constant and may be smaller than the diameter (e.g., the minimum diameter) of the electrode main part 33*a*. The extended part 33*b* in another example (not illustrated) includes a bent portion or a curved portion. One part including an end of the extended part 33*b* farther than the other end of the extended part 33*b* from the electrode main part 33*a* may be wider than the other part of the extended part 33*b*. In a see-through plan view, the extended part 33*b* may be located within the shape defined by the outer edge of the second active region 53B (as in the illustrated example) or extend off the outer edge.

(Reorientation Electrodes)

The reorientation electrodes 35 are geometrically and electrically separate from each other. The reorientation electrodes 35 are individual electrodes. As will be inferred from the following examples, the reorientation electrodes 35 may be placed at the same potential. That is, the first conductor layer 31A in an example (not illustrated) includes wiring that forms a connection between adjacent ones of the reorientation electrodes 35. In another example, the first conductor layer 31A may include a reorientation electrode (analogous to the fourth conductor layer 31D) that extends over the first piezoelectric layer 29A except for the region overlaid with the first electrode 33, with no gap between one part and another part of the reorientation electrode.

When viewed in plan, the region to which a voltage is applied by the reorientation electrode 35 may be substantially the entirety of the second inactive region 55B or only part of the second inactive region 55B (e.g., an inner edge portion, a middle portion, or an outer edge portion) or may include the second inactive region 55B and the third inactive region 55C.

The reorientation electrode 35 in the illustrated example is capable of applying a voltage to substantially the entirety of the first inactive region 55A and does not apply a voltage to the third inactive region 55C. In a see-through plan view, the shape of the reorientation electrode 35 is substantially in perfect agreement with the shape of the first inactive region 55A. Thus, the shape and dimensions of the reorientation electrode 35 viewed in plan may be understood as analogous to the shape and dimensions of the first inactive region 55A viewed in plan, with the following exception.

Unlike the first inactive region 55A, the reorientation electrode 35 is C-shaped, with a clearance in the region in which the extended part 33*b* of the first electrode 33 is located. The term "C-shaped" does not necessarily mean that the inner edge and/or the outer edge is circular or elliptic, as in the case with the term "annular".

A region being part of the first piezoelectric layer 29A and located outside the electrode main part 33*a* viewed in plan is not subjected to application of voltage when liquid droplets are ejected. Thus, the region concerned is regarded as the first inactive region 55A. The inner edge of the reorientation electrode 35 is on the outer side with respect to the outer edge of the electrode main part 33*a* with a clearance therebetween in such a manner as to eliminate the possibility that the reorientation electrode 35 will become shorted to the first electrode 33. As mentioned above, the reorientation electrode 35 extends over substantially the entirety of the first inactive region 55A; nevertheless, the inner edge of the reorientation electrode 35 is closer than the inner edge of the region included in the first inactive region 55A and being part of the first piezoelectric layer 29A to the outer edge of the region concerned.

In other examples (not illustrated) in which the planar shape of the reorientation electrode 35 (except for the clearance) and the planar shape of the first active region 53A are similar figures, the outer edge of the reorientation electrode 35 is located on the inner side or the outer side with respect to the outer edge of the first inactive region 55A (i.e., the edge coinciding with the outer edge of the second active region 53B as mentioned above). In other words, part of the outer edge portion of the first inactive region 55A does not undergo the poling process, or the third inactive region 55C as well as the first inactive region 55A undergoes the poling process.

(Second Conductor Layer)

The second conductor layer 31B includes second electrodes 37 and lines 39. Each of the second electrodes 37 is provided for the corresponding one of the pressure chambers 21 (the piezoelectric elements 27). Each of the lines 39 forms a connection between adjacent ones of the second electrodes 37. When liquid droplets are ejected upon application of pressure to the pressure chambers 21, the second electrodes 37 are involved in application of voltage to the first active region 53A or, more specifically, to both the first piezoelectric layer 29A and the second piezoelectric layer 29B. The lines 39 are involved in application of potential to the second electrodes 37.

(Second Electrodes)

The second electrodes 37 are geometrically separate from one another. When viewed from another perspective, no conductor is located between two adjacent ones of the second electrodes 37. The second electrodes 37 are thus regarded as individual electrodes in terms of their geometric shapes. Unlike the first electrodes 33, the second electrodes 37 are placed at the same potential due to the presence of the lines 39, each of which forms a connection between adjacent ones of the second electrodes 37 as mentioned above.

Each of the second electrodes 37 and the electrode main part 33*a* of the corresponding one of the first electrodes 33 have substantially the same shape and are substantially equal in dimension. When viewed in plan, the shape of the second electrode 37 is substantially in perfect agreement with the shape of the electrode main part 33*a*. In other words, the outer edge of the second electrode 37 and the outer edge of the electrode main part 33*a* substantially coincide with each other in a see-through plan view. When viewed from another perspective, the second electrode 37 and the reorientation electrode 35 do not overlap each other in a see-through plan view. The shape and dimensions of the second electrode 37 viewed in plan may be understood as analogous to the shape and dimensions of the electrode main part 33*a* (the first active region 53A) viewed in plan, where appropriate.

To be more precise, the outer edge of the second electrode 37 in a see-through plan view may partially or entirely coincide with the outer edge of the electrode main part 33*a* or the inner edge of the reorientation electrode 35 or may be located between the outer edge of the electrode main part 33*a* and the inner edge of the reorientation electrode 35. In any of these cases, the outer edge of the second electrode 37 and the outer edge of the electrode main part 33*a* may be herein considered to coincide with each other (or to be in perfect agreement with each other). When the outer edge of the second electrode 37 and the outer edge of the electrode main part 33*a* coincide with each other in a strict sense, there may exist a misalignment that falls within allowable tolerances. The same holds for the other electrodes.

In an example (not illustrated), the outer edge of the second electrode 37 is slightly off the outer edge of the electrode main part 33*a* or, more specifically, is located on the inner side or the outer side with respect to the outer edge of the electrode main part 33*a*. In other words, the region being part of the first piezoelectric layer 29A and subjected to application of voltage is not necessarily in perfect agreement with the region being part of the second piezoelectric layer 29B and subjected to application of voltage. This will be inferred from the following examples. When viewed from another perspective, the region being part of the first piezoelectric layer 29A and included in the first active region 53A and the region being part of the second piezoelectric layer 29B and included in the first active region 53A may differ in area as long as the regions subjected to application of voltage are polarized.

(Traces Included in Second Conductor Layer)

Any desired number of lines 39 may be placed in any desired arrangement, and each line 39 may have any desired shape and desired dimensions. Each line 39 may form a connection between the second electrodes 37 that are adjacent to each other in the D2 direction (as in the illustrated example). Alternatively, each line 39 may form a connection between the second electrodes 37 that are adjacent to each other in a direction other than the D2 direction (i.e., the D1 direction or a direction that forms an angle with the D1 direction). Two or more of these connection patterns may be used in combination. In the illustrated example, each line 39 extends in a direction that forms an angle with (or orthogonal to) the longitudinal direction of the extended part 33*b* of the first electrode 33. The line 39 does not overlap the extended part 33*b*.

The line 39 may extend in the form of a straight line (as in the illustrated example) or may be bent or curved. The width of the line 39 is substantially constant throughout in the longitudinal direction of the line 39 (as in the illustrated example) or may vary from place to place in the longitudinal direction of the line 39. The width of each line 39 is smaller than the diameter of each second electrode 37 in the direction of the width of each line 39 such that the second electrodes 37 are adjacent to each other with a clearance therebetween (such that the second electrodes 37 are regarded as individual electrodes in terms of their shapes). The width of each line 39 is not more than ½, ⅓, or ¼ of the diameter of each second electrode 37.

(Third Conductor Layer)

The third conductor layer 31C includes third electrodes 41, each of which is provided for the corresponding one of the pressure chambers 21 (the piezoelectric elements 27). When liquid droplets are ejected upon application of pressure to the pressure chambers 21, the third electrodes 41 are involved in application of voltage to the first active region 53A or, more specifically, to a region being part of the second piezoelectric layer 29B and are also involved in the application of voltage to the second active region 53B or, more specifically, to both the third piezoelectric layer 29C and the fourth piezoelectric layer 29D. As with the first electrodes 33, the third electrodes 41 are individual electrodes. The third electrodes 41 are geometrically and electrically separate from one another.

For example, the third electrodes 41 each have a planar shape that is substantially a combination of the planar shape of the first electrode 33 and the planar shape of the reorientation electrode 35 (i.e., a combination of the planar shape of the first active region 53A and the planar shape of the second active region 53B). This relation holds for the dimensions of each of the third electrodes 41 and the dimensions of the combination of the planar shapes. In a see-through plan view, the shape of the third electrode 41 is substantially in perfect agreement with a combination of the shape of the first electrode 33, the shape of the reorientation electrode 35, and the shape of the clearance between the first electrode 33 and the reorientation electrode 35 (i.e., a combination of the shape of the first active region 53A and the second active region 53B). The shape and dimensions of each of the third electrodes 41 viewed in plan may be understood as analogous to the shape and dimensions of the outer edge of the second active region 53B.

The shape of the third electrode 41 viewed in plan may be different from the shape defined by the outer edge of the reorientation electrode 35. Likewise, the dimensions of the third electrode 41 viewed in plan may be different from the dimensions of the shape defined by the outer edge of the reorientation electrode 35. In a see-through plan view, the outer edge of the reorientation electrode 35 may be located on the inner side or the outer side with respect to the outer edge of the third electrode 41. In some embodiments, the third electrodes 41 each have a slit. In a see-through plan view, the slit extends between the electrode main part 33*a* and the reorientation electrode 35 and along the periphery of the electrode main part 33*a*.

(Fourth Conductor Layer)

The fourth conductor layer 31D is involved in equalization of the structural characteristics of the piezoelectric actuator 13 between a portion closer to the first surface 13*a* and a portion closer to the second surface 13*b*. As will be inferred from the following description about the working mechanism, the fourth conductor layer 31D in the present embodiment is not involved in application of voltage to the piezoelectric layers 29. Thus, the fourth conductor layer 31D is optionally provided.

The shape, dimensions, and position of the fourth conductor layer 31D are set in such a manner that in a see-through plan view, the fourth conductor layer 31D does not overlap electrodes involved in application of voltage to the piezoelectric layers 29. In the present embodiment, the first electrodes 33, the reorientation electrodes 35, the second electrodes 37, the third electrodes 41, and fourth electrodes 45, which will be described later, are involved in application of voltage. The fourth conductor layer 31D is less likely to interfere with the application of voltage to the piezoelectric layers 29 by the electrodes.

The fourth conductor layer 31D may overlap one or more of the electrodes. For example, the fourth conductor layer 31D overlaps the reorientation electrodes 35, where the overlap is located on the outer side with respect to the outer edges of the third electrodes 41 and the outer edges of the fourth electrodes 45 and is in the third inactive region 55C. In this case, the fourth conductor layer 31D may be involved in reorientation of a region included in the third inactive region 55C and being part of the first piezoelectric layer 29A, part of the second piezoelectric layer 29B, and part of the third piezoelectric layer 29C.

The fourth conductor layer 31D may have any desired shape and desired dimensions. The fourth conductor layer 31D in the illustrated example has openings 43, each of which is provided for the corresponding one of the pressure chambers 21 (the piezoelectric elements 27). In other words, the fourth conductor layer 31D except for the openings 43 is in the form of a solid layer and extends over the fourth piezoelectric layer 29D with no gap between one part and another part of the fourth conductor layer 31D.

For example, the openings 43 each have a planar shape that is substantially identical to the planar shape of each of the third electrodes 41 (i.e., logical disjunction of the first active region 53A and the second active region 53B). This relation holds for the dimensions of each of the openings 43 and the dimensions of each of the third electrodes 41. When viewed in plan, the shape of the opening 43 is substantially in perfect agreement with the shape of the third electrode 41. The shape and dimensions of each of the opening 43 viewed in plan may be understood as analogous to the shape and dimensions of the outer edge of the second active region 53B.

Each opening 43 may be greater than the corresponding third electrode 41. In this case, the third electrodes 41 (and the other electrodes) are less likely to overlap the fourth conductor layer 31D. Increasing the size of the openings 43 may serve the purpose of equalizing the structural characteristics between the portion closer to the first surface 13*a* and the portion closer to the second surface 13*b*. The shape of each opening 43 greater than the corresponding third electrode 41 may be geometrically similar to the shape of the third electrode 41 (the pressure chamber 21) or may be geometrically different from the shape of the third electrode 41.

It is not required that the openings 43 be provided; that is, the fourth conductor layer 31D may be provided in varying shapes (patterns) when viewed in plan. For example, the fourth conductor layer 31D may include linear patterns extending in any desired direction or a mash pattern with openings as well as the openings 43 when viewed in plan.

(Fifth Conductor Layer)

The fifth conductor layer 31E includes the fourth electrodes 45, each of which is provided for the corresponding one of the pressure chambers 21 (the piezoelectric elements 27). When liquid droplets are ejected upon application of pressure to the pressure chambers 21, the fourth electrodes 45 are involved in application of voltage to the second active region 53B or, more specifically, to both the third piezoelectric layer 29C and the fourth piezoelectric layer 29D. When no liquid droplet is ejected, the fourth electrodes 45 are involved in poling process to which the second inactive region 55B is (partially or mostly) subjected. This reduces the possibility that the characteristics of the piezoelectric actuator 13 will degrade.

The fourth electrodes 45 are geometrically separate from one another. The fourth electrodes 45 are thus regarded as individual electrodes in terms of their geometric shapes. Unlike the first electrodes 33, the fourth electrodes 45 are placed at the same potential. Specifically, the plate 25J in the illustrated example is made of metal and forms an electrical connection between the fourth electrodes 45. In some embodiments, the plate 25J is made of resin such that the pressure applying surface 11*b* provides insulation, in which case the fourth electrodes 45 are not electrically connected to one another through the channel member 11.

For example, the fourth electrodes 45 each have a planar shape that is substantially identical to the planar shape of each of the reorientation electrodes 35. This relation holds for the dimensions of each of the fourth electrode 45 and the dimensions of each of the reorientation electrodes 35. When viewed from another perspective, the fourth electrodes 45 each have a planar shape that is substantially identical to the planar shape of the peripheral region of each of the third electrodes 41, where the peripheral region does not overlap the electrode main part 33*a* of the first electrode 33. This relation holds for the dimensions of each of the fourth electrodes 45 and the dimensions of the peripheral region of each of the third electrodes 41. When viewed from still another perspective, the fourth electrodes 45 each have a planar shape that is substantially identical to the planar shape of the second active region 53B. This relation holds for the dimensions of each of the fourth electrodes 45 and the dimensions of the second active region 53B. The shape and dimensions of each of the fourth electrodes 45 viewed in plan may be understood as analogous to the shape and dimensions of the second active region 53B viewed in plan.

In a see-through plan view, the inner edge of the fourth electrode 45 substantially coincides with the outer edge of the electrode main part 33*a* (the inner edge of the reorientation electrode 35) and the outer edge of the second electrode 37. To be more precise, the inner edge of the fourth electrode 45 as well as the outer edge of the second electrode 37 in a see-through plan view may partially or entirely coincide with the outer edge of the electrode main part 33*a* or the inner edge of the reorientation electrode 35 or may be located between the outer edge of the electrode main part 33*a* and the inner edge of the reorientation electrode 35. In any of these cases, the inner edge of the fourth electrode 45 and the outer edge of the electrode main part 33*a* may be herein considered to coincide with each other. In an example, the inner edge of the fourth electrode 45 is slightly off the outer edge of the electrode main part 33*a* or the outer edge of the second electrode 37 or, more specifically, is located on the inner side or the outer side with respect to the outer edge of the electrode main part 33*a* or the outer edge of the second electrode 37.

In a see-through plan view, the outer edge of the fourth electrode 45 substantially coincides with the outer edge of the reorientation electrode 35, the outer edge of the third electrode 41, and the edge of the opening 43. The positional relationship between the reorientation electrode 35 and the fourth electrode 45 may be similar to the positional relationship between the reorientation electrode 35 and the third electrode 41; that is, the outer edge of the reorientation electrode 35 may be located on the inner side or the outer side with respect to the outer edge of the fourth electrode 45. As mentioned above, each opening 43 may be greater than the corresponding third electrode 41. Likewise, each opening 43 may be greater than the corresponding fourth electrode 45. The outer edge of the fourth electrode 45 may be off the outer edge of the third electrode 41 or, more specifically, may be located on the inner side or the outer side with respect to the outer edge of the third electrode 41.

(Electrical Connection Between Conductor Layers)

As mentioned above, the first electrodes 33, each of which is provided for the corresponding one of the piezoelectric elements 27, are placed at the respective potentials (receive driving signals) independently of one another. The FPC (not illustrated) oriented toward the first surface 13*a* of the piezoelectric actuator 13 applies potential to the extended part 33*b*. For example, the end of the extended part 33*b* that is farther than the other end of the extended part 33*b* from the electrode main part 33*a* is joined to the wiring pattern of the FPC with a bump (not illustrated) therebetween. The bump may be made of solder (e.g., lead-free solder).

The third electrodes 41, each of which is provided for the corresponding one of the piezoelectric elements 27 as mentioned above, are placed at the respective potentials (receive driving signals) independently of one another. As for each of the piezoelectric elements 27 in the present embodiment, the third electrode 41 and the first electrode 33 in the piezoelectric element 27 concerned are placed at the same potential. For example, each of the first electrodes 33 and the corresponding one of the third electrodes 41 in the piezoelectric actuator 13 are electrically connected to each other such that these electrodes are placed at the same potential.

Each of the first electrodes 33 and the corresponding one of the third electrodes 41 may be connected to each other by any desired conductor. Referring to FIG. 3, the first electrode 33 and the third electrode 41 are connected to each other by a through-conductor 47, which extends through the first piezoelectric layer 29A and the second piezoelectric layer 29B. Referring to FIG. 8, a dotted line extends from an interface between the through-conductor 47 and the first electrode 33 to an interface between the through-conductor 47 and the third electrode 41. In a see-through plan view, the interface between the through-conductor 47 and the first electrode 33 may be a region being part of the extended part 33*b* and located outside the pressure chamber 21 or, more specifically, may be part of the outer region 11*e* located outside the pressure chamber 21. The interface between the through-conductor 47 and the third electrode 41 may be located directly below the interface between the through-conductor 47 and the extended part 33*b*.

In an example (not illustrated), a through-conductor extending through the first piezoelectric layer 29A and connected to the first electrode 33 and a through-conductor extending through the second piezoelectric layer 29B and connected to the third electrode 41 may be connected to each other by a layer conductor located between the first piezoelectric layer 29A and the second piezoelectric layer 29B. In another example, the first electrode 33 and the third electrode 41 are placed at different potentials, in which case the third electrode 41 may include an extended part. In a see-through plan view, an end of the extended part does not overlap the reorientation electrode 35. The extended part is connected to a through-conductor that is exposed at the first surface 13*a* of the piezoelectric actuator 13. The through-conductor or a pad laid on the through-conductor may be joined to the wiring pattern of the FPC (not illustrated).

As with the first electrode 33, the reorientation electrode 35 is joined to the FPC (not illustrated) with a bump therebetween such that a potential is applied to the reorientation electrode 35. Any desired part of the reorientation electrode 35 may be joined to the FPC. For example, the joint part of the reorientation electrode 35 is located opposite the extended part 33*b* with the electrode main part 33*a* therebetween, and/or the joint part does not overlap the pressure chamber 21 in a see-through plan view. As is the case with the extended part 33*b* joined to the external signal lines, the joining has little influence on the pressure applied to the pressure chamber 21.

In an example (not illustrated), the reorientation electrode 35 includes an extended part that extends away from the pressure chamber 21, and the FPC is joined to the extended part. It is not required that the reorientation electrodes 35 be placed at the respective potentials independently of one another. The reorientation electrodes 35 may be connected to one another by wiring, and all the reorientation electrodes 35 may be connected a pad that is joined to the FPC.

As mentioned above, the fourth electrodes 45 in the present embodiment are electrically connected to one another by the plate 25J made of metal and are placed at the same potential. For example, the plate 25J is placed at a reference potential. The plate 25J may be connected to frame ground or signal ground (e.g., a reference potential part of the FPC (not illustrated) connected to the piezoelectric actuator 13). Alternatively, the plate 25J may be connected to both the frame ground and the signal ground. In the latter case, the plate 25J may be connected directly to the frame ground and the signal ground, or the plate 25J may be connected to one of the frame ground and the signal ground with the other ground located therebetween. The connection may be formed by any means.

As mentioned above, the second electrodes 37 are connected to one another by the lines 39 and are placed at the same potential. Although the fourth conductor layer 31D has the openings 43, the fourth conductor layer 31D is principally one conductor pattern. Thus, every part of the fourth conductor layer 31D is placed at the same potential. In the present embodiment, the second electrodes 37 and the fourth conductor layer 31D are placed at the same potential. The second electrodes 37 and the fourth conductor layer 31D may be electrically connected to the FPC (not illustrated) oriented toward the first surface 13*a* of the piezoelectric actuator 13. To that end, through-conductors extending through the piezoelectric layers 29 may be provided. The through-conductors may be in any desired form. Specific examples are as follows.

Figure 9:
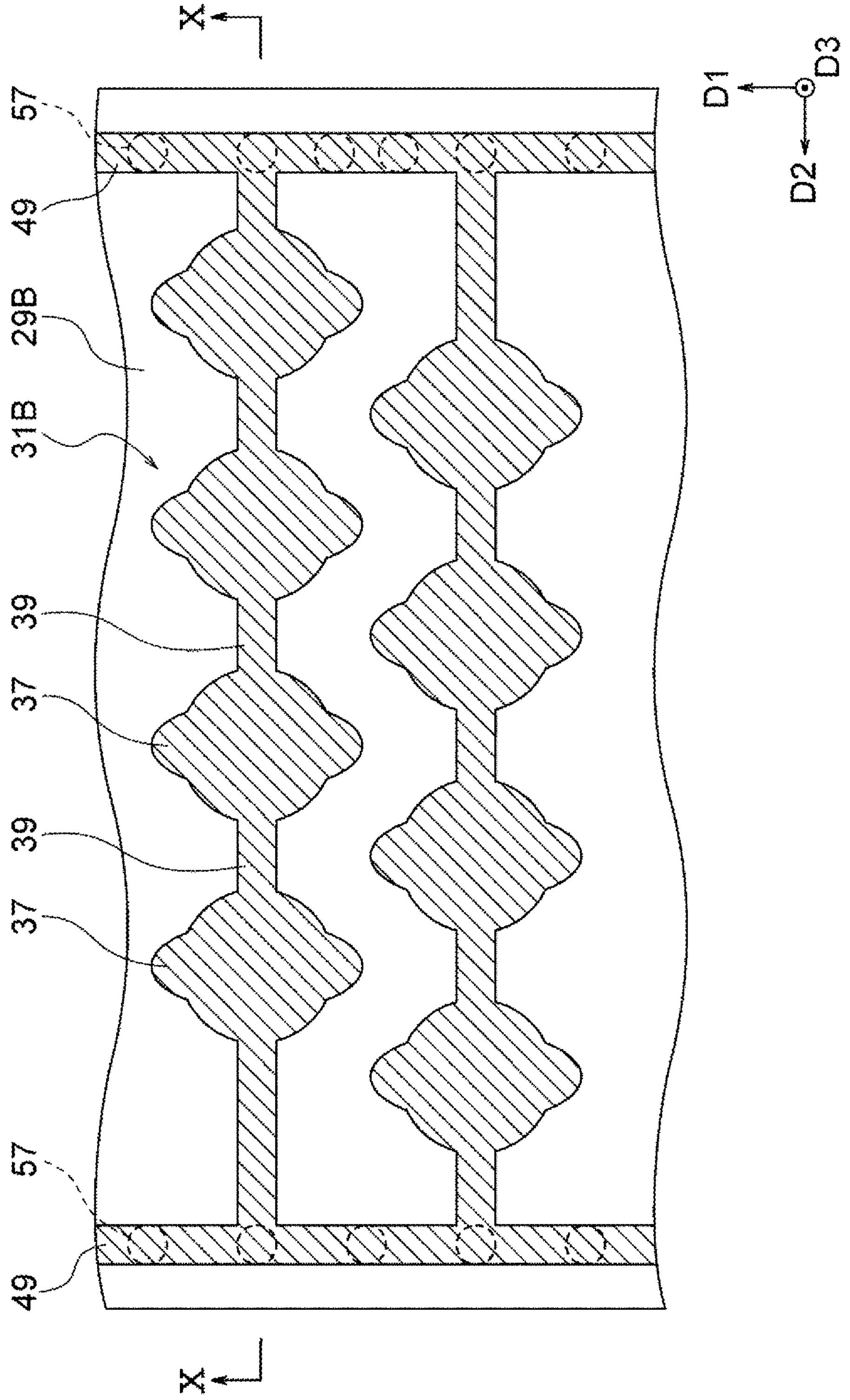
FIG. 9 is a simplified plan view of the liquid ejection head according to the first embodiment, illustrating a conductor layer of the liquid ejection head.

FIG. 9 is an enlarged perspective view of part of the second conductor layer 31B. FIG. 9 illustrates only two of the rows of second electrodes 37, where the second electrodes 37 in each low are aligned in the D2 direction. For convenience of illustration, each row includes four second electrodes 37.

As mentioned above, the second electrodes 37 in each row are connected to each other by the lines 39. The both ends of each row is connected with lines, each of which is denoted by 39 and extends outward from the row (to the −D2 side or the +D2 side). The lines 39 on the ends of each row are connected to common lines 49, which extend in a direction (the D1 direction) forming an angles with the rows of second electrodes 37. Thus, the rows are connected to each other. Each common line 49 is part of the second conductor layer 31B.

Figure 10:
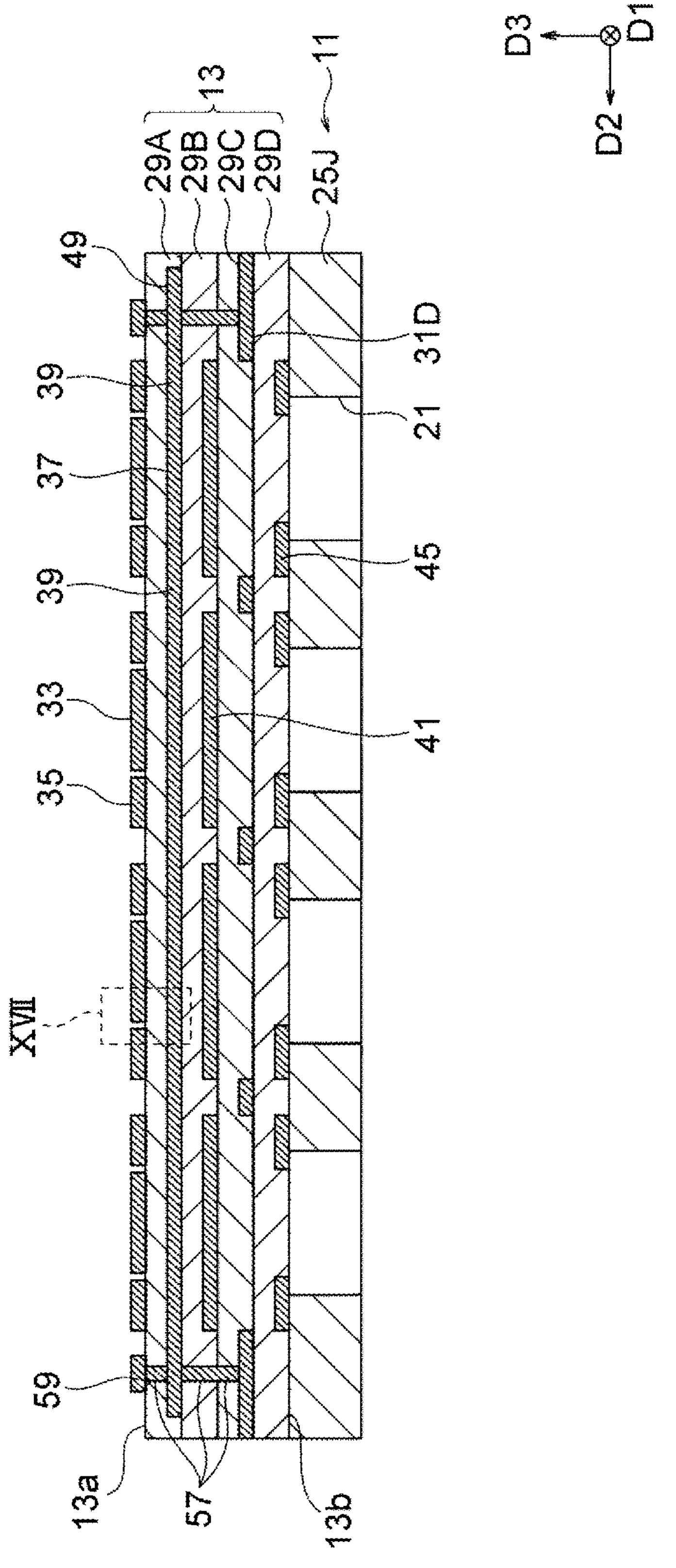
FIG. 10 is a sectional view of the liquid ejection head taken along line X-X in FIG. 9.

FIG. 10 is a sectional view of the liquid ejection head, taken along line X-X in FIG. 9.

Referring to FIGS. 9 and 10, through-conductors extending through the piezoelectric layers 29 are provided and denoted by 57. In a see-through plan view, the through-conductors 57 are each located in the common lines 49. More specifically, the through-conductors 57 extend through the second piezoelectric layer 29B and the third piezoelectric layer 29C, as illustrated in FIG. 10. The through-conductors 57 connect each common line 49 to the fourth conductor layer 31D. The second electrodes 37 and the fourth conductor layer 31D are placed at the same potential accordingly.

Through-conductors extending through the first piezoelectric layer 29A are also provided and denoted by 57. Thus, the FPC (not illustrated) oriented toward the first surface 13*a* of the piezoelectric actuator 13 is electrically connectable to the second electrodes 37 and the fourth conductor layer 31D. Specifically, the through-conductors 57 extending through the first piezoelectric layer 29A are each provided with a pad 59. The pad 59 is connected to the signal lines of the FPC (not illustrated) with a bump (not illustrated) therebetween.

As denoted by dotted lines in FIG. 9, the through-conductors 57 are aligned along the common lines 49. This arrangement stabilizes the potential of the electrodes that are to be placed at the same potential. It is not required that the through-conductor 57 be provided in more than one place. Each of the through-conductors 57 located above the common lines 49 and the corresponding one of the through-conductors 57 located below the common lines 49 overlap each other or do not overlap each other in a see-through plan view.

Through-conductors (not illustrated) extending through the fourth piezoelectric layer 29D may also be provided and denoted by 57. With the through-conductors 57 extending through the fourth piezoelectric layer 29D, the plate 25J (the fourth electrodes 45) may be electrically connected to the second electrodes 37 and the fourth conductor layer 31D.

(Potentials Applied to Conductor Layers)

Figure 11:
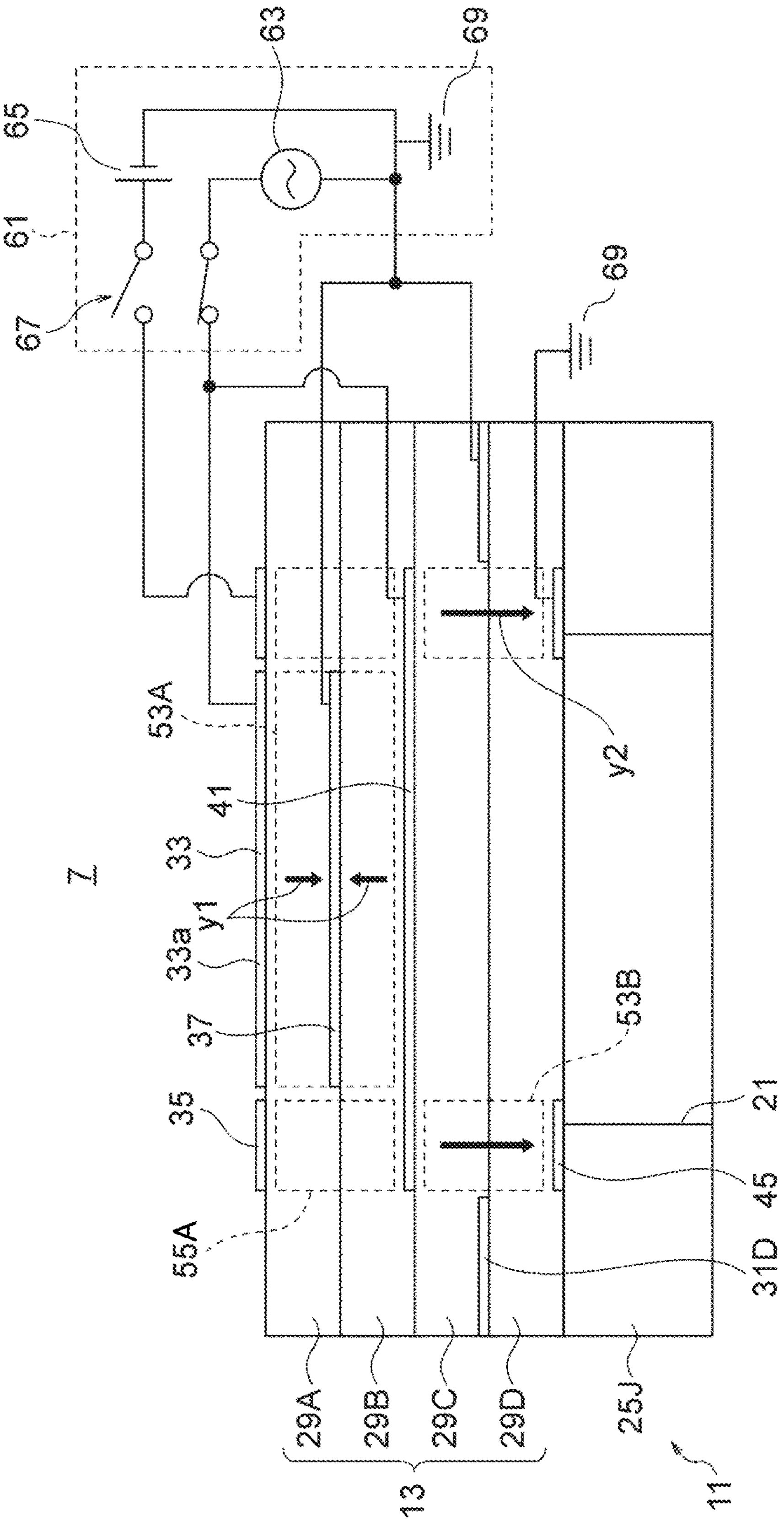
FIG. 11 is a schematic sectional view and illustrates potentials that are applied when liquid droplets are ejected from the liquid ejection head according to the first embodiment.
Figure 12:
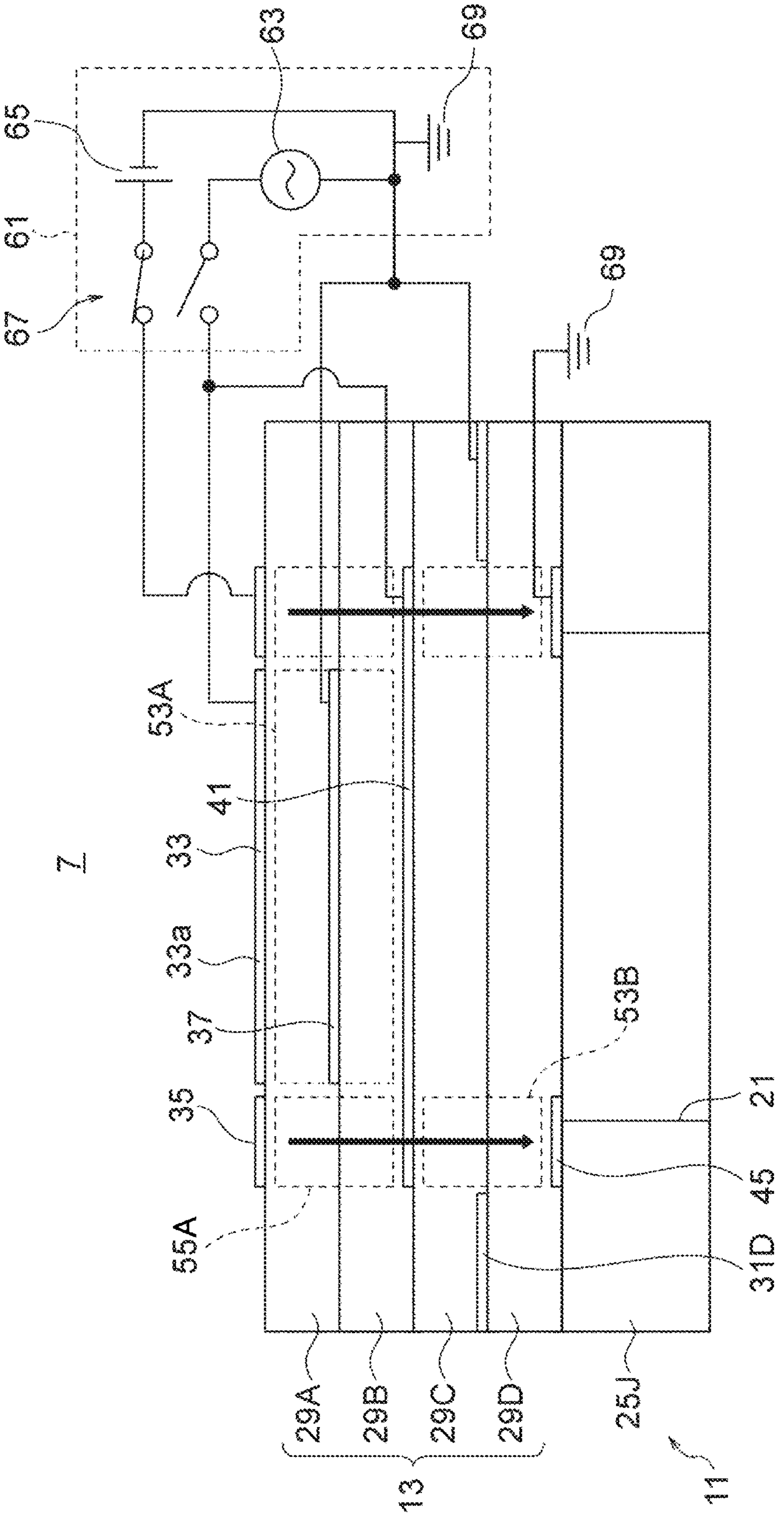
FIG. 12 is a schematic sectional view and illustrates potentials that are applied when poling process is conducted in the liquid ejection head according to the first embodiment.

FIG. 11 is a schematic sectional view and illustrates potentials that are applied to the conductor layers 31 when liquid droplets are ejected. FIG. 12 is a schematic sectional view and illustrates potentials that are applied to the conductor layers 31 when the first inactive region 55A undergoes poling process. As with FIG. 5, FIGS. 11 and 12 each illustrate a section taken along line V-V in FIG. 4. Hatching lines for indicating a cut surface are not drawn in FIGS. 11 and 12. Arrows extending through the piezoelectric layers 29 viewed in section denote the direction in which potentials (electric fields) are applied at a predetermined point in time in the cycle of ejecting liquid droplets.

A driver 61 (see FIGS. 11 and 12) supplies the piezoelectric actuator 13 with power to drive the piezoelectric actuator 13. The configuration of the driver 61 is presented for convenience of easy-to-understand illustration of potentials applied to the conductor layers 31. Thus, the configuration of the driver 61 may be changed for actual product design.

The driver 61 includes an integrated circuit (IC). When being intend for installation in the head 2, the driver 61 is mounted on the FPC (not illustrated) oriented toward the first surface 13*a* of the piezoelectric actuator 13. It is not required that the driver 61 be installed in the head 2. Various roles may be divided between the driver 61 and the controller 88 as appropriate. For example, some or all of the following actions of the driver 61 may be performed by the controller 88. The driver 61 may be implemented by hardware configuration that is hardly indistinguishable from the controller 88. The driver 61 and the controller 88 as a whole may be regarded as a controller.

The driver 61 includes a first signal source 63, a second signal source 65, and a switch part 67. The first signal source 63 is capable of outputting power for ejection of liquid droplets. The second signal source 65 is capable of outputting power for poling process. The switch part 67 controls connections of the signal sources to the piezoelectric actuator 13. The switch part 67 is presented for easy-to-understand illustration of supply of power to the piezoelectric actuator 13, with a distinction between the power for ejection of liquid droplets and the power for poling process. Actual product design is possible without the switch part 67, in which case the operation of the first signal source 63 and the second signal source 65 enables selection between power output for ejection of liquid droplets and power output for poling process. As for the first signal source 63 and the second signal source 65, part of one may be part of the other.

Referring to FIGS. 11 and 12, a reference potential part, which is provided as signal ground and/or frame ground, is denoted by 69. The conductor layers 31 that are to be placed at the reference potential may be connected to the reference potential part 69 with or without the driver 61 therebetween. The connections concerning the reference potential part 69 are presented for convenience of easy-to-understand illustration of potential difference between the conductor layers 31.

(Liquid Ejection Control)

As described above with reference to FIG. 5, ejection of liquid involves application of voltage (electric field) to the first active region 53A and the second active region 53B in the polarization direction (or in the direction opposite the polarization direction). The voltage is applied by the first signal source 63. As described above with reference to FIG. 6, the polarization directions in the present embodiment are as follows: the first piezoelectric layer 29A and the second piezoelectric layer 29B in the first active region 53A are polarized in opposite directions; and the polarization of the second active region 53B coincides with the polarization direction of the region included in the first active region 53A and being part of the first piezoelectric layer 29A. The driver 61 (the first signal source 63) applies potential to the conductor layers 31 in directions denoted by arrows y1 and arrows y2 in FIG. 11. In the first active region 53A, the voltage applied to the first piezoelectric layer 29A is opposite in direction to the voltage applied to the second piezoelectric layer 29B. The direction in which voltage applied to the second active region 53B coincides with the direction in which voltage is applied to the region included in the first active region 53A and being part of the first piezoelectric layer 29A.

More specifically, the second electrode 37 and the fourth electrode 45 in the illustrated example are placed at the reference potential. The first electrode 33 and the third electrode 41 are each placed at a potential above the reference potential (i.e., at a positive potential). Thus, the voltage applied between the first electrode 33 and the second electrode 37, that is, the voltage applied to the region included in the first active region 53A and being part of the first piezoelectric layer 29A is in the direction from the first electrode 33 to the second electrode 37. The voltage applied between the second electrode 37 and part of the third electrode 41 (an overlap between the second electrode 37 and the third electrode 41), that is, the voltage applied to the region included in the first active region 53A and being part of the second piezoelectric layer 29B) is in the direction from the third electrode 41 to the second electrode 37. The voltage applied between part of the third electrode 41 (an overlap between the third electrode 41 and the fourth electrode 45) and the fourth electrode 45 is in the direction from the third electrode 41 to the fourth electrode 45.

In the above example, the direction of voltage application coincides with the polarization direction. The converse is also possible; that is, the direction of voltage application is opposite to the polarization direction. To that end, the first electrode 33 and the third electrode 41 are placed at a potential below the reference potential (i.e., at a negative potential). The above example has been described on the basis of the polarization direction illustrated in FIG. 6. In a case where the polarization direction is reversed, the relationship between the polarization and the application of a high (positive) potential or a low (negative) potential is the reverse of the above.

As mentioned above, the second electrode 37 and the fourth electrode 45 in the illustrated example are placed at the reference potential. In a case where the fourth electrode 45 is not electrically connected to the plate 25J made of metal (as in another embodiment that will be described later), it is not required that the second electrode 37 and the fourth electrode 45 each be placed at the reference potential. For example, the second electrode 37 and the fourth electrode 45 may be place at a potential different from the potential of the first electrode 33 and the third electrode 41 and above or below the reference potential. Alternatively, the first electrode 33 and the third electrode 41 may be placed at the reference potential, and the second electrode 37 and the fourth electrode 45 each may be placed at a potential above or below the reference potential, in which case the conductor layers 31 and the arrangement of the through-holes are to be adjusted in such a way that the second electrode 37 and the fourth electrode 45 are placed at the respective potentials independently of each other. The present embodiment can be generalized as follows: the first electrode 33 and the third electrode 41 are placed at the same potential (first potential), and the second electrode 37 and the fourth electrode 45 are placed at the same potential (second potential), where the potential difference is created to form electric fields including: an electric field (a first electric field) that is to be applied to the first active region 53A; and an electric field (a second electric field) that is to be applied to the second active region 53B.

The first active region 53A and the second active region 53B each may be energized with a voltage applied in the polarization direction in a manner different from the above. For example, the first electrode 33 and the third electrode 41 are not connected to each other and are placed at different potentials above (or below) the potential of the second electrode 37. Alternatively, the second electrode 37 and the fourth electrode 45 are placed at different potentials below (or above) the potential of the third electrode 41.

A voltage may be applied to eject liquid droplets in a state in which the reorientation electrode 35 and the fourth conductor layer 31D are placed at the reference potential or are electrically floating (without deliberate application of voltage). The reorientation electrode 35 in the example FIG. 11 is electrically floating. As mentioned above, the fourth conductor layer 31D in the present embodiment is connected to the second electrode 37 and is thus placed at the reference potential.

The piezoelectric elements 27 are driven such that pressure is applied to the pressure chambers 21. Examples of the method by which the piezoelectric elements 27 are driven include various well-known methods and methods into which various well-known methods are adopted. Pull-push method is typically used to drive such elements. When the pull-push method is adopted, the driver 61 operates as follows.

Prior to ejection of liquid droplets, the driver 61 applies potential in advance in such a way that the first electrodes 33 and the third electrodes 41 are at a potential above the reference potential. The second electrodes 37 and the fourth electrodes 45 are placed at the reference potential, and the same applies to the following. In this state, the piezoelectric elements 27 undergo bending and deformation toward the pressure chambers 21. At the start timing of liquid droplets ejection operation, the driver 61 applies the reference potential to the first electrodes 33 and the third electrodes 41. Then, the piezoelectric elements 27 start becoming flat again, causing an increase in the volumetric capacity of the pressure chambers 21. When viewed from another perspective, the piezoelectric elements 27 starts vibrating at the natural frequency. Once the volumetric capacity of the pressure chambers 21 reaches its upper limit, the volumetric capacity starts decreasing. As the volumetric capacity decreases, the pressure in the pressure chambers 21 rises. When the pressure in the pressure chambers 21 reaches almost its peak, the first electrodes 33 and the third electrodes 41 are placed at a potential above the reference potential. The resultant vibration and the previously applied vibration add up to exert higher pressure to the pressure chambers 21. The driver 61 inputs driving signals in the form of pulses to the first electrodes 33 and the third electrodes 41. For a certain period of time, the potential of the driving signals are low with respect to a reference point that is above the potential of the second electrodes 37 and the fourth electrodes 45.

The driver 61 changes the amplitude or number of driving signals in the form of pulses in accordance with the size of dots that are to be formed on the recording medium. In this way, the size of liquid droplets that are to be ejected may be increased, or more than one droplet may be ejected per dot.

As can be understood from the above description, the voltage applied to the first active region 53A and the voltage applied to the second active region 53B vary in the same way when liquid droplets are ejected. Thus, the first active region 53A and the second active region 53B expand for the same period of time, and the first active region 53A and the second active region 53B contract for the same period of time. In other words, the time period over which the first active region 53A expands and time period over which the second active region 53B expands coincide with each other, and the time period over which the first active region 53A contracts and time period over which the second active region 53B contracts coincide with each other. This can be generalized as follows: the time period over which the first active region 53A expands and the time period over which the second active region 53B expands overlap or coincide with each other; and the time period over which the first active region 53A contracts and the time period over which the second active region 53B contracts overlap or coincide with each other.

As can be understood from the description about the pull-push method, voltages are not necessarily applied deliberately to the first active region 53A and the second active region 53B while the first active region 53A and the second active region 53B contract or expand. For example, the first active region 53A and the second active region 53B may start contracting or expanding when the first electrode 33 and the third electrode 41 are placed at the reference potential at the start timing of liquid droplets ejection operation. That is, the time period over which the first active region 53A and the second active region 53B contract or expand may be regarded as the time period over which no voltage is applied to the first active region 53A and the second active region 53B. When performing liquid ejection control, the driver 61 controls the intensity of the electric field applied to the first active region 53A and the intensity of the electric field applied to the second active region 53B in such a manner that the time period over which the first active region 53A expands and the time period over which the second active region 53B expands overlap or coincide with each other and the time period over which the first active region 53A contracts and the time period over which the second active region 53B contracts overlap or coincide with each other.

It is not always required that the time period over which the first active region 53A is energized with voltage coincide with the time period over which the second active region 53B is energized with voltage. For example, the piezoelectric actuator is configured in such a way as to be able to apply potential to the fourth electrodes 45 independently of one another. In the case where the pull-push method is employed, the fourth electrodes 45 and the third electrodes 41 are placed at the same potential prior to ejection of liquid droplets, where contraction of the second active region 53B is not utilized. When the third electrodes 41 are placed at a potential above the reference potential again, the fourth electrodes are placed at the reference potential such that contraction of the second active region 53B is utilized. Alternatively, contraction of the second active region 53B may be utilized prior to ejection of liquid droplets. The choice of whether or not to utilize contraction of the second active region 53B may be made in accordance with the amount of liquid droplets that are to be ejected (the size of dots that are to be formed on the recording medium on the basis of the image data). In any case, the time period over which the first active region 53A expands and the time period over which the second active region 53B expands overlap or coincide with each other, and the time period over which the first active region 53A contracts and the time period over which the second active region 53B contracts overlap or coincide with each other.

The second electrodes 37 and the fourth electrodes 45 are placed at the same potential (the reference potential). Thus, the potential difference between the third electrodes 41 and the second electrodes 37 is equal to the potential difference between the third electrodes 41 and the fourth electrodes 45. In other words, the voltage applied to the region included in the first active region 53A and being part of the second piezoelectric layer 29B is equal in magnitude to the voltage applied to the second active region 53B. The former voltage is applied across the thickness of one piezoelectric layer 29 (the piezoelectric layer 29B), whereas the latter voltage is applied across the thicknesses of two piezoelectric layers (the piezoelectric layers 29C and 29D). The electric field created by the former voltage is therefore more intense than the electric field created by the latter voltage. The same holds for the relation between the second active region 53B and the region included in the first active region 53A and being part of the first piezoelectric layer 29A. When viewed from another perspective, (the amount of change in) the electric field intensity in the first active region 53A is greater than (the amount of change in) the electric field intensity in the second active region 53B when liquid is ejected.

During the liquid ejection control in the present embodiment, the electric field intensity in the first active region 53A increases or decreases together with the electric field intensity in the second active region 53B. In some embodiments, the electric field intensities in the respective regions do not change in like manner. A comparison of the electric field intensity in the first active region 53A and the electric field intensity in the second active region 53B may be made on the basis of the respective maximum values. Although there may be exceptions depending on the specific driving wave form, the intensity of the electric field applied immediately before the ejection timing (and not during ejection) under the pull-push method may be regarded as the maximum value of the electric field intensity in the active regions 53 during the liquid ejection control. Due to the electric field concerned, the piezoelectric elements 27 are kept bent toward the pressure chambers 21. The application of electric field to the first active region 53A and the application of electric field to the second active region 53B may be controlled independently of each other, in which case the electric field intensity at a point in time in one of the regions of interests for comparison and the electric field intensity at another point in time in the other region may be regarded as the maximum values of the electric field intensities in the respective regions.

(Reorientation Control)

The bending and deformation of the piezoelectric elements 27 exert stress on the first inactive region 55A repeatedly along the surface, thus causing shifts of a domain wall (domain switching). The amount of displacement of the piezoelectric elements 27 is reduced accordingly. To inhibit such a reduction in the amount of displacement, the first inactive region 55A is subjected to poling process such that the state of polarization in the first inactive region 55A is kept constant.

The poling process in which the reorientation electrodes 35 are involved may be conducted at any desired timing while no liquid droplet is ejected. The poling process may be triggered by the user's operation on the printer 1 while printing is not performed. That is, the poling process may be conducted at any desired timing. The controller 88 may count the number of print jobs and may conduct the poling process upon completion of a predetermined number of print jobs. The printer 1 may be shipped with no poling process conducted on the first inactive region 55A. Alternatively, the first inactive region 55A may be in a polarized state similar to the state that can be caused by the poling process in which reorientation electrodes 35 are involved.

As described above with reference to FIG. 6, the first inactive region 55A in the present embodiment is polarized in the thickness direction. In the poling process, a voltage (direct current) is applied in the polarization direction of the first inactive region 55A by the driver 61 (the second signal source 65), as denoted by arrows in FIG. 12. For example, the voltage to be applied is such that an electric field whose intensity is greater than the intensity of the coercive electric field in the first inactive region 55A is created, or the voltage to be applied is at or above the voltage at which polarization becomes saturated.

To that end, the reorientation electrodes 35 in the illustrated example are placed at a potential above the reference potential (i.e., at a positive potential). Each of the third electrodes 41 is electrically floating. Each of the fourth electrodes 45 is placed at the reference potential. An electric field is created between the reorientation electrode 35 and the fourth electrode 45 accordingly. The creation of the electric field is less affected by the third electrode 41, which is located between the reorientation electrode 35 and the fourth electrode 45 and is electrically floating. The electric field is applied to the first inactive region 55A and the second active region 53B.

The polarization direction in the example described above is a downward direction, as illustrated in FIG. 6. In a case where the polarization direction is reversed, the reorientation electrodes 35 may be placed at a potential below the reference potential (i.e., at a negative potential). The fourth electrodes 45 may be placed at a potential different from the reference potential in a state in which the fourth electrodes 45 are not electrically connected to the plate 25J made of metal, where the fourth electrodes 45 and the reorientation electrodes 35 are involved in the creation of the electric field. In this case, the reorientation electrodes 35 may be placed at the reference potential or may be placed at any other potential.

A voltage may be applied to conduct the poling process in a state in which the first electrodes 33, the second electrode 37, and the fourth conductor layer 31D are placed at the reference potential or are electrically floating. As mentioned above, the first electrodes 33 in the present embodiment are electrically connected to the third electrodes 41 and are thus electrically floating. The second electrodes 37 and the fourth conductor layer 31D are placed at the reference potential.

The method for manufacturing the head main body 7 may be analogous to any of various well-known methods and methods into which various well-known methods are adopted. For example, the piezoelectric actuator 13 may be obtained in the following manner: ceramic green sheets that are to be formed into the piezoelectric layers 29 are each coated with conductive paste that is to be formed into the conductor layers 31 and the through-conductors, and the ceramic green sheets are stacked in layers and are then fired. The channel member 11 may be obtained in the following manner: through-holes that are to be formed into channels are provided in the plates 25 by, for example, etching, and the plates 25 are then bonded together with an adhesive. The piezoelectric actuator 13 and the channel member 11 are then bonded together with an adhesive to obtain the head main body 7.

The poling process may be conducted on the active regions 53 at any desired timing after the piezoelectric actuator 13 is obtained by firing (e.g., after the piezoelectric actuator 13 is bonded to the channel member 11). In the poling process, direct current is applied to the first electrodes 33, the second electrodes 37, the third electrodes 41, and the fourth electrodes 45 in such a way as to apply the electric fields denoted by the arrows y1 and y2 in FIG. 11. For example, the voltage to be applied is such that an electric field whose intensity is greater than the intensity of the coercive electric field in the active regions 53 is created, or the voltage to be applied is at or above the voltage at which polarization becomes saturated.

As mentioned above, the liquid ejection heads 2 according to the present embodiment each include the channel member 11, the piezoelectric actuator 13, and the driver 61. The channel member 11 has the pressure applying surface 11*b* and includes the pressure chamber 21 that has an opening defined in the pressure applying surface 11*b*. The piezoelectric actuator 13 is disposed on the pressure applying surface 11*b*. The driver 61 is configured to drive the piezoelectric actuator 13. The piezoelectric actuator 13 includes the first active region 53A and the second active region 53B. With a thickness direction being defined as the (D3) direction perpendicular to the pressure applying surface 11*b*, the first active region 53A is made of a piezoelectric member polarized in the thickness direction. The first active region 53A extends over the midsection 21*a* of the pressure chamber 21 when viewed in plan through the pressure applying surface 11*b*. The second active region 53B is made of a piezoelectric member polarized in the thickness direction and closer than the first active region 53A to the pressure applying surface 11*b*. The second active region 53B extends over both the peripheral section 21*b* of the pressure chamber 21 and the outer region 11*e* located outside the pressure chamber 21 when viewed in plan through the pressure applying surface 11*b*. When performing the liquid ejection control, the driver 61 controls the intensity of the first electric field applied to the first active region 53A in the thickness direction (and denoted by the arrows y1 in FIG. 11) and the intensity of the second electric field applied to the second active region 53B in the thickness direction (and denoted by the arrows y2 in FIG. 11) in such a manner that the time period over which the first active region 53A expands along the pressure applying surface 11*b* and the time period over which the second active region 53B expands along the pressure applying surface 11*b* overlap or coincide with each other and the time period over which the first active region 53A contracts along the pressure applying surface 11*b* and the time period over which the second active region 53B contracts along the pressure applying surface 11*b* overlap or coincide with each other. When the liquid ejection control is performed, the maximum value of the intensity of the first electric field is greater than the maximum value of the intensity of the second electric field.

Thus, the amount of displacement of the piezoelectric elements 27 as a whole may be increased by driving not only the first active region 53A but also the second active region 53B. The channel member 11 restricts the deformation of the region included in the second active region 53B and extending over the outer region 11*e* located outside the pressure chamber 21. Accordingly, the region closer to the periphery of the pressure chamber 21 tends to be subjected to a greater stress. This problem can be averted when the electric field applied to the first active region 53A is more intense than the electric field applied to the second active region 53B. Thus, the stress exerted on the second active region 53B is reduced while the piezoelectric elements 27 as a whole can keep undergoing a large amount of displacement as mentioned above. The reduction in the stress exerted on the second active region 53B leads to an increase in the durability of the head 2.

The head 2 according to the present embodiment includes three or more electrodes (i.e., the electrodes 33, 37, 41, and 45). The three or more electrodes are at different positions in the thickness direction. The three or more electrodes each apply the first electric field to the first active region 53A and/or apply the second electric field to the second active region 53B. Of the three or more electrodes, two electrodes that are adjacent to each other in the thickness direction and apply the first electric field are arranged at a first distance from each other in the thickness direction. For example, the first distance refers to the distance between the electrodes 33 and 37 in the thickness direction and/or the distance between the electrodes 37 and 41 in the thickness direction. Of the three or more electrodes, two electrodes adjacent to each other in the thickness direction and apply the second electric field are arranged at a second distance from each other in the thickness direction. For example, the second distance refers to the distance between the electrodes 41 and 45 in the thickness direction. The first distance is shorter than the second distance.

When the voltage (potential difference) inducing the first electric field applied to the first active region 53A is equal in magnitude to the voltage (potential difference) inducing the second electric field applied to the second active region 53B, the first electric field is more intense than the second electric field. This feature provides the ease of ensuring that the first electric field is more intense than the second electric field.

The liquid ejection control in the present embodiment involves, in addition to the distance relationship between the electrodes, the following feature: the maximum value of the potential difference between the two electrodes applying the first electric field to the first active region 53A (the potential difference between the electrodes 33 and 37 and/or the potential difference between the electrodes 37 and 41) is equal to the maximum value of the potential difference between the two electrodes (i.e., the electrodes 41 and 45) applying the second electric field to the second active region 53B.

Thus, one of the two electrodes that apply the first electric field and one of the two electrodes that apply the second electric field are connectable to each other (or can be integrated into one electrode), and the other electrode that applies the first electrode and the other electrode that applies the second electric field are connectable to each other. With such structural simplicity, the first electric field can be made more intense than the second electric field.

The piezoelectric actuator in the present embodiment includes the first to fourth piezoelectric layers (denoted by 29A to 29D), the first electrode 33, the second electrode 37, and the third electrode 41, and the fourth electrode 45. One of two surfaces of the piezoelectric actuator 13 that is farther than the other surface of the piezoelectric actuator 13 from the channel member 11 is located on a first side (+D3 side), whereas the other surface of the piezoelectric actuator 13 (the surface closer to the channel member 11) is located on a second side (−D3 side). The first piezoelectric layer 29A, the second piezoelectric layer 29B, the third piezoelectric layer 29C, and the fourth piezoelectric layer 29D are stacked in sequence from the first side to the second side. The first electrode 33 is disposed on the first piezoelectric layer 29A to lie on a surface of the first piezoelectric layer 29A on the first side and extends over the midsection 21*a* of the pressure chamber 21 in a see-through plan view. The second electrode 37 is disposed on the first piezoelectric layer 29A to lie on a surface of the first piezoelectric layer 29A on the second side and extends over the midsection 21*a* in a see-through plan view. The third electrode 41 is disposed on the second piezoelectric layer 29B to lie on a surface of the second piezoelectric layer 29B on the second side and extends over the midsection 21*a*, the peripheral section 21*b* of the pressure chamber 21, and the outer region 11*e* located outside the pressure chamber 21 in a see-through plan view. The fourth electrode 45 is disposed on the fourth piezoelectric layer 29D to lie on a surface of the fourth piezoelectric layer 29D on the second side and extends over the peripheral section 21*b* and the outer region 11*e* in a see-through plan view. The first active region 53A includes: a region that is part of the first piezoelectric layer 29A and that is located between the first electrode 33 and the second electrode 37; and a region that is part of the second piezoelectric layer 29B and that is located between the second electrode 37 and a portion included in the third electrode 41 and extending over the midsection 21*a*. The second active region 53B includes a region that is part of the third piezoelectric layer 29C and the fourth piezoelectric layer 29D and that is located between the fourth electrode 45 and a portion included in the third electrode 41 and extending over the peripheral section 21*b* and the outer region 11*e*.

This enables the adoption of a simple approach by which the first electric field applied to the first active region 53A is made greater in strength than the second electric field applied to the second active region 53B. For example, three electrodes (the electrodes 33, 37, and 41) that are at different positions in the thickness direction applies a voltage to two piezoelectric layers 29 (the piezoelectric layers 29A and 29B) in the first active region 53A, and two electrodes apply a voltage to two piezoelectric layers 29 (the piezoelectric layer 29C and the piezoelectric layer 29D) in the second active region 53B. This approach provides the ease with which the distance between two electrodes that apply a voltage to the first active region 53A can, as mentioned above, be made shorter than two electrodes that apply a voltage to the second active region 53B. With the effects produced by the distance relationship, the voltage applied to the first active region 53A (the piezoelectric layers 29A and 29B) and the voltage applied to the second active region 53B (the piezoelectric layer 29C and the piezoelectric layer 29D) are made equal in magnitude, in which case structural simplicity may be achieved without substantial increase in potential. The third electrode 41 is involved in both application of voltage to the first active region 53A and application of voltage to the second active region 53B. This feature enables a reduction in the number of electrodes (conductor layers 31).

In the present embodiment, the region being part of the first piezoelectric layer 29A and included in the first active region 53A and the region being part of the second piezoelectric layer 29B and included in the first active region 53A are polarized in opposite directions. The region being part of the third piezoelectric layer 29C and part of the fourth piezoelectric layer 29D and included in the second active region 53B and the region being part of the first piezoelectric layer 29A and included in the first active region 53A are polarized in the same direction. With the first electrode 33 and the third electrode 41 placed at the same potential and the second electrode 37 and the fourth electrode 45 placed at the same potential, the liquid ejection control is performed in such a manner that a difference between the potential of the first electrode 33 and the third electrode 41 and the potential of the second electrode 37 and the fourth electrode 45 causes application of the first electric field to the first active region 53A and application of the second electric field to the second active region 53B.

For example, three regions are subjected to application of electric fields. One is the region included in the first active region 53A and being part of the first piezoelectric layer 29A. Another is the region included in the first active region 53A and being part of the second piezoelectric layer 29B. The other is the second active region 53B. In this case, only two different potentials may be used to apply electric fields to the three regions in their respective polarization directions (or in directions opposite to the respective polarization directions). The piezoelectric actuator 13 and the driver 61 can achieve structural simplicity accordingly.

In the present embodiment, the sum of the thickness of the third piezoelectric layer 29C and the thickness of the fourth piezoelectric layer 29D is greater than the thickness of the first piezoelectric layer 29A and is greater than the thickness of the second piezoelectric layer 29B.

When viewed from another perspective, the distance between the first electrode 33 and the second electrode 37 and the distance between the second electrode 37 and the third electrode 41 are each shorter than the distance between the third electrode 41 and the fourth electrode 45. This feature provides the ease with which the electric field applied to the region included in the first active region 53A and being part of the first piezoelectric layer 29A and the electric field applied to the region included the first active region 53A and being part of the second piezoelectric layer 29B are each made greater in strength than the electric field applied to the second active region 53B.

The piezoelectric actuator 13 in the present embodiment includes the conductor pattern (the fourth conductor layer 31D) that is disposed on the third piezoelectric layer 29C to lie on a surface of the third piezoelectric layer 29C on the second side (the −D3 side) and that is located on the outer side with respect to the second active region 53B in a see-through plan view.

As mentioned above, the present embodiment involves the use of three electrodes (the electrodes 33, 37, and 41) for application of voltage to the first active region 53A and two electrodes (the electrodes 41 and 45) for application of voltage to the second active region 53B, where the third electrode 41 serves both of the purposes. In the piezoelectric actuator 13, the volume of the conductor on the first side (the +D3 side) is thus likely to be greater than the volume of the conductor on the second side. The imbalance can be averted by the addition of the fourth conductor layer 31D, which provides the ease with which the volume of the conductor (the proportion of the conductor in the piezoelectric layers) on the +D3 side becomes equal to the volume of the conductor on the −D3 side. This feature reduces the possibility that contraction associated with firing and/or expansion and contraction associated with temperature variations during periods of use will cause unintended bending and deformation.

When the first portion 53Ba and the second portion 53Bb in the present embodiment are viewed in plan through the pressure applying surface 11*b*, the second portion 53Bb is greater in area than the first portion 53Ba, where the first portion 53Ba is part of the second active region 53B and extends over part of the pressure chamber 21, and the second portion 53Bb is part of the second active region 53B and is located outside the pressure chamber.

If the outer edge of the second active region 53B (the outer edge of the second portion 53Bb) is close to the periphery of the pressure chamber 21, stress would be likely to concentrate in a region close to the periphery of the pressure chamber 21. Making the second portion 53Bb greater in area than the first portion 53Ba is an uncomplicated way to increase the distance between the outer edge of the second active region 53B and the periphery of the pressure chamber 21. The concentration of stress will be reduced accordingly. This reduces the possibility that the junction between the piezoelectric actuator 13 and the channel member 11 will deteriorate along the periphery of the pressure chamber 21. As mentioned above, the stress exerted on the second active region 53B may be reduced when the first electric field applied to the first active region 53A is greater in strength than the second electric field applied to the second active region 53B (i.e., when the second electric field is made relatively weak). The concentration of stress in the region close to the periphery of the pressure chamber 21 may be further reduced accordingly.

In the present embodiment, the periphery of the pressure chamber 21 viewed in plan through the pressure applying surface 11*b* includes a circular arc that subtends an angle of 180° or more at the center of the pressure chamber 21.

In this case, the stress is uniformly distributed along the circular arc in a plan view. In other words, exceptionally high stress is less likely to be exerted. The concentration of stress may be further reduced accordingly. The effect may be enhanced especially when the planar shape of the pressure chamber 21 is circular, that is, when the shape of the pressure chamber 21 is defined by only the circle C1 in FIG. 4.

In the present embodiment, the width w2 of the second portion 53Bb is greater than the width w1 of the first portion 53Ba in a sectional view taken along a line passing through the center of the pressure chamber 21 and orthogonal to the pressure applying surface 11*b*.

In this case, the distance between the outer edge of the second active region 53B and the periphery of the pressure chamber 21 is increased correspondingly. This feature enables the stress concentration reduction that has been mentioned above in relation to the effect of making the second portion 53Bb greater in area than the first portion 53Ba. The concentration of stress therefore may be further reduced when both of the following conditions are satisfied: (i) the second portion 53Bb is greater in area than the first portion 53Ba; and (ii) the width w2 is greater than the width w1.

The piezoelectric actuator 13 in the present embodiment includes the inactive region (the first inactive region 55A). The first inactive region 55A is made of a piezoelectric member and extends to the perimeter of the first active region 53A. The driver 61 performs the reorientation control (see FIG. 12). When not performing the liquid ejection control, the driver 61 performs the reorientation control by which an electric field is applied to the first inactive region 55A in the thickness direction.

Although domain switching in the first inactive region 55A causes a reduction in the amount of displacement as mentioned above, the poling process inhibits such a reduction in the amount of displacement. Domain switching is likely to occur in the first inactive region 55A, which is subject to both the stress exerted by the first active region 53A and the stress exerted by the second active region 53B. The poling process conducted on the first inactive region 55A effectively inhibits the reduction in the amount of displacement. As mentioned above, the stress exerted on the second active region 53B may be reduced when the first electric field applied to the first active region 53A is greater in strength than the second electric field applied to the second active region 53B (i.e., when the second electric field is made relatively weak). Consequently, the stress exerted on the first inactive region 55A by the second active region 53B may be reduced. As a result, the probability of occurrence of domain switching in the first inactive region 55A is reduced, in which case the poling process may be conducted on the first inactive region 55A less frequently.

The piezoelectric actuator 13 in the present embodiment includes the reorientation electrode 35, an intermediate electrode (the third electrode 41), and a lower electrode (the fourth electrode 45). The reorientation electrode 35 is disposed on the inactive region (the first inactive region 55A) to lie on the side (the +D3 side) opposite the pressure applying surface 11*b*. The third electrode 41 is located between the first inactive region 55A and the second active region 53B. The fourth electrode 45 is disposed on the second active region 53B to lie on the side (the −D3 side) on which the pressure applying surface 11*b* is located. When performing the liquid ejection control, the driver 61 applies an electric field to the second active region 53B by applying a voltage to the third electrode 41 and the fourth electrode 45. When performing the reorientation control, the driver 61 applies an electric field to the first inactive region 55A by applying a voltage to the reorientation electrode 35 and one of the third electrode 41 and the fourth electrode 45. In the present embodiment, the driver 61 applies a voltage to the reorientation electrode 35 and the fourth electrode 45.

In this case, the fourth electrode 45 (or the third electrode 41) serves both the purpose of applying an electric field to eject liquid droplets and the purpose of applying an electric field to conduct the poling process. The piezoelectric actuator 13 can achieve structural simplicity accordingly.

The piezoelectric actuator 13 in the present embodiment includes, in addition to the aforementioned constituent elements, an upper electrode (the second electrode 37). The second electrode 37 is closer than the intermediate electrode (the third electrode 41) to the side (the +D3 side) opposite the pressure applying surface 11*b*, and the second electrode 37 is opposite the third electrode 41 with at least part of the first active region 53A located therebetween. When performing the liquid ejection control, the driver 61 applies an electric field to the first active region 53A by applying a voltage to the second electrode 37 and the third electrode 41. When performing the reorientation control, the driver 61 applies an electric field to the inactive region (the first inactive region 55A) by applying a voltage to the reorientation electrode 35 and the fourth electrode 45, without applying a potential to the third electrode 41.

When the control for ejecting liquid droplets is performed, the third electrode 41 serves both the purpose of applying an electric field to the first active region 53A and the purpose of applying an electric field to the second active region 53B. The piezoelectric actuator 13 can achieve structural simplicity accordingly. When the poling process is conducted, the third electrode 41 is electrically floating and is thus less likely to interfere with the electric field applied by the reorientation electrode 35 and the fourth electrode 45. The poling process is conducted by using the reorientation electrode 35 and the fourth electrode 45, in which case not only the first inactive region 55A but also the second active region 53B is subjected to the poling process. Accordingly, the characteristics of the piezoelectric actuator are less susceptible not only to the domain switching in the first inactive region 55A but also to the domain switching in the second active region 53B.

As mentioned above, the piezoelectric actuator in the present embodiment includes the first to fourth piezoelectric layers (denoted by 29A to 29D), the first electrode 33, the second electrode 37, the third electrode 41, and the fourth electrode 45 such that the first active region 53A and the second active region 53B are defined in the piezoelectric actuator. The inactive region (the first inactive region 55A) includes a region being part of the first piezoelectric layer 29A and part of the second piezoelectric layer 29B and located between the reorientation electrode 35 and the fourth electrode 45.

This enables the adoption of the aforementioned simple approach by which the electric field applied to the first active region 53A is made greater in strength than the electric field applied to the second active region 53B. With such structural simplicity, the stress exerted on the second active region 53B and the stress exerted on the first inactive region 55A by the second active region 53B may be reduced accordingly.

Second Embodiment

Figure 13:
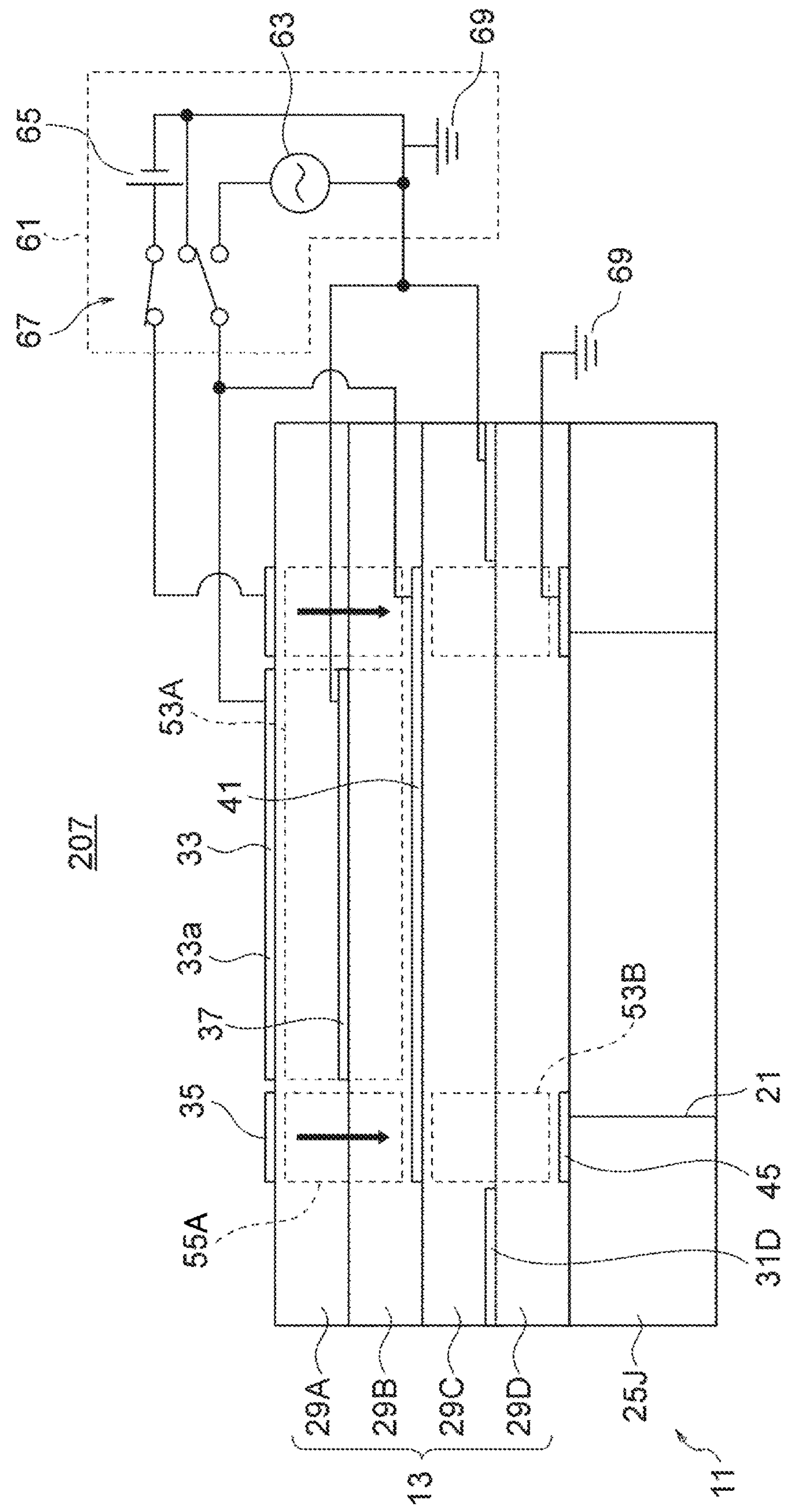
FIG. 13 is a schematic sectional view of a liquid ejection head according to a second embodiment.

FIG. 13 is a schematic sectional view of a head 207 according to a second embodiment. FIG. 13 is analogous to FIG. 12 relevant to the first embodiment; that is, FIG. 13 illustrates a state in which potentials are applied to the conductor layers 31 when the poling process is conducted on the first inactive region 55A.

The poling process in the first embodiment involves the application of an electric field to the first inactive region 55A by the reorientation electrodes 35 and the fourth electrodes 45. The poling process in the second embodiment involves the application of an electric field to the first inactive region 55A by the reorientation electrodes 35 and the third electrodes 41. More specifically, the reorientation electrodes 35 in the illustrated example are placed at a potential above the reference potential (i.e., at a positive potential). The third electrodes 41 are placed at the reference potential.

The polarization direction in the example described above is a downward direction, as illustrated in FIG. 6. In a case where the polarization direction is reversed, the reorientation electrodes 35 may be placed at a potential below the reference potential (i.e., at a negative potential). The third electrodes 41 may be placed at a potential different from the reference potential. In this case, the reorientation electrodes 35 may be placed at the reference potential or may be placed at any other potential.

As mentioned above, a voltage may be applied to conduct the poling process in a state in which the first electrodes 33, the second electrodes 37, the fourth electrodes 45, and the fourth conductor layer 31D are placed at the reference potential or are electrically floating. As mentioned above, the first electrodes 33 are electrically connected to the third electrode 41. Thus, the first electrodes 33 in the present embodiment are placed at the reference potential. The second electrodes 37, the fourth electrodes 45, and the fourth conductor layer 31D are placed at the reference potential.

Third Embodiment

Figure 14:
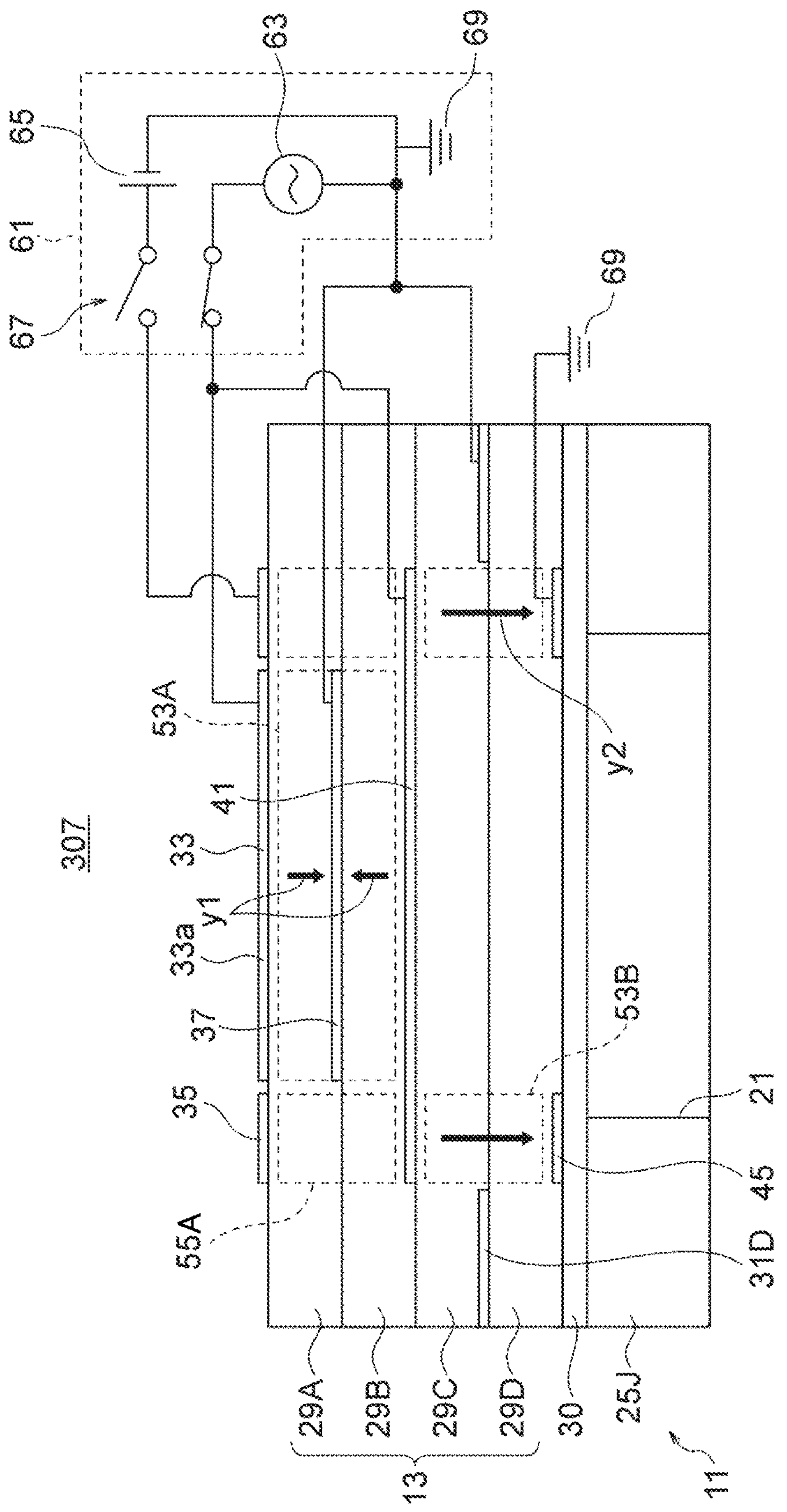
FIG. 14 is a schematic sectional view of a liquid ejection head according to a third embodiment.

FIG. 14 is a schematic sectional view of a head 307 according to a third embodiment and is analogous to FIG. 11 relevant to the first embodiment.

The fifth conductor layer 31E (the fourth electrodes 45) in the first embodiment is in contact with the channel member 11 (the plate 25J) and is exposed in the pressure chambers 21. In the present embodiment, an insulating layer 30 is located between the fifth conductor layer 31E and the channel member 11. When viewed from another perspective, the insulating layer 30 is located between the second active region 53B and the channel member 11. The insulating layer 30 may be regarded as part of the piezoelectric actuator 13, as part of the channel member 11, or as a member different from the piezoelectric actuator 13 and the channel member 11. Referring to FIG. 14, the insulating layer 30 is regarded as a member different from the piezoelectric actuator 13 and the channel member 11 and is thus denoted by its own reference numeral.

The insulating layer 30 may be made of an inorganic material or an organic material. The inorganic material may be a piezoelectric material or a material other than piezoelectric materials. The piezoelectric material of the insulating layer 30 may be identical to or different from the material of the piezoelectric layers 29. The insulating layer 30 may be fired together with or independently of the piezoelectric the piezoelectric layers 29. An example of the inorganic material other than piezoelectric materials is SiO2. An example of the organic material is resin. In a case where the insulating layer 30 is not obtained by firing a piezoelectric material, the insulating layer 30 may be formed on a lower surface of the piezoelectric actuator 13 by chemical vapor deposition (CVD) or any other method for forming a thin film or may be bonded to the piezoelectric actuator 13 or the channel member 11 with an adhesive.

As with the piezoelectric layers 29, the insulating layer 30 has a constant thickness and extends over the pressure chambers 21 substantially without a gap between one part and another part of the insulating layer 30. The insulating layer 30 can be laid only over and around a region immediately below the second active region 53B (the fourth electrodes 45) on condition that the insulating layer 30 is relatively thin. The insulating layer 30 may have any desired thickness. The insulating layer 30 may be thinner than each of the piezoelectric layer 29 as in the illustrated example. The insulating layer 30 may be equal in thickness to each of the piezoelectric layers 29 or may be thicker than each of the piezoelectric layers 29. The thickness of the insulating layer 30 may be set to any desired value, in light of expected effects (intensity and/or insulating properties, which will be described later) and/or with consideration given to the possible influence that the insulating layer 30 exerts on the position of the neutral plane of the piezoelectric actuator 13.

As with the second electrodes 37, the fourth electrodes 45 are connected to each other by wiring. More specifically, the fourth electrodes 45 are connected to each other by wiring included in the fifth conductor layer 31E. In some embodiments (not illustrated), the fourth electrodes 45 are individually connected, by wiring and through-conductors, to the signal lines of the FPC (not illustrated) oriented toward the first surface 13*a* of the piezoelectric actuator 13.

As mentioned above, the head 307 includes the insulating layer 30 located between the second active region 53B and the channel member 11.

The stress exerted on the second active region 53B by the channel member 11 may be reduced by the insulating layer 30. For example, a portion that belongs to the second active region 53B and extends over the outer region 11*e* located outside the pressure chamber 21 is restrained from undergoing deformation by the channel member 11 such that a region extending on the periphery of the pressure chamber 21 is likely to be subjected to great stress. The stress may be reduced by the insulating layer 30. The electrodes (the fourth electrodes 45) that apply a voltage to the second active region 53B in the thickness direction are covered with the insulating layer 30. The fourth electrodes 45 are thus insulated from the channel member 11 made of metal. Another advantage is that the fourth electrodes 45 are kept from contact with liquid in the pressure chambers 21. Thus, the fourth electrodes 45 are more protected from corrosion caused by the liquid, although this is not always true for every type of liquid.

Fourth Embodiment

Figure 15:
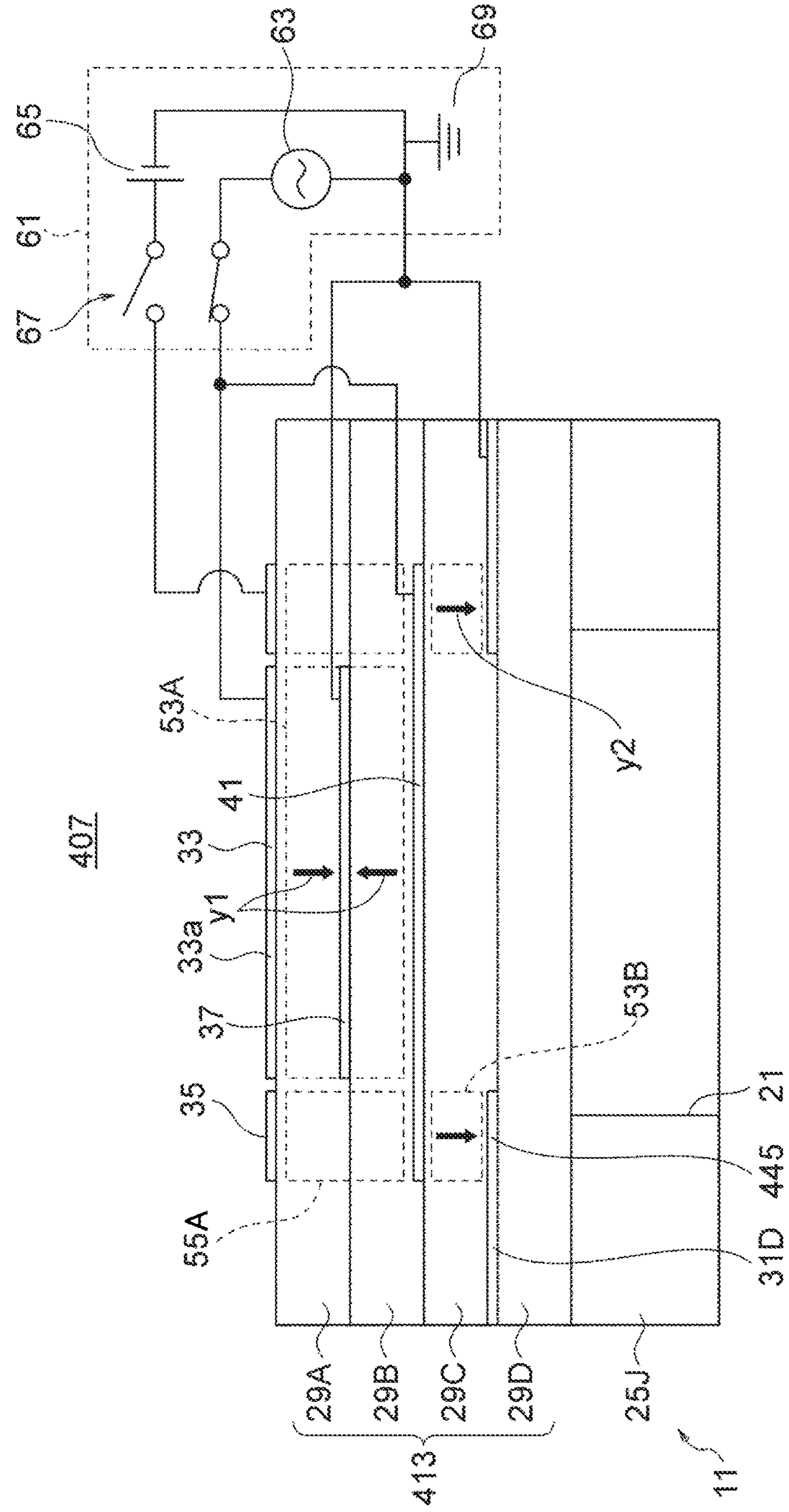
FIG. 15 is a schematic sectional view of a liquid ejection head according to a fourth embodiment.

FIG. 15 is a schematic sectional view of a head 407 according to a fourth embodiment and is analogous to FIG. 11 relevant to the first embodiment.

The piezoelectric actuator in the present embodiment is denoted by 413 and does not include the fifth conductor layer 31E, which has been described above in relation to the first embodiment. The fourth conductor layer 31D in the present embodiment includes fourth electrodes 445, which correspond to the fourth electrodes 45 in the first embodiment. The second active region 53B is part of the third piezoelectric layer 29C and corresponds to an overlap between each of the third electrodes 41 and the corresponding one of the fourth electrodes 445; that is, the fourth piezoelectric layer 29D is not included in the second active region 53B. The present embodiment may be understood as analogous to the third embodiment in the following respect: an insulating layer (the fourth piezoelectric layer 29D in the present embodiment) is located between the second active region 53B and the channel member 11.

Each of the fourth electrode 445 may have any desired shape, although it is required that there be an overlap between the fourth electrode 445 and the second active region 53B. The shape of the fourth electrodes 445 may be a combination of the shape of the fourth electrode 45 in the first embodiment and the shape of the fourth conductor layer 31D in the first embodiment. In other words, the fourth conductor layer 31D in the present embodiment is defined such that the perimeter of each opening 43 in the fourth conductor layer 31D in the first embodiment substantially coincides with the outer edge of each electrode main part 33*a* and/or the outer edge of each second electrode 37. The fourth electrodes 445 may be geometrically analogous to the fourth electrodes 45 in the first embodiment. As with the second electrodes 37, the fourth electrodes 445 are connected to each other by wiring. More specifically, the fourth electrodes 445 are connected to each other by lines included in the fourth conductor layer 31D. The fourth electrodes 445 may be connected to any desired wiring and through-conductors in such a way as to be able to be placed at the respective potentials independently of one another.

The potential at which the fourth electrodes 445 are placed for ejection of liquid and for the poling process may be understood as analogous to the potential of the fourth electrodes 45 in the first embodiment. In the illustrated example, the distance between the electrodes in the first active region 53A is substantially equal to the distance between the electrodes in the second active region 53B. Thus, the intensity of the electric field applied to the first active region 53A is substantially equal to the intensity of the electric field applied to the second active region 53B.

As has been described above in relation to the first embodiment, the electric field applied to the first active region 53A may be more intense than the electric field applied to the second active region 53B. The same holds for the present embodiment. The relationship between the electric field intensities may be adjusted in various ways. In an example, the third piezoelectric layer 29C is thicker than the first piezoelectric layer 29A and is thicker than the second piezoelectric layer 29B, and potentials are applied to the electrodes as in the first embodiment. In another example, each of the second electrodes 37 is not connected to the corresponding one of the fourth electrodes 445 such that these electrodes are able to be placed at different potentials. In this state, potentials may be applied in such a manner that the potential difference between the third electrode 41 and the second electrode 37 is greater than the potential difference between the third electrode 41 and the fourth electrode 445.

As mentioned above, the head 407 may be understood as analogous to the head according to the third embodiment in the following respect: the head 407 includes an insulating layer (the fourth piezoelectric layer 29D) located between the second active region 53B and the channel member 11. This feature produces effects equivalent to those produced in the third embodiment.

Fifth Embodiment

Figure 16:
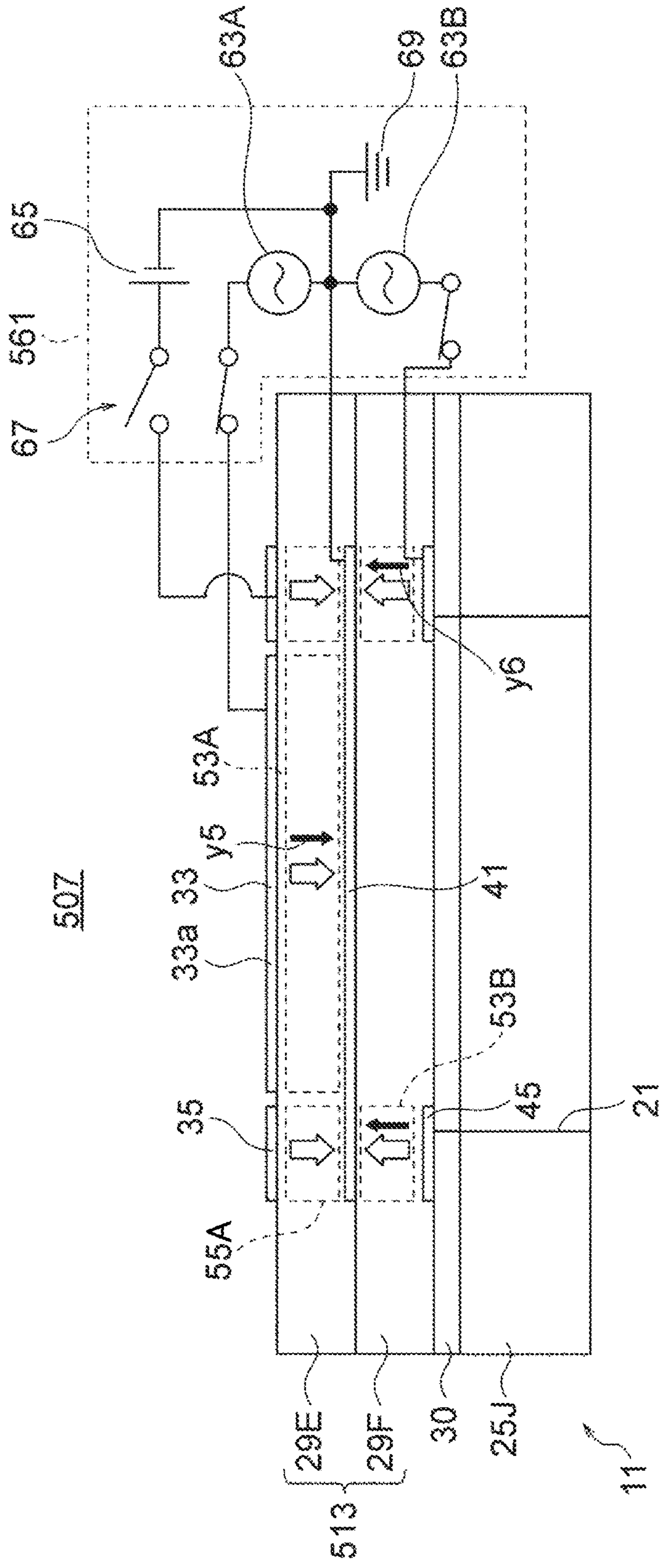
FIG. 16 is a schematic sectional view of a liquid ejection head according to a fifth embodiment.

FIG. 16 is a schematic sectional view of a head 507 according to a fifth embodiment and is analogous to FIG. 11 relevant to the first embodiment. As in FIG. 6, the polarization directions are indicated by hollow arrows in FIG. 16.

In the first embodiment, two piezoelectric layers 29 are partially included in the first active region 53A, and the other two piezoelectric layers 29 are partially included in the second active region 53B. The piezoelectric actuator in the present embodiment is denoted by 513 and includes a fifth piezoelectric layer 29E and a sixth piezoelectric layer 29F. The first active region 53A and the second active region 53B each include one piezoelectric layer 29; that is, the fifth piezoelectric layer 29E is partially included in the first active region 53A, and the sixth piezoelectric layer 29F is partially included in the second active region 53B.

Given this structure, the present embodiment may adopt varying combinations of polarization directions, electrode structures, and potentials to achieve the workings of the first active region 53A and the second active region 53B that have been described above with reference to FIG. 5. An example combination adopted in the illustrated examples is as follows.

As with the piezoelectric actuator in the first embodiment, the piezoelectric actuator 513 includes the first electrode 33 (and the reorientation electrode 35), the third electrode 41, and the fourth electrode 45 that are arranged in this order from the closest to the upper surface (i.e., in this order from the farthest from the lower surface). The first active region 53A is part of the fifth piezoelectric layer 29E and located between the first electrode 33 and the third electrode 41. The second active region 53B is part of the sixth piezoelectric layer 29F and located between the third electrode 41 and the fourth electrode 45. The fourth electrode 45 is insulated from the channel member 11 by the insulating layer 30 and is thus able to be placed at a potential different from the reference potential.

The first active region 53A and the second active region 53B are polarized in opposite directions. The liquid ejection control involves application of the reference potential to the third electrode 41 located between the first active region 53A and the second active region 53B. The first electrode 33 and the fourth electrode 45 are placed at potentials that are of the same polarity with respect to the reference potential. Thus, the first active region 53A and the second active region 53B contract in conjunction with each other or expand in conjunction with each other.

A driver 561 includes a signal source 63A and a signal source 63B. The signal source 63A applies a potential to the first electrode 33, and the signal source 63B applies a potential to the fourth electrode 45. The first electrode 33 and the fourth electrode 45 are thus able to be placed at different potentials. Thus, the present embodiment produces the effect similar to that is produced by the first embodiment; that is, the electric field applied to the first active region 53A may be greater in strength than the electric field applied to the second active region 53B. In another example (not illustrated), the first electrode 33 and the fourth electrode 45 are connected to each other and are placed at the same potential.

(Variations of Piezoelectric Layers)

Figure 17A:
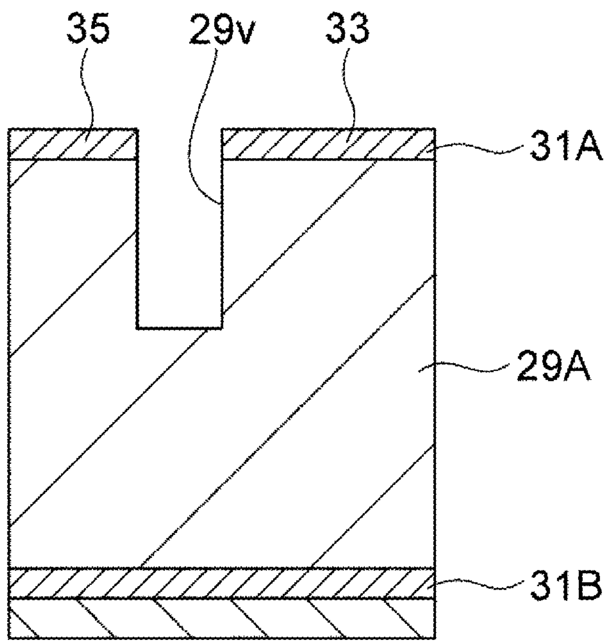
FIG. 17A is a sectional view of a variation of the piezoelectric layer.

FIG. 17A is a sectional view of a variation of the piezoelectric layer 29 and is an enlarged view of a region XVII in FIG. 10.

An upper surface of the first piezoelectric layer 29A may have grooves 29*v*, each of which is located between the corresponding one of the first electrodes 33 and the corresponding one of the reorientation electrodes 35. For example, the groove 29*v* extends along the outer edge of the first electrode 33 in a manner so as to surround the first electrode 33. In other words, the groove 29*v* is loop-shaped. The groove 29*v* may have a gap between one part and another part of it. For example, it is not required that the groove 29*v* be located at a position that is opposite the electrode main part 33*a* with the extended part 33*b* located therebetween.

The groove 29*v* may have any desired width within a range not greater than the gap between the first electrode 33 and the reorientation electrode 35. The width of the groove 29*v* may be constant throughout in the longitudinal direction of the groove 29*v* or may vary from place to place in the longitudinal direction of the groove 29*v*. The groove 29*v* may have any desired depth within a range not greater than the thickness of the first piezoelectric layer 29A. For example, the depth of the groove 29*v* may be less than one half of the thickness of the first piezoelectric layer 29A or may be equal to or greater than one half of the thickness of the first piezoelectric layer 29A. The groove 29*v* may be equal in thickness to the first piezoelectric layer 29A.

The grooves 29*v* may be formed by any desired means. For example, the grooves 29*v* may be formed in a ceramic green sheet that is to be formed into the first piezoelectric layer 29A. Alternatively, the grooves 29*v* may be formed by laser machining after the first piezoelectric layer 29A is fired.

The grooves 29*v* reduce the possibility that metallic materials of the first electrodes 33 and the reorientation electrodes 35 will get into the region between these electrodes (migration of metallic materials). Thus, the first electrodes 33 and the reorientation electrodes 35 are less likely to short-circuit. The alternative view is that this feature provides ease of conducting the poling process on part of the first inactive region 55A or, more specifically, on a region adjacent to the first active region 53A in a state in which each of the first electrodes 33 and the corresponding one of the reorientation electrodes 35 are close to each other when viewed in plan. The effect of the poling process is enhanced accordingly; that is, the characteristics of the piezoelectric actuator are less likely to be impaired. The term "migration" herein refers to electromigration and/or electrochemical migration.

Figure 17B:
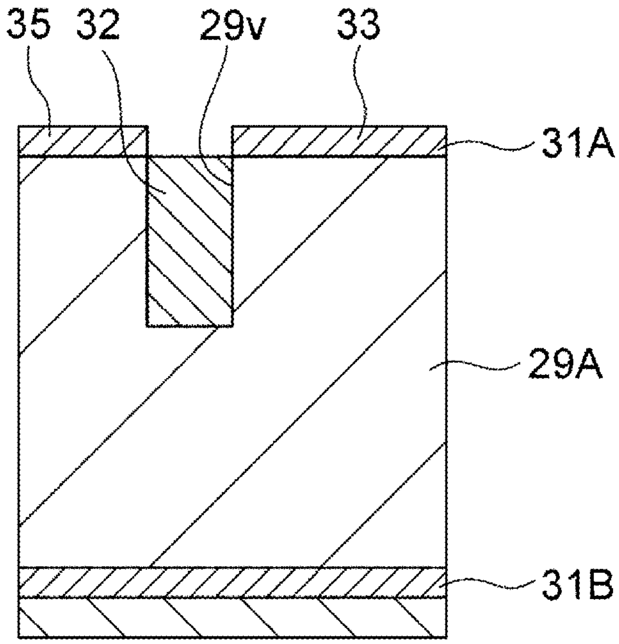
FIG. 17B is a sectional view of another variation of the piezoelectric layer.

FIG. 17B is a sectional view of another variation of the piezoelectric layer 29 and is an enlarged view analogous to FIG. 17A.

The groove 29*v* may be provided with an insulator 32. The insulator 32 is made of a material that reduces the probability of occurrence of migration of the electrode materials further than would be possible with the material of the first piezoelectric layer 29A. For example, the insulator 32 is made of resin. Resin may be applied to the grooves 29*v* by CVD or any other desired means.

The probability of occurrence of migration is further reduced by the insulator 32. While reducing the probability of occurrence of migration, the insulator 32 also reduces the possibility that the grooves 29*v* will cause a shortage of strength of the piezoelectric actuator.

In each of the embodiments described above, the third electrode 41 is an example of the intermediate electrode, and the fourth electrode 45 or 445 is an example of the lower electrode.

The technique disclosed herein is not limited to the embodiments described above and may be implemented in various forms.

For example, the first inactive region is not necessarily subjected to the poling process. That is, the heads may come without the components specially designed for poling process. The liquid ejection control involves a control other than the control (a first control) in which the time period over which the first active region expands and the time period over which the second active region expands overlap or coincide with each other and the time period over which the first active region contracts and the time period over which the second active region contracts overlap or coincide with each other. For example, the liquid ejection control involves a control (a second control) in which the time period over which the first active region expands and the time period over which the second active region contracts overlap or coincide with each other and the time period over which the first active region contracts and the time period over which the second active region expands overlap or coincide with each other. The first control may be performed to eject large liquid droplets, whereas the second control may be performed to eject small liquid droplets. In some embodiments, liquid circulates through the heads.

Various concepts can be derived from the embodiments of the present disclosure. For example, the following concept is derived in relation to the liquid ejection head: the second portion being part of the second active region and located outside the pressure chamber is greater in area than the first portion being part of the second active region and extending over the pressure chamber when the second active region is viewed in plan through the pressure applying surface. The following concept is also derived in relation to the liquid ejection head: the piezoelectric actuator includes an inactive region (made of a piezoelectric member) extending to the perimeter of the first active region; and when not performing the liquid ejection control, the driver performs the reorientation control by which an electric field is applied to the inactive region in the thickness direction. The liquid ejection head according to these concepts may differ from the liquid ejection heads according to the embodiments described above in the following respect: the maximum value of the intensity of the electric field (the first electric field) applied to the first active region is equal to the maximum value of the intensity of the electric field (the second electric field) applied to the second active region, or the latter is greater than the former.

The invention claimed is:

1. A liquid ejection head comprising a channel member comprising a pressure applying surface, and a pressure chamber comprising an opening defined in the pressure applying surface;

a piezoelectric actuator disposed on the pressure applying surface, wherein a thickness direction is perpendicular to the pressure applying surface, the piezoelectric actuator comprising:

a first active region made of a piezoelectric member polarized in the thickness direction, the first active region extending over a midsection of the pressure chamber when viewed in a plan view through the pressure applying surface, and a second active region made of another piezoelectric member polarized in the thickness direction and closer than the first active region to the pressure applying surface, the second active region extending over both a peripheral section of the pressure chamber and an outer region located outside the pressure chamber when viewed in the plan view through the pressure applying surface;

a driver configured to drive the piezoelectric actuator and to perform liquid ejection control for ejecting liquid, the liquid ejection control including control of an intensity of a first electric field applied to the first active region in the thickness direction and an intensity of a second electric field applied to the second active region in the thickness direction in at least one of a first manner in which a time period over which the first active region expands along the pressure applying surface and a time period over which the second active region expands along the pressure applying surface overlap or coincide with each other or a second manner in which a time period over which the first active region contracts along the pressure applying surface and a time period over which the second active region contracts along the pressure applying surface overlap or coincide with each other; and three or more electrodes at different positions in the thickness direction, the three or more electrodes each applying the first electric field and/or the second electric field, wherein when the liquid ejection control is performed, a maximum value of the intensity of the first electric field is greater than a maximum value of the intensity of the second electric field, two electrodes of the three or more electrodes that are adjacent in the thickness direction and that apply the first electric field are separated by a distance in the thickness direction, two electrodes of the three or more electrodes that are adjacent in the thickness direction and that apply the second electric field are arranged at another distance from each other in the thickness direction, and the distance between the two electrodes that apply the first electric field is shorter than the other distance between the two electrodes that apply the second electric field.

2. The liquid ejection head according to claim 1, wherein a maximum value of potential difference between the two electrodes that apply the first electric field is equal to a maximum value of potential difference between the two electrodes that apply the second electric field in the liquid ejection control.

3. A recording apparatus, comprising:

a liquid ejection head according to claim 1; and a controller configured to control the liquid ejection head.

4. A liquid ejection head comprising a channel member comprising a pressure applying surface, and a pressure chamber comprising an opening defined in the pressure applying surface;

a piezoelectric actuator disposed on the pressure applying surface, wherein a thickness direction is perpendicular to the pressure applying surface, the piezoelectric actuator comprising:

a first active region made of a piezoelectric member polarized in the thickness direction, the first active region extending over a midsection of the pressure chamber when viewed in a plan view through the pressure applying surface, and a second active region made of another piezoelectric member polarized in the thickness direction and closer than the first active region to the pressure applying surface, the second active region extending over both a peripheral section of the pressure chamber and an outer region located outside the pressure chamber when viewed in the plan view through the pressure applying surface; and a driver configured to drive the piezoelectric actuator and to perform liquid ejection control for ejecting liquid, the liquid ejection control including control of an intensity of a first electric field applied to the first active region in the thickness direction and an intensity of a second electric field applied to the second active region in the thickness direction in at least one of a first manner in which a time period over which the first active region expands along the pressure applying surface and a time period over which the second active region expands along the pressure applying surface overlap or coincide with each other or a second manner in which a time period over which the first active region contracts along the pressure applying surface and a time period over which the second active region contracts along the pressure applying surface overlap or coincide with each other; wherein one surface of the piezoelectric actuator located on a first side is farther from the channel member than another surface of the piezoelectric actuator located on a second side, the piezoelectric actuator comprises a first piezoelectric layer, a second piezoelectric layer, a third piezoelectric layer, and a fourth piezoelectric layer stacked in sequence from the first side to the second side, a first electrode disposed on a surface of the first piezoelectric layer on the first side, the first electrode extending over the midsection in a see-through plan view, a second electrode disposed on a surface of the first piezoelectric layer on the second side, the second electrode extending over the midsection in the see-through plan view, a third electrode disposed on a surface of the second piezoelectric layer on the second side, the third electrode extending over the midsection, the peripheral section, and the outer region in the see-through plan view, and a fourth electrode disposed on a surface of the fourth piezoelectric layer on the second side, the fourth electrode extending over the peripheral section and the outer region in the see-through plan view, the first active region comprises a region of the first piezoelectric layer that is located between the first electrode and the second electrode, a region of the second piezoelectric layer that is located between the second electrode and a portion included in the third electrode that extends over the midsection, and the second active region comprises a region of the third and fourth piezoelectric layers this is located between the fourth electrode and a portion included in the third electrode that extends over the peripheral section and the outer region.

5. The liquid ejection head according to claim 4, wherein the region of the first piezoelectric layer that is included in the first active region and the region of the second piezoelectric layer that is included in the first active region are polarized in opposite directions, the region of the third and fourth piezoelectric layers that are included in the second active region and the region of the first piezoelectric layer that is included in the first active region are polarized in a same direction, and with the first electrode and the third electrode placed at a first potential, and the second electrode and the fourth electrode placed at a second potential, the liquid ejection control is performed in such a manner that a difference between the first potential and the second potential causes application of the first electric field and the second electric field.

6. The liquid ejection head according to claim 4, wherein a sum of a thickness of the third piezoelectric layer and a thickness of the fourth piezoelectric layer is greater than a thickness of the first piezoelectric layer and is greater than a thickness of the second piezoelectric layer.

7. The liquid ejection head according to claim 4, wherein the piezoelectric actuator comprises a conductor pattern disposed on a surface of the third piezoelectric layer on the second side and located on an outer side with respect to the second active region in the see-through plan view.

8. The liquid ejection head according to claim 4, wherein the piezoelectric actuator comprises an inactive region of the piezoelectric member that extends to a perimeter of the first active region and a reorientation electrode disposed on the inactive region, the reorientation electrode being opposite the pressure applying surface with the inactive region located therebetween, the inactive region comprises a region that is part of the first and second piezoelectric layers and located between the reorientation electrode and the fourth electrode, and when not performing the liquid ejection control, the driver performs reorientation control by which an electric field is applied to the inactive region in the thickness direction by applying a voltage between the reorientation electrode and the fourth electrode.

9. A recording apparatus, comprising:

a liquid ejection head according to claim 4; and a controller configured to control the liquid ejection head.

10. A liquid ejection head comprising a channel member comprising a pressure applying surface, and a pressure chamber comprising an opening defined in the pressure applying surface;

a piezoelectric actuator disposed on the pressure applying surface, wherein a thickness direction is perpendicular to the pressure applying surface, the piezoelectric actuator comprising:

a first active region made of a piezoelectric member polarized in the thickness direction, the first active region extending over a midsection of the pressure chamber when viewed in a plan view through the pressure applying surface, and a second active region made of another piezoelectric member polarized in the thickness direction and closer than the first active region to the pressure applying surface, the second active region extending over both a peripheral section of the pressure chamber and an outer region located outside the pressure chamber when viewed in the plan view through the pressure applying surface; and a driver configured to drive the piezoelectric actuator and to perform liquid ejection control for ejecting liquid, the liquid ejection control including control of an intensity of a first electric field applied to the first active region in the thickness direction and an intensity of a second electric field applied to the second active region in the thickness direction in at least one of a first manner in which a time period over which the first active region expands along the pressure applying surface and a time period over which the second active region expands along the pressure applying surface overlap or coincide with each other or a second manner in which a time period over which the first active region contracts along the pressure applying surface and a time period over which the second active region contracts along the pressure applying surface overlap or coincide with each other;

wherein in a sectional view taken along a line passing through a center of the pressure chamber and orthogonal to the pressure applying surface, a width of a second portion of the second active region that is located outside the pressure chamber is greater than a width of a first portion of the second active region that extends over the pressure chamber.

11. A recording apparatus, comprising:

a liquid ejection head according to claim 10; and a controller configured to control the liquid ejection head.

12. A liquid ejection head, comprising:

a channel member comprising a pressure applying surface and a pressure chamber comprising an opening defined in the pressure applying surface;

a piezoelectric actuator disposed on the pressure applying surface, wherein a thickness direction is perpendicular to the pressure applying surface, the piezoelectric actuator comprising:

a first active region made of a piezoelectric member polarized in the thickness direction, the first active region extending over a midsection of the pressure chamber when viewed in a plan view through the pressure applying surface, and a second active region made of another piezoelectric member polarized in the thickness direction and closer than the first active region to the pressure applying surface, the second active region extending over both a peripheral section of the pressure chamber and an outer region located outside the pressure chamber when viewed in the plan view through the pressure applying surface; and when performing control for ejecting liquid droplets, the driver controls intensity of an electric field applied to the first active region in the thickness direction and intensity of an electric field applied to the second active region in the thickness direction in such a manner that a time period over which the first active region expands along the pressure applying surface and a time period over which the second active region expands along the pressure applying surface overlap or coincide with each other and a time period over which the first active region contracts along the pressure applying surface and a time period over which the second active region contracts along the pressure applying surface overlap or coincide with each other, and an area of a second portion of the second active region that is located outside the pressure chamber is greater than an area of a first portion of the second active region that extends over the pressure chamber when the second active region is viewed in the plan view through the pressure applying surface.

13. A recording apparatus, comprising:

a liquid ejection head according to claim 12; and a controller configured to control the liquid ejection head.

14. The liquid ejection head according to claim 12, comprising a driver configured to drive the piezoelectric actuator, wherein when performing control for ejecting liquid droplets, the driver controls intensity of an electric field applied to the first active region in the thickness direction and intensity of an electric field applied to the second active region in the thickness direction in at least one of a first manner in which a time period over which the first active region expands along the pressure applying surface and a time period over which the second active region expands along the pressure applying surface overlap or coincide with each other or a second manner in which a time period over which the first active region contracts along the pressure applying surface and a time period over which the second active region contracts along the pressure applying surface overlap or coincide with each other.

15. The liquid ejection head according to claim 14, further comprising an insulating layer located between the second active region and the channel member.

16. A liquid ejection head, comprising:

a channel member comprising a pressure applying surface, and a pressure chamber comprising an opening defined in the pressure applying surface;

a piezoelectric actuator disposed on the pressure applying surface; and a driver configured to drive the piezoelectric actuator, wherein a thickness direction is perpendicular to the pressure applying surface, the piezoelectric actuator comprising:

a first active region made of a piezoelectric member polarized in the thickness direction, the first active region extending over a midsection of the pressure chamber when viewed in a plan view through the pressure applying surface, a second active region made of another piezoelectric member polarized in the thickness direction and closer than the first active region to the pressure applying surface, the second active region extending over both a peripheral section of the pressure chamber and an outer region located outside the pressure chamber when viewed in the plan view through the pressure applying surface, and an inactive region made of a piezoelectric member and extending to a perimeter of the first active region, the driver performs liquid ejection control by which intensity of an electric field applied to the first active region in the thickness direction and intensity of an electric field applied to the second active region in the thickness direction are controlled in at least one of a first manner in which a time period over which the first active region expands along the pressure applying surface and a time period over which the second active region expands along the pressure applying surface overlap or coincide with each other or a second manner in which a time period over which the first active region contracts along the pressure applying surface and a time period over which the second active region contracts along the pressure applying surface overlap or coincide with each other, and when not performing the liquid ejection control, the driver performs reorientation control by which an electric field is applied to the inactive region in the thickness direction.

17. A recording apparatus, comprising:

a liquid ejection head according to claim 16; and a controller configured to control the liquid ejection head.

18. The liquid ejection head according to claim 16, wherein the piezoelectric actuator comprises a reorientation electrode disposed on the inactive region, the reorientation electrode being opposite the pressure applying surface with the inactive region located therebetween, an intermediate electrode located between the inactive region and the second active region, and a lower electrode disposed on the second active region on the pressure applying surface, when performing the liquid ejection control, the driver applies another electric field to the second active region by applying a first voltage between the intermediate electrode and the lower electrode, when performing the reorientation control, the driver applies the electric field to the inactive region by applying a second voltage between the reorientation electrode and the lower electrode or by applying a third voltage between the reorientation electrode and the intermediate electrode.

19. The liquid ejection head according to claim 18, wherein the piezoelectric actuator comprises an upper electrode farther from the pressure applying surface than the intermediate electrode, the upper electrode being opposite the intermediate electrode with at least part of the first active region located therebetween, when performing the liquid ejection control, the driver applies an electric field to the first active region by applying a fourth voltage between the upper electrode and the intermediate electrode, and when performing the reorientation control, the driver applies an electric field to the inactive region by applying the second voltage between the reorientation electrode and the lower electrode without applying a potential to the intermediate electrode.

20. A liquid ejection head comprising a channel member comprising a pressure applying surface, and a pressure chamber comprising an opening defined in the pressure applying surface;

a piezoelectric actuator disposed on the pressure applying surface, wherein a thickness direction is perpendicular to the pressure applying surface, the piezoelectric actuator comprising:

a first active region made of a piezoelectric member polarized in the thickness direction, the first active region extending over a midsection of the pressure chamber when viewed in a plan view through the pressure applying surface, and a second active region made of another piezoelectric member polarized in the thickness direction and closer than the first active region to the pressure applying surface, the second active region extending over both a peripheral section of the pressure chamber and an outer region located outside the pressure chamber when viewed in the plan view through the pressure applying surface; and a driver configured to drive the piezoelectric actuator and to perform liquid ejection control for ejecting liquid, the liquid ejection control including control of an intensity of a first electric field applied to the first active region in the thickness direction and an intensity of a second electric field applied to the second active region in the thickness direction in at least one of a first manner in which a time period over which the first active region expands along the pressure applying surface and a time period over which the second active region expands along the pressure applying surface overlap or coincide with each other or a second manner in which a time period over which the first active region contracts along the pressure applying surface and a time period over which the second active region contracts along the pressure applying surface overlap or coincide with each other;

wherein a piezoelectric member located on a side opposite to the pressure applying surface with respect to the second active region and extending to a perimeter of the first active region is an inactive region over a thickness of the first active region.

21. A recording apparatus, comprising:

a liquid ejection head according to claim 20; and a controller configured to control the liquid ejection head.

* * * * *